(12) United States Patent
Mathew

(10) Patent No.: US 10,579,607 B2
(45) Date of Patent: Mar. 3, 2020

(54) SINGLE POINT OF DISPATCH FOR HYBRID CLOUD DEPLOYMENT FOR INDEXER CLUSTERS

(71) Applicant: Splunk Inc., San Francisco, CA (US)

(72) Inventor: Ashish Mathew, San Francisco, CA (US)

(73) Assignee: SPLUNK INC., San Francisco, CA (US)

( * ) Notice: Subject to any disclaimer, the term of this patent is extended or adjusted under 35 U.S.C. 154(b) by 433 days.

(21) Appl. No.: 15/582,424

(22) Filed: Apr. 28, 2017

(65) Prior Publication Data

US 2018/0314731 A1 Nov. 1, 2018

(51) Int. Cl.
G06F 17/30 (2006.01)
G06F 16/22 (2019.01)
G06F 16/25 (2019.01)

(52) U.S. Cl.
CPC ........ G06F 16/2272 (2019.01); G06F 16/256 (2019.01)

(58) Field of Classification Search
None
See application file for complete search history.

(56) References Cited

U.S. PATENT DOCUMENTS

| 7,984,043 | B1* | 7/2011 | Waas | G06F 16/8358 |
| | | | | 707/718 |
| 8,682,925 | B1 | 3/2014 | Marquardt et al. | |
| 9,069,607 | B1 | 6/2015 | Gopalakrishna Alevoor et al. | |
| 9,128,779 | B1 | 9/2015 | Gladkikh et al. | |
| 9,130,832 | B1 | 9/2015 | Boe et al. | |
| 9,158,811 | B1 | 10/2015 | Choudhary et al. | |
| 2009/0049010 | A1 | 2/2009 | Bodapati | |
| 2009/0112780 | A1* | 4/2009 | Chen | G06F 9/44505 |
| | | | | 706/19 |
| 2010/0030840 | A1 | 2/2010 | O'Shea et al. | |
| 2012/0059823 | A1* | 3/2012 | Barber | G06F 16/328 |
| | | | | 707/737 |
| 2016/0092558 | A1* | 3/2016 | Ago | G06F 16/328 |
| | | | | 707/737 |

(Continued)

OTHER PUBLICATIONS

Splunk. Splunk Documentation 6.3.3. <web.archive.org/web/20160305094905/http://docs.splunk.com/Documentation/Splunk/6.3.3/DistSearch/Whatisdistributedsearch> (Year: 2016).*

(Continued)

*Primary Examiner* — Syed H Hasan

(57) ABSTRACT

Embodiments of the present disclosure provide a method for performing search queries. The method comprises transmitting a list of active indexers in an indexer cluster from a cluster master for receipt by a first search head, wherein the cluster master is communicatively coupled with an indexer cluster comprising a plurality of indexers and the first search head. The method further comprises receiving a first slot request at the cluster master in response to a query from the first search head, wherein the first search head is operable to transmit the query to the active indexers for execution if granted the slot request. Further, the method comprises evaluating a plurality of policies to determine if the first slot request can be granted and responsive to a positive determination, transmitting an authorization token for a slot to the first search head.

30 Claims, 22 Drawing Sheets

(56) References Cited

U.S. PATENT DOCUMENTS

2017/0091183 A1 3/2017 Kenchammana-Hosekote et al.
2017/0091215 A1 3/2017 Beard et al.

OTHER PUBLICATIONS

Loughran, Steve. Hadoop and Kerberos: The Madness Beyond the Gate. Mar. 1, 2016. <https://www.freetechbooks.com/hadoop-and-kerberos-the-madness-beyond-the-gate-t921.html> (Year: 2016).*

* cited by examiner

FIG. 6A

| Data Summary | | | |
|---|---|---|---|
| Hosts (5) | Sources (8) | Sourcetypes (3) | |
| filter | | | |
| Host ≎ | | Count ≎ | Last Update ≎ |
| mailsv | all ∨ | 9,829 | 4/29/14 1:32:47.000 PM |
| vendor_sales | all ∨ | 30,244 | 4/29/14 1:32:46.000 PM |
| www1 | all ∨ | 24,221 | 4/29/14 1:32:44.000 PM |
| www2 | all ∨ | 22,595 | 4/29/14 1:32:47.000 PM |
| www3 | all ∨ | 22,975 | 4/29/14 1:32:45.000 PM |

Original Search:
Search "error" | stats count BY host ← 802

Sent to peers:
Search "error" | prestats count BY host ← 804

Executed by search head:
Aggregate the prestats results received from peers ← 806

FIG. 9B

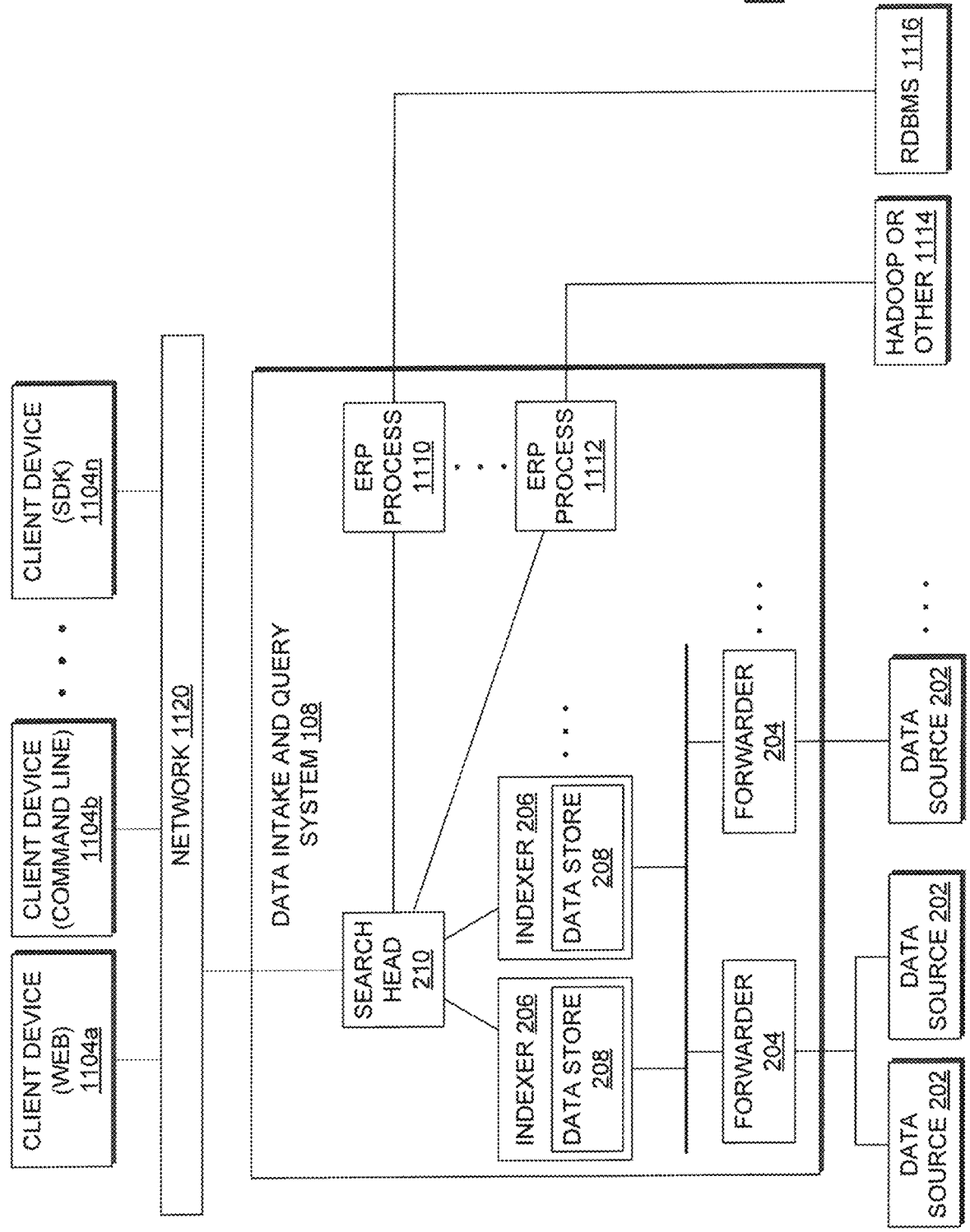

FIG. 12

| Time 1214 | Host 1210 | Source 1211 | Source Type 1212 | Event 1213 |
|---|---|---|---|---|
| 10/10/2000 1:55 p.m. | www1 | access.log | access_combined | 127.0.0.1 - frank [10/Oct/2000:13:55:36 -0700] "GET /apache.gif HTTP/1.0" 200 2326 0.0947 |
| 10/10/2000 1:56 p.m. | www2 | access.log | access_combined | 127.0.0.1 - bob [10/Oct/2010:13:56:36 -0700] "GET /mickey_mouse.gif HTTP/1.0" 200 2980 0.0899 |
| 10/10/2000 1:57 p.m. | www2 | access.log | access_combined | 127.0.0.1 - carlos [10/Oct/2010:13:57:36 -0700] "GET /donald_duck.gif HTTP/1.0" 200 2900 0.0857 |
| 10/10/2000 1:58 p.m. | www2 | error.log | apache_error | [Sunday Oct 10 1:59:33 2010] [error] [client 127.10.1.1.015] File does not exist: /home/reba/public_html/images/daffy_duck.gif |

FIG. 15

SINGLE POINT OF DISPATCH FOR HYBRID CLOUD DEPLOYMENT FOR INDEXER CLUSTERS

CROSS-REFERENCE TO RELATED APPLICATIONS

The present application is related to U.S. patent application Ser. No. 15/582,372, filed Apr. 28, 2017, entitled "SINGLE POINT OF DISPATCH FOR MANAGEMENT OF SEARCH HEADS IN A HYBRID CLOUD DEPLOYMENT OF A QUERY SYSTEM," naming Ashish Mathew as inventor. That application is incorporated herein by reference in its entirety and for all purposes.

BACKGROUND

The rapid increase in the production and collection of machine generated data has created relatively large data sets that are difficult to query. The machine data can include sequences of time stamped records that may occur in one or more usually continuous streams. Further, machine data often represents some type of activity made up of discrete events.

Searching data requires different ways to express searches. Query engines today allow users to search by the most frequently occurring terms or keywords within the data and generally have little notion of event based searching. Given the large volume and repetitive characteristics of machine data, users often need to start by narrowing the set of potential search results using event-based search mechanisms and then, through examination of the results, choose one or more keywords to add to their search parameters. Timeframes and event-base metadata like frequency, distribution, and likelihood of occurrence are especially important when searching data, but difficult to achieve with current query engine approaches.

Also, users often generate arbitrary queries to produce statistics and metrics about selected data fields that may be included in the data. Indexing may enable raw data records to be identified quickly, but operations that examine/scan the individual data records may become prohibitively expensive as the size of the data set grows. Further, the arbitrary queries generated by the user can intentionally or inadvertently overload the query systems with high levels of concurrent searches. Thus, systems that can query relatively large sets of data are the subject of considerable innovation.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

A hybrid deployment can comprise both an on-premises environment and a cloud-based environment. In a hybrid deployment, a client may configure an "on-premises" solution by installing a software application on server computers owned by the client and by configuring each server to operate as one or more of a forwarder, a cluster master, an indexer, a search head, etc. Further, in a cloud-based deployment, a service provider may provide "cloud-based" solution by managing computing resources configured to implement various aspects of the system, e.g., forwarders, indexers, search heads, cluster masters, etc. and by providing access to the system to end users via a network.

In one or more embodiments, a hybrid deployment may cluster together a group of indexers to be protected by a cluster master. Each search head communicates with a master node called a "cluster master" that provides the search head with a list of indexers to which the search head can distribute portions of the query. The cluster master maintains a list of active indexers and can also designate which indexers may have responsibility for responding to queries over certain sets of events.

In one or more embodiments, a search head may communicate with the cluster master before the search head distributes queries to indexers to secure authorization to access the indexers and to discover the addresses of active indexers. To prevent indexer clusters from potential overloading, the indexer clusters are protected by a stateless cluster master, which includes several layers of quota checks and bandwidth checks performed by the cluster master prior to allowing a search head to dispatch a query to the indexer cluster. Accordingly, the cluster masters may act as gatekeepers for all searches to be executed on indexer clusters.

In one or more embodiments, a query will only be dispatched to an indexer cluster (or indexer) if it satisfies the quota requirements imposed by a cluster master for its associated indexer cluster. For example, a cluster master may impose a quota related to a maximum number of concurrent searches that can be run on an associated indexer cluster at any given time. The cluster master, therefore, can be configured to act as a single point of dispatch for any load on a subset of indexer clusters. Search heads would consult the single point of dispatch prior to dispatching a query. In one or more embodiments, a query will be authorized for dispatch by a cluster master if all the quota requirements are met for the associated indexer cluster. In other words, prior to dispatching a query to the indexer clusters (or indexers), a search head would need authorization from a cluster master associated with the indexer clusters. The authorization can be based on a number of policies or factors, e.g., number of permitted concurrent searches on the indexer clusters, type of searches, time range of searches, resource usage metrics, etc.

According to one or more embodiments of the present disclosure, a method is provided for performing search queries in a way that avoids overloading an indexer cluster or indexers with an unwanted or unauthorized high levels of concurrent searches. The method comprises transmitting a slot request from a search head to a cluster master in response to a query, wherein the cluster master is communicatively coupled with an indexer cluster comprising a plurality of indexers. The method further comprises receiving addresses of active indexers in the indexer cluster and a response to the slot request from the cluster master. Responsive to a grant of a slot by the cluster master, the method comprises using the addresses to transmit the query to the active indexers. Additionally, the method comprises receiving results of the query from the active indexers and releasing the slot to the cluster master.

According to a second embodiment of the present disclosure a non-transitory computer-readable medium having computer-readable program code embodied therein for causing a computer system to perform a method for performing a query is provided. The method comprises transmitting a slot request from a search head to a cluster master in response to a query, wherein the cluster master is communicatively coupled with an indexer cluster comprising a plurality of indexers. The method further comprises receiving addresses of active indexers in the indexer cluster and a response to the slot request from the cluster master. Responsive to a grant of a slot by the cluster master, the method comprises using the addresses to transmit the query to the active indexers. Additionally, the method comprises receiving results of the query from the active indexers and releasing the slot to the cluster master.

According to a third embodiment of the present disclosure a system is provided for performing a query. The system comprises a processing device communicatively coupled with a memory and configured to: (a) transmit a slot request from a search head to a cluster master in response to a query, wherein the cluster master is communicatively coupled with an indexer cluster comprising a plurality of indexers; (b) receive addresses of active indexers in the indexer cluster and a response to the slot request from the cluster master; (c) responsive to a grant of a slot by the cluster master, use the addresses to transmit the query to the active indexers; (d) receive results of the query from the active indexers; and (e) release the slot to the cluster master.

According to a fourth embodiment of the present disclosure a method is provided for performing a query. The method comprises transmitting a list of active indexers in an indexer cluster from a cluster master for receipt by a first search head as part of a heartbeat response message, wherein the cluster master is communicatively coupled with an indexer cluster comprising a plurality of indexers, and wherein the first search head is one of a plurality of search heads operable to be communicatively coupled to the cluster master. The method further comprises receiving a first slot request at the cluster master in response to a query from the first search head, wherein the first search head is operable to transmit the query to the active indexers for execution if granted the slot request. Further, the method comprises evaluating a plurality of policies to determine if the first slot request can be granted and responsive to a determination that the first slot request can be granted, transmitting an authorization token for a slot to the first search head.

According to a fifth embodiment of the present disclosure a non-transitory computer-readable medium having computer-readable program code embodied therein for causing a computer system to perform a method for performing a query is provided. The method comprises transmitting a list of active indexers in an indexer cluster from a cluster master for receipt by a first search head as part of a heartbeat response message, wherein the cluster master is communicatively coupled with an indexer cluster comprising a plurality of indexers, and wherein the first search head is one of a plurality of search heads operable to be communicatively coupled to the cluster master. The method further comprises receiving a first slot request at the cluster master in response to a query from the first search head, wherein the first search head is operable to transmit the query to the active indexers for execution if granted the slot request. Further, the method comprises evaluating a plurality of policies to determine if the first slot request can be granted and responsive to a determination that the first slot request can be granted, transmitting an authorization token for a slot to the first search head.

According to a sixth embodiment of the present disclosure a system is provided for performing a query. The system comprises a processing device communicatively coupled with a memory and configured to: (a) transmit a list of active indexers in an indexer cluster from a cluster master for receipt by a first search head as part of a heartbeat response message, wherein the cluster master is communicatively coupled with an indexer cluster comprising a plurality of indexers, and wherein the first search head is one of a plurality of search heads operable to be communicatively coupled to the cluster master; (b) receive a first slot request at the cluster master in response to a query from the first search head, wherein the first search head is operable to transmit the query to the active indexers for execution if granted the slot request; (c) evaluate a plurality of policies to determine if the first slot request can be granted; and (d) responsive to a determination that the first slot request can be granted, transmit an authorization token for a slot to the first search head.

BRIEF DESCRIPTION OF THE DRAWINGS

In the drawings:

FIG. 6A illustrates a search screen in accordance with the disclosed embodiments;

FIG. 6B illustrates a data summary dialog that enables a user to select various data sources in accordance with the disclosed embodiments;

FIG. 7 illustrates a user interface screen for an example data model-driven report generation interface in accordance with the disclosed embodiments;

FIG. 9B illustrates an incident review dashboard in accordance with the disclosed embodiments;

FIG. 11 illustrates a block diagram of an example data intake and query system that performs searches across external data systems in accordance with the disclosed embodiments;

FIG. 12 illustrates an exemplary manner in which time-stamped event data can be stored in a data store in accordance with the disclosed embodiments;

FIG. 15 illustrates the manner in which an inverted index is created and used in accordance with the disclosed embodiments;

DETAILED DESCRIPTION

Figure 1:
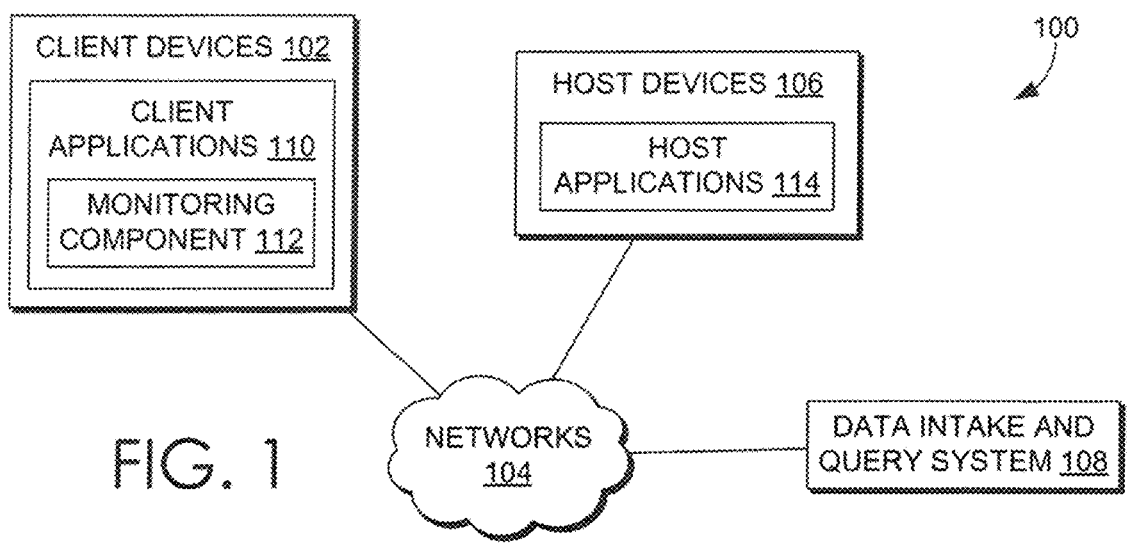
FIG. 1 illustrates a networked computer environment in which an embodiment may be implemented.

Embodiments are described herein according to the following outline:
1.0. General Overview
2.0. Operating Environment
  2.1. Host Devices
  2.2. Client Devices
  2.3. Client Device Applications
  2.4. Data Server System
  2.5. Data Ingestion
    2.5.1. Input
    2.5.2. Parsing
    2.5.3. Indexing
  2.6. Query Processing
  2.7 Pipelined Query Language
  2.8. Field Extraction Using A Configuration File
  2.9. Example Search Screen
  2.10. Data Modelling
  2.11. Acceleration Techniques
    2.11.1. Aggregation Technique
    2.11.2. Keyword Index
    2.11.3. High Performance Analytics Store
      2.11.3.1 Extracting Event Data Using Posting Values
    2.11.4. Accelerating Report Generation
  2.12. Security Features
  2.13. Data Center Monitoring
  2.14. Cloud-Based System Overview
    2.14.1 Performing Quota Checks Prior To Query Dispatch
  2.15. Searching Externally Archived Data
    2.15.1. ERP Process Features
  2.16 IT Service Monitoring
1.0. General Overview Modern data centers and other computing environments can comprise anywhere from a few host computer systems to thousands of systems configured to process data, service requests from remote clients, and perform numerous other computational tasks. During operation, various components within these computing environments often generate significant volumes of machine-generated data. For example, machine data is generated by various components in the information technology (IT) environments, such as servers, sensors, routers, mobile devices, virtual machines, operating systems, Internet of Things (IoT) devices, etc. Machine-generated data can include system logs, network packet data, sensor data, application program data, error logs, stack traces, system performance data, etc. In general, machine-generated data can also include performance data, diagnostic information, and many other types of data that can be analyzed to diagnose performance problems, monitor user interactions, and to derive other insights.

A number of tools are available to analyze raw machine data, that is, machine-generated data. In order to reduce the size of the potentially vast amount of machine data that may be generated, many of these tools typically pre-process the data based on anticipated data-analysis needs. For example, pre-specified data items may be extracted from the machine data and stored in a database to facilitate efficient retrieval and analysis of those data items at search time. However, the rest of the machine data typically is not saved and discarded during pre-processing. As storage capacity becomes progressively cheaper and more plentiful, there are fewer incentives to discard these portions of machine data and many reasons to retain more of the data.

This plentiful storage capacity is presently making it feasible to store massive quantities of minimally processed machine data for later retrieval and analysis. In general, storing minimally processed machine data and performing analysis operations at search time can provide greater flexibility because it enables an analyst to query all of the machine data, instead of querying only a pre-specified set of data items. This may enable an analyst to investigate different aspects of the machine data that previously were unavailable for analysis.

However, analyzing and querying massive quantities of machine data presents a number of challenges. For example, a data center, servers, or network appliances may generate many different types and formats of machine data (e.g., system logs, network packet data (e.g., wire data, etc.), sensor data, application program data, error logs, stack traces, system performance data, operating system data, virtualization data, etc.) from thousands of different components, which can collectively be very time-consuming to analyze. Further, new machine data is being produced in real-time, which requires that any searching or analysis of the data needs to be dynamic and updated continuously. By way of example, a server may be interacting with many different types of components in the IT environment in real-time, e.g., client device, operating system, routers, firewalls, etc. Each of the components may be producing log files with information regarding its interaction with the server in a different format. In order to determine if the server is secure, for example, data exchanged with all the various components needs to be analyzed and correlated in real-time. In another example, mobile devices may generate large amounts of information relating to data accesses, application performance, operating system performance, network performance, etc. There can be millions of mobile devices that report these types of information.

These challenges can be addressed by using an event-based data intake and query system, such as the SPLUNK® ENTERPRISE system developed by Splunk Inc. of San Francisco, Calif. The SPLUNK® ENTERPRISE system is the leading platform for providing real-time operational intelligence that enables organizations to collect, index, and query machine-generated data from various websites, applications, servers, networks, and mobile devices that power their businesses. The SPLUNK® ENTERPRISE system is particularly useful for analyzing data which is commonly found in system log files, network data, and other data input sources. Although many of the techniques described herein are explained with reference to a data intake and query system similar to the SPLUNK® ENTERPRISE system, these techniques are also applicable to other types of data systems.

In the SPLUNK® ENTERPRISE system, machine-generated data are collected and stored as "events". An event comprises a portion of the machine-generated data and is associated with a specific point in time. For example, events may be derived from "time series data," where the time series data comprises a sequence of data points (e.g., performance measurements from a computer system, etc.) that are associated with successive points in time. In general, each event can be associated with a timestamp that is derived from the raw data in the event, determined through interpolation between temporally proximate events having known timestamps, or determined based on other configurable rules for associating timestamps with events, etc.

In some instances, machine data can have a predefined format, where data items with specific data formats are stored at predefined locations in the data. For example, the machine data may include data stored as fields in a database table. In other instances, machine data may not have a predefined format, that is, the data is not at fixed, predefined locations, but the data does have repeatable patterns and is not random. This means that some machine data can comprise various data items of different data types and that may be stored at different locations within the data. For example, when the data source is an operating system log, an event can include one or more lines from the operating system log containing raw data that includes different types of performance and diagnostic information associated with a specific point in time.

Examples of components which may generate machine data from which events can be derived include, but are not limited to, web servers, application servers, databases, firewalls, routers, operating systems, and software applications that execute on computer systems, mobile devices, sensors, Internet of Things (IoT) devices, etc. The data generated by such data sources can include, for example and without limitation, server log files, activity log files, configuration files, messages, network packet data, performance measurements, sensor measurements, etc.

The SPLUNK® ENTERPRISE system uses flexible schema to specify how to extract information from the event data. A flexible schema may be developed and redefined as needed. Note that a flexible schema may be applied to event data "on the fly," when it is needed (e.g., at search time, index time, ingestion time, etc.). When the schema is not applied to event data until search time it may be referred to as a "late-binding schema."

During operation, the SPLUNK® ENTERPRISE system starts with raw input data (e.g., one or more system logs, streams of network packet data, sensor data, application program data, error logs, stack traces, system performance data, etc.). The system divides this raw data into blocks (e.g., buckets of data, each associated with a specific time frame, etc.), and parses the raw data to produce timestamped events. The system stores the timestamped events in a data store. The system enables users to run queries against the stored data to, for example, retrieve events that meet criteria specified in a query, such as containing certain keywords or having specific values in defined fields. As used herein throughout, data that is part of an event is referred to as "event data". In this context, the term "field" refers to a location in the event data containing one or more values for a specific data item. As will be described in more detail herein, the fields are defined by extraction rules (e.g., regular expressions) that derive one or more values from the portion of raw machine data in each event that has a particular field specified by an extraction rule. The set of values so produced are semantically-related (such as IP address), even though the raw machine data in each event may be in different formats (e.g., semantically-related values may be in different positions in the events derived from different sources).

As noted above, the SPLUNK® ENTERPRISE system utilizes a late-binding schema to event data while performing queries on events. One aspect of a late-binding schema is applying "extraction rules" to event data to extract values for specific fields during search time. More specifically, the extraction rules for a field can include one or more instructions that specify how to extract a value for the field from the event data. An extraction rule can generally include any type of instruction for extracting values from data in events. In some cases, an extraction rule comprises a regular expression where a sequence of characters form a query pattern, in which case the rule is referred to as a "regex rule." The system applies the regex rule to the event data to extract values for associated fields in the event data by querying the event data for the sequence of characters defined in the regex rule.

In the SPLUNK® ENTERPRISE system, a field extractor may be configured to automatically generate extraction rules for certain field values in the events when the events are being created, indexed, or stored, or possibly at a later time. Alternatively, a user may manually define extraction rules for fields using a variety of techniques. In contrast to a conventional schema for a database system, a late-binding schema is not defined at data ingestion time. Instead, the late-binding schema can be developed on an ongoing basis until the time a query is actually executed. This means that extraction rules for the fields in a query may be provided in the query itself, or may be located during execution of the query. Hence, as a user learns more about the data in the events, the user can continue to refine the late-binding schema by adding new fields, deleting fields, or modifying the field extraction rules for use the next time the schema is used by the system. Because the SPLUNK® ENTERPRISE system maintains the underlying raw data and uses late-binding schema for searching the raw data, it enables a user to continue investigating and learn valuable insights about the raw data.

In some embodiments, a common field name may be used to reference two or more fields containing equivalent data items, even though the fields may be associated with different types of events that possibly have different data formats and different extraction rules. By enabling a common field name to be used to identify equivalent fields from different types of events generated by disparate data sources, the system facilitates use of a "common information model" (CIM) across the disparate data sources (further discussed with respect to FIG. 5).

2.0. Operating Environment

FIG. 1 illustrates a networked computer system 100 in which an embodiment may be implemented. Those skilled in the art would understand that FIG. 1 represents one example of a networked computer system and other embodiments may use different arrangements.

The networked computer system 100 comprises one or more computing devices. These one or more computing devices comprise any combination of hardware and software configured to implement the various logical components described herein. For example, the one or more computing devices may include one or more memories that store instructions for implementing the various components described herein, one or more hardware processors configured to execute the instructions stored in the one or more memories, and various data repositories in the one or more memories for storing data structures utilized and manipulated by the various components.

In an embodiment, one or more client devices 102 are coupled to one or more host devices 106 and a data intake and query system 108 via one or more networks 104. Networks 104 broadly represent one or more LANs, WANs, cellular networks (e.g., LTE, HSPA, 3G, and other cellular technologies), or networks using any of wired, wireless, terrestrial microwave, or satellite links, and may include the public Internet.

2.1. Host Devices

In the illustrated embodiment, a system 100 includes one or more host devices 106. Host devices 106 may broadly include any number of computers, virtual machine instances, or data centers that are configured to host or execute one or more instances of host applications 114. In general, a host device 106 may be involved, directly or indirectly, in processing requests received from client devices 102. Each host device 106 may comprise, for example, one or more of a network device, a web server, an application server, a database server, etc. A collection of host devices 106 may be configured to implement a network-based service. For example, a provider of a network-based service may configure one or more host devices 106 and host applications 114 (e.g., one or more web servers, application servers, database servers, etc.) to collectively implement the network-based application.

In general, client devices 102 communicate with one or more host applications 114 to exchange information. The communication between a client device 102 and a host application 114 may, for example, be based on the Hypertext Transfer Protocol (HTTP) or any other network protocol. Content delivered from the host application 114 to a client device 102 may include, for example, HTML documents, media content, etc. The communication between a client device 102 and host application 114 may include sending various requests and receiving data packets. For example, in general, a client device 102 or application running on a client device may initiate communication with a host application 114 by making a request for a specific resource (e.g., based on an HTTP request), and the application server may respond with the requested content stored in one or more response packets.

In the illustrated embodiment, one or more of host applications 114 may generate various types of performance data during operation, including event logs, network data, sensor data, and other types of machine-generated data. For example, a host application 114 comprising a web server may generate one or more web server logs in which details of interactions between the web server and any number of client devices 102 is recorded. As another example, a host device 106 comprising a router may generate one or more router logs that record information related to network traffic managed by the router. As yet another example, a host application 114 comprising a database server may generate one or more logs that record information related to requests sent from other host applications 114 (e.g., web servers or application servers) for data managed by the database server.

2.2. Client Devices

Client devices 102 of FIG. 1 represent any computing device capable of interacting with one or more host devices 106 via a network 104. Examples of client devices 102 may include, without limitation, smart phones, tablet computers, handheld computers, wearable devices, laptop computers, desktop computers, servers, portable media players, gaming devices, and so forth. In general, a client device 102 can provide access to different content, for instance, content provided by one or more host devices 106, etc. Each client device 102 may comprise one or more client applications 110, described in more detail in a separate section hereinafter.

2.3. Client Device Applications

In an embodiment, each client device 102 may host or execute one or more client applications 110 that are capable of interacting with one or more host devices 106 via one or more networks 104. For instance, a client application 110 may be or comprise a web browser that a user may use to navigate to one or more websites or other resources provided by one or more host devices 106. As another example, a client application 110 may comprise a mobile application or "app." For example, an operator of a network-based service hosted by one or more host devices 106 may make available one or more mobile apps that enable users of client devices 102 to access various resources of the network-based service. As yet another example, client applications 110 may include background processes that perform various operations without direct interaction from a user. A client application 110 may include a "plug-in" or "extension" to another application, such as a web browser plug-in or extension.

In an embodiment, a client application 110 may include a monitoring component 112. At a high level, the monitoring component 112 comprises a software component or other logic that facilitates generating performance data related to a client device's operating state, including monitoring network traffic sent and received from the client device and collecting other device or application-specific information. Monitoring component 112 may be an integrated component of a client application 110, a plug-in, an extension, or any other type of add-on component. Monitoring component 112 may also be a stand-alone process.

In one embodiment, a monitoring component 112 may be created when a client application 110 is developed, for example, by an application developer using a software development kit (SDK). The SDK may include custom monitoring code that can be incorporated into the code implementing a client application 110. When the code is converted to an executable application, the custom code implementing the monitoring functionality can become part of the application itself.

In some cases, an SDK or other code for implementing the monitoring functionality may be offered by a provider of a data intake and query system, such as a system 108. In such cases, the provider of the system 108 can implement the custom code so that performance data generated by the monitoring functionality is sent to the system 108 to facilitate analysis of the performance data by a developer of the client application or other users.

In an embodiment, the custom monitoring code may be incorporated into the code of a client application 110 in a number of different ways, such as the insertion of one or more lines in the client application code that call or otherwise invoke the monitoring component 112. As such, a developer of a client application 110 can add one or more lines of code into the client application 110 to trigger the monitoring component 112 at desired points during execution of the application. Code that triggers the monitoring component may be referred to as a monitor trigger. For instance, a monitor trigger may be included at or near the beginning of the executable code of the client application 110 such that the monitoring component 112 is initiated or triggered as the application is launched, or included at other points in the code that correspond to various actions of the client application, such as sending a network request or displaying a particular interface.

In an embodiment, the monitoring component 112 may monitor one or more aspects of network traffic sent or received by a client application 110. For example, the monitoring component 112 may be configured to monitor data packets transmitted to or from one or more host applications 114. Incoming or outgoing data packets can be read or examined to identify network data contained within the packets, for example, and other aspects of data packets can be analyzed to determine a number of network performance statistics. Monitoring network traffic may enable information to be gathered particular to the network performance associated with a client application 110 or set of applications.

In an embodiment, network performance data refers to any type of data that indicates information about the network or network performance. Network performance data may include, for instance, a URL requested, a connection type (e.g., HTTP, HTTPS, etc.), a connection start time, a connection end time, an HTTP status code, request length, response length, request headers, response headers, connection status (e.g., completion, response time(s), failure, etc.), and the like. Upon obtaining network performance data indicating performance of the network, the network performance data can be transmitted to a data intake and query system 108 for analysis.

Upon developing a client application 110 that incorporates a monitoring component 112, the client application 110 can be distributed to client devices 102. Applications generally can be distributed to client devices 102 in any manner, or they can be pre-loaded. In some cases, the application may be distributed to a client device 102 via an application marketplace or other application distribution system. For instance, an application marketplace or other application distribution system might distribute the application to a client device based on a request from the client device to download the application.

Examples of functionality that enables monitoring performance of a client device are described in U.S. patent application Ser. No. 14/524,748, entitled "UTILIZING PACKET HEADERS TO MONITOR NETWORK TRAFFIC IN ASSOCIATION WITH A CLIENT DEVICE", filed on 27 Oct. 2014, and which is hereby incorporated by reference in its entirety for all purposes.

In an embodiment, the monitoring component 112 may also monitor and collect performance data related to one or more aspects of the operational state of a client application 110 or client device 102. For example, a monitoring component 112 may be configured to collect device performance information by monitoring one or more client device operations, or by making calls to an operating system or one or more other applications executing on a client device 102 for performance information. Device performance information may include, for instance, a current wireless signal strength of the device, a current connection type and network carrier, current memory performance information, a geographic location of the device, a device orientation, and any other information related to the operational state of the client device.

In an embodiment, the monitoring component 112 may also monitor and collect other device profile information including, for example, a type of client device, a manufacturer and model of the device, versions of various software applications installed on the device, and so forth.

In general, a monitoring component 112 may be configured to generate performance data in response to a monitor trigger in the code of a client application 110 or other triggering application event, as described above, and to store the performance data in one or more data records. Each data record, for example, may include a collection of field-value pairs, each field-value pair storing a particular item of performance data in association with a field for the item. For example, a data record generated by a monitoring component 112 may include a "networkLatency" field (not shown in the Figure) in which a value is stored. This field indicates a network latency measurement associated with one or more network requests. The data record may include a "state" field to store a value indicating a state of a network connection, and so forth for any number of aspects of collected performance data.

2.4. Data Server System

Figure 2:
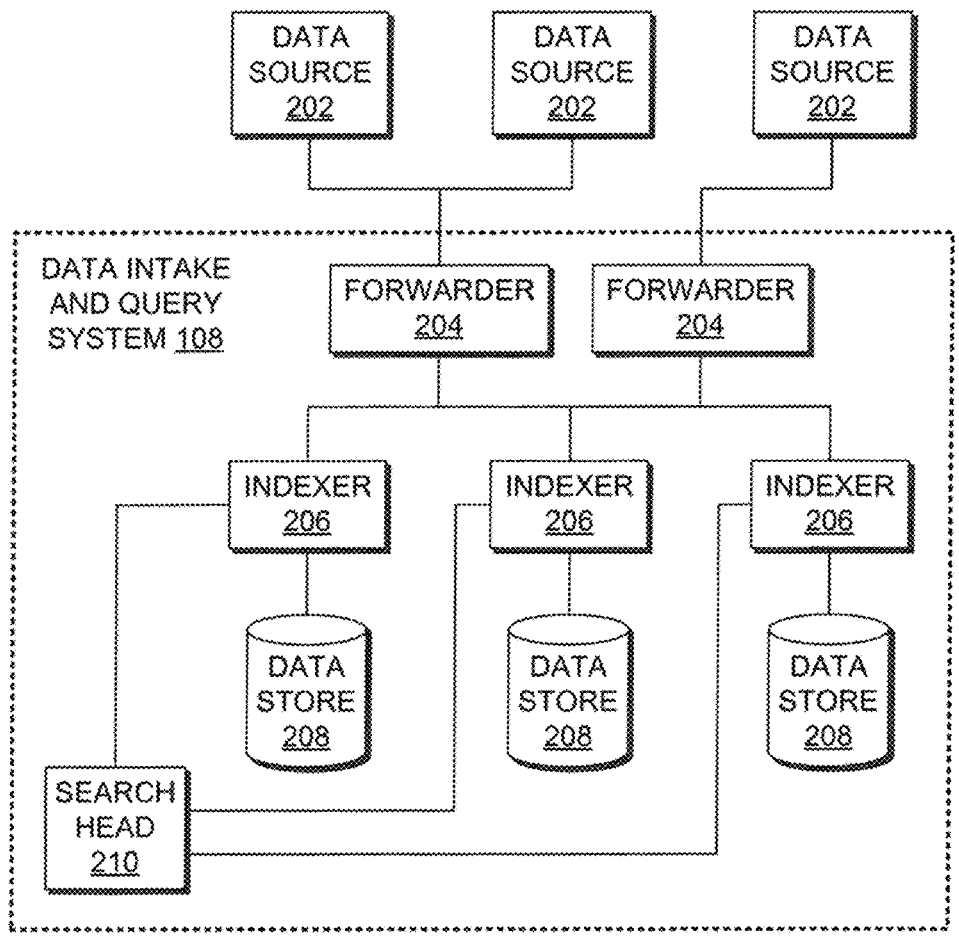
FIG. 2 illustrates a block diagram of an example data intake and query system in which an embodiment may be implemented.

FIG. 2 depicts a block diagram of an exemplary data intake and query system 108, similar to the SPLUNK® ENTERPRISE system. System 108 includes one or more forwarders 204 that receive raw machine data from a variety of input data sources 202, and one or more indexers 206 that process and store the data in one or more data stores 208. These forwarders and indexers can comprise separate computer systems, or may alternatively comprise separate processes executing on one or more computer systems. System 108 also includes a search head 210 that is responsible for performing a query during a query phase. The search head 210 allows users to query and visualize event data extracted from raw machine data received from various data sources. In an embodiment, each indexer returns partial responses for a subset of events to the search head 210 that combines the results to produce an answer for the query.

Each data source 202 broadly represents a distinct source of data that can be consumed by a system 108. Examples of a data source 202 include, without limitation, data files, directories of files, data sent over a network, event logs, registries, etc.

During operation, the forwarders 204 identify which indexers 206 receive data collected from a data source 202 and forward the data to the appropriate indexers. Forwarders 204 can also perform operations on the data before forwarding, including removing extraneous data, detecting timestamps in the data, parsing data, indexing data, routing data based on criteria relating to the data being routed, or performing other data transformations.

In an embodiment, a forwarder 204 may comprise a service accessible to client devices 102 and host devices 106 via a network 104. For example, one type of forwarder 204 may be capable of consuming vast amounts of real-time data from a potentially large number of client devices 102 or host devices 106. The forwarder 204 may, for example, comprise a computing device which implements multiple data pipelines or "queues" to handle forwarding of network data to indexers 206. A forwarder 204 may also perform many of the functions that are performed by an indexer. For example, a forwarder 204 may perform keyword extractions on raw data or parse raw data to create events. A forwarder 204 may generate time stamps for events. Additionally or alternatively, a forwarder 204 may perform routing of events to indexers. Data store 208 may contain events derived from machine data from a variety of sources all pertaining to the same component in an IT environment, and this data may be produced by the machine in question or by other components in the IT environment.

2.5. Data Ingestion

Figure 3:
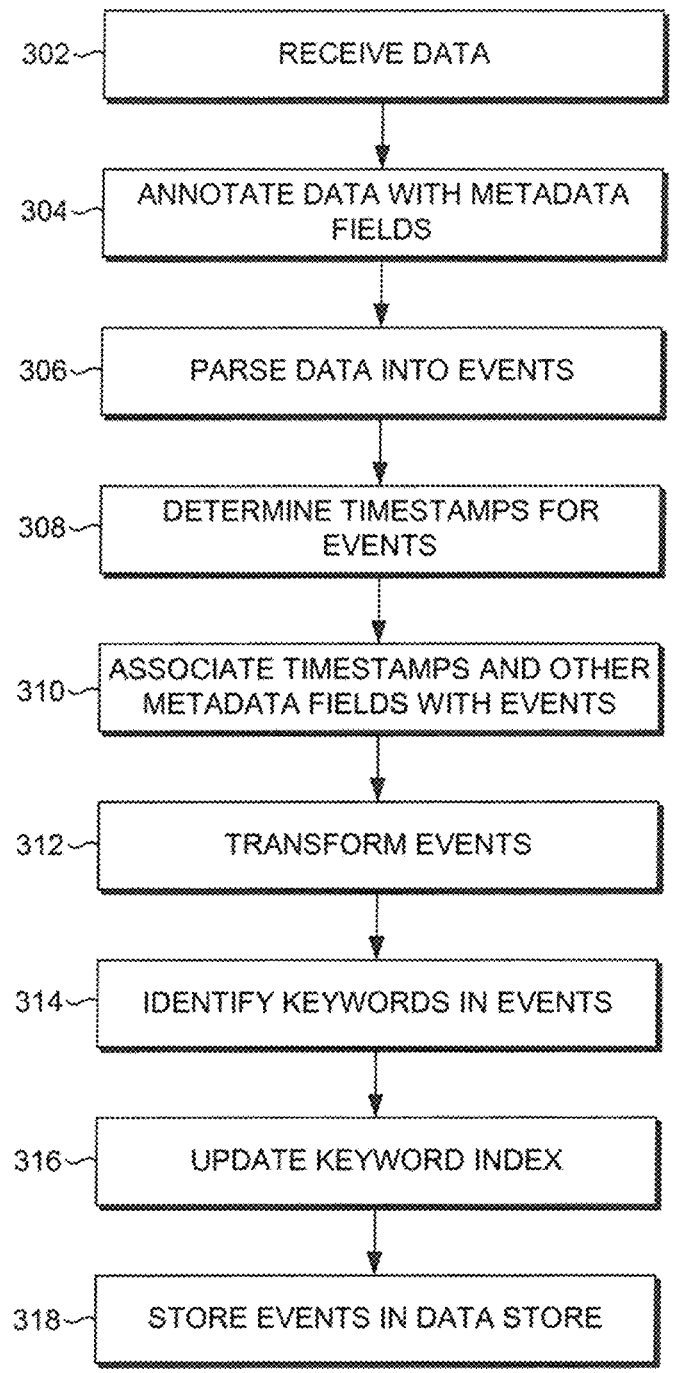
FIG. 3 is a flow diagram that illustrates how indexers process, index, and store data received from forwarders in accordance with the disclosed embodiments.

FIG. 3 depicts a flow chart illustrating an example data flow performed by Data Intake and Query system 108, in accordance with the disclosed embodiments. The data flow illustrated in FIG. 3 is provided for illustrative purposes only; those skilled in the art would understand that one or more of the steps of the processes illustrated in FIG. 3 may be removed or the ordering of the steps may be changed. Furthermore, for the purposes of illustrating a clear example, one or more particular system components are described in the context of performing various operations during each of the data flow stages. For example, a forwarder is described as receiving and processing data during an input phase; an indexer is described as parsing and indexing data during parsing and indexing phases; and a search head is described as performing a query during a query phase. However, other system arrangements and distributions of the processing steps across system components may be used.

2.5.1. Input

At block 302, a forwarder receives raw machine data from an input source, such as a data source 202 shown in FIG. 2. A forwarder initially may receive the data as a raw data stream generated by the input source. For example, a forwarder may receive a data stream from a log file generated by an application server, from a stream of network data from a network device, or from any other source of data. In one embodiment, a forwarder receives the raw data and may segment the data stream into "blocks", or "buckets," possibly of a uniform data size, to facilitate subsequent processing steps.

At block 304, a forwarder or other system component annotates each block generated from the raw data with one or more metadata fields. These metadata fields may, for example, provide information related to the data block as a whole and may apply to each event that is subsequently derived from the data in the data block. For example, the metadata fields may include separate fields specifying each of a host, a source, and a source type related to the data block. A host field may contain a value identifying a host name or IP address of a device that generated the data. A source field may contain a value identifying a source of the data, such as a pathname of a file, the name of the file, stream, or a protocol and port related to received network data. A source type field may contain a value specifying a particular source type label for the data. Additional metadata fields may also be included during the input phase, such as a character encoding of the data, if known, and possibly other values that provide information relevant to later processing steps. In an embodiment, a forwarder forwards the annotated data blocks to another system component (typically an indexer) for further processing.

The SPLUNK® ENTERPRISE system allows forwarding of data from one SPLUNK® ENTERPRISE instance to another, or even to a third-party system. SPLUNK® ENTERPRISE system can employ different types of forwarders in a configuration.

In an embodiment, a forwarder may contain the essential components needed to forward data. It can gather data from a variety of inputs and forward the data to a SPLUNK® ENTERPRISE server for indexing and querying. It also can tag metadata (e.g., source, source type, host, etc.).

Additionally or optionally, in an embodiment, a forwarder has the capabilities of the aforementioned forwarder as well as additional capabilities. The forwarder can parse data before forwarding the data (e.g., associate a time stamp with a portion of data and create an event, etc.) and can route data based on criteria such as source or type of event. It can also index data locally while forwarding the data to another indexer.

2.5.2. Parsing

At block 306, an indexer receives data blocks from a forwarder and parses the data to organize the data into events. This process is referred to as "event breaking" which, in one embodiment, may involve breaking up the data blocks at regularly occurring time-stamps within the raw data using a pattern-matching algorithm.

In an embodiment, to organize the data into events, an indexer may determine a source type associated with each data block (e.g., by extracting a source type label from the metadata fields associated with the data block, etc.) and refer to a source type configuration corresponding to the identified source type. A source type can either be well known, e.g., HTTP Web server logs, Windows event logs, etc. or can be created by the user. The source type definition may include one or more properties that indicate to the indexer to automatically determine the boundaries of events within the data. In general, these properties may include regular expression-based rules or delimiter rules where, for example, event boundaries may be indicated by predefined characters or character strings. These predefined characters may include punctuation marks or other special characters including, for example, carriage returns, tabs, spaces, line breaks, etc. If a source type for the data is unknown to the indexer, an indexer may infer a source type for the data by examining the structure of the data. Then, it can apply an inferred source type definition to the data to create the events.

At block 308, the indexer determines a timestamp for each event. Similar to the process for creating events, an indexer may again refer to a source type definition associated with the data to locate one or more properties that indicate instructions for determining a timestamp for each event. The properties may, for example, instruct an indexer to extract a time value from a portion of data in the event, to interpolate time values based on timestamps associated with temporally proximate events, to create a timestamp based on a time the event data was received or generated, to use the timestamp of a previous event, or use any other rules for determining timestamps.

At block 310, the indexer associates with each event one or more metadata fields including a field containing the timestamp (in some embodiments, a timestamp may be included in the metadata fields) determined for the event. These metadata fields may include a number of "default fields" that are associated with all events, and may also include one more custom fields as defined by a user. Similar to the metadata fields associated with the data blocks at block 304, the default metadata fields associated with each event may include a host, source, and source type field including or in addition to a field storing the timestamp. Note, however, that other default fields may be extracted during index time as well.

At block 312, an indexer may optionally apply one or more transformations to data included in the events created at block 306. For example, such transformations can include removing a portion of an event (e.g., a portion used to define event boundaries, extraneous characters from the event, other extraneous text, etc.), masking a portion of an event (e.g., masking a credit card number), removing redundant portions of an event, etc. The transformations applied to event data may, for example, be specified in one or more configuration files and referenced by one or more source type definitions.

FIG. 12 illustrates an exemplary manner in which time-stamped event data can be stored in a data store in accordance with the disclosed embodiments. As mentioned above, certain metadata fields, e.g., host 1210, source 1211, source type 1212 and timestamps 1214 are generated for each event, and associated with a corresponding event when storing the event data in a data store, e.g., data store 208. The metadata can be extracted from the raw machine data, or supplied or defined by an entity, such as a user or computer system. The metadata fields can become part of the event data. Note that while the time-stamp metadata field can be extracted from the raw data associated with each event, the values for the other metadata fields may be determined by the indexer based on information it receives pertaining to the source of the data.

Even though certain default or user-defined metadata fields can be extracted from the raw data for indexing purposes, e.g., time-based data, all the raw machine data within each event can be maintained in its original condition. In other words, unless certain information needs to be removed for practical reasons (e.g. extraneous information, confidential information), all the raw machine data associated with an event can be preserved and saved in the data store in field 1213 as shown in FIG. 12. Accordingly, the data store in which the event records are stored is sometimes referred to as a "raw record data store." The raw record data store contains a record of the raw event data tagged with the various default fields.

Referring back to FIG. 12, events 1221, 1222 and 1223 are associated with a server access log that records all requests from multiple clients that have been processed by the server. Each of the events 1221-1223 is associated with a discrete request made from a client device. The raw data associated with an event extracted from a server access log will comprise the IP address of the client 1203, the user id of the person requesting the document 1204, the time the server finished processing the request 1205, the request line from the client 1206, the status code returned by the server to the client 1207, the size of the object returned to the client (in this case, the gif file requested by the client) 1208 and the time spent to serve the request in microseconds 1209. As seen in FIG. 12, all the raw data retrieved from the server access log is retained and stored as part of each event in the data store.

Event 1224 is associated with an entry in a server error log that records any errors that the server encountered when processing a client request. Similar to the events related to the server access log, all the raw data in the error log file pertaining to this event is preserved and stored as part of the event record 1224.

Saving minimally processed event data in a data store associated with metadata fields in the manner shown in FIG. 12 is advantageous because it allows a search analyst to query all the machine data at search time instead of querying only a pre-specified set of data items. As mentioned above, because the system maintains the underlying raw data and uses a late-binding schema for querying the raw data, it enables a user to continue investigating and learn valuable insights about the raw data. In other words, the user is not compelled to know about all the fields of information that will be needed at data ingestion time. As a user learns more about the data in the events, the user can continue to refine the late-binding schema by adding new fields, deleting fields, or modifying the field extraction rules for use the next time the schema is used by the system.

2.5.3. Indexing

At blocks 314 and 316, an indexer can optionally generate a keyword index to facilitate fast keyword querying for event data. To build a keyword index, at block 314, the indexer identifies a set of keywords in each event. At block 316, the indexer includes the identified keywords in an index, which associates each stored keyword with reference pointers to events containing that keyword (or to locations within events where that keyword is located, other location identifiers, etc.). When an indexer subsequently receives a keyword-based query, the indexer can access the keyword index to quickly identify events containing the keyword.

In some embodiments, the keyword index may include entries for name-value pairs found in events, where a name-value pair can include a pair of keywords connected by a symbol, such as an equals sign or colon. This way, events containing these name-value pairs can be quickly located. In some embodiments, fields can automatically be generated for some or all of the name-value pairs at the time of indexing. For example, if the string "dest=10.0.1.2" is found in an event, a field named "dest" may be created for the event, and assigned a value of "10.0.1.2".

At block 318, the indexer stores the events with an associated timestamp in a data store 208. Timestamps enable a user to query for events based on a time range, thereby, making the query process time-sensitive and efficient. In one embodiment, the stored events are organized into "buckets," where each bucket stores events associated with a specific time range based on the timestamps associated with each event. Organizing events into buckets optimizes time-based querying because it allows an indexer to search only the relevant buckets when responding to a query. It also allows for events with recent timestamps, which may have a higher likelihood of being accessed, to be stored in a faster memory to facilitate faster retrieval. In one or more embodiments, buckets can be designated as "hot," "warm," or "cold" depending on the time range of the events contained within them. For example, a bucket may be designated "hot" if it is still open and accepting new incoming events. A bucket may be designated "warm" if it is not accepting any more new data and its time range has been finalized. Further, a bucket may be designated "cold" if the data it contains is historical and can be archived in slower memory. The "hot" and "warm" buckets, for example, may be stored in faster flash memory, while the "cold" buckets may be stored on a hard disk.

Each indexer 206 may be responsible for storing and querying a subset of the events contained in a corresponding data store 208. By distributing events among the indexers and data stores, the indexers can analyze events for a query in parallel. For example, using map-reduce techniques, each indexer returns partial responses for a subset of events to a search head that combines the results to produce an answer for the query. By storing events in buckets for specific time ranges, an indexer may further optimize data retrieval process by searching buckets corresponding to time ranges that are relevant to a query.

Moreover, events and buckets can also be replicated across different indexers and data stores to facilitate high availability and disaster recovery as described in U.S. patent application Ser. No. 14/266,812, entitled "SITE-BASED SEARCH AFFINITY", filed on 30 Apr. 2014, and in U.S. patent application Ser. No. 14/266,817, entitled "MULTI-SITE CLUSTERING", also filed on 30 Apr. 2014, each of which is hereby incorporated by reference in its entirety for all purposes.

2.6. Query Processing

Figure 4:
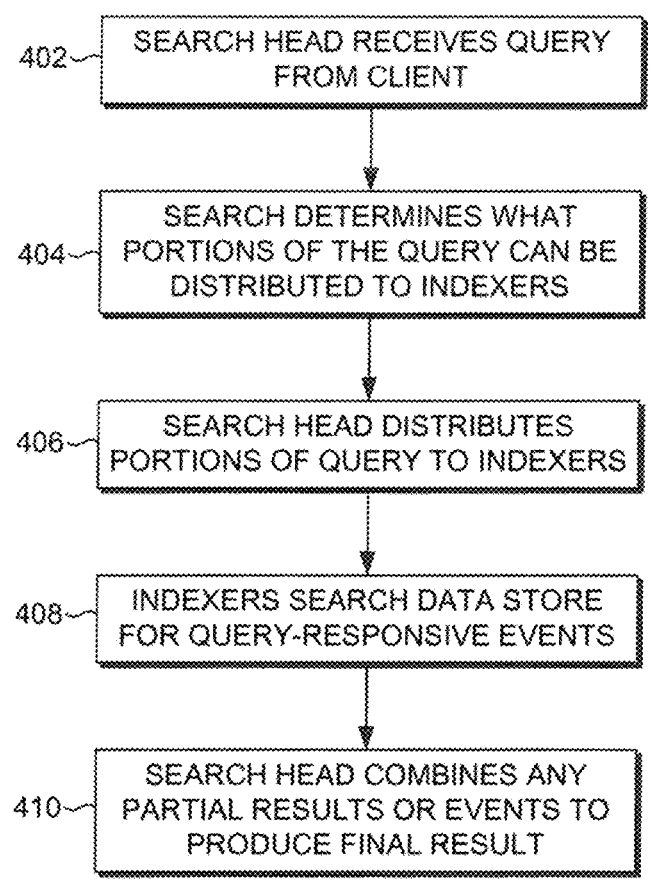
FIG. 4 is a flow diagram that illustrates how a search head and indexers perform a query in accordance with the disclosed embodiments.

FIG. 4 is a flow diagram that illustrates an exemplary process that a search head and one or more indexers may perform during a query. At block 402, a search head receives a query from a client. At block 404, the search head analyzes the query to determine what portion(s) of the query can be delegated to indexers and what portions of the query can be executed locally by the search head. At block 406, the search head distributes the determined portions of the query to the appropriate indexers. In an embodiment, a search head cluster may take the place of an independent search head where each search head in the search head cluster coordinates with peer search heads in the search head cluster to schedule jobs, replicate query results, update configurations, fulfill query requests, etc. In an embodiment, the search head (or each search head) communicates with a master node (also known as a cluster master, not shown in FIG.) that provides the search head with a list of indexers to which the search head can distribute the determined portions of the query. The master node maintains a list of active indexers and can also designate which indexers may have responsibility for responding to queries over certain sets of events. A search head may communicate with the master node before the search head distributes queries to indexers to discover the addresses of active indexers.

At block 408, the indexers to which the query was distributed, query data stores associated with them for events that are responsive to the query. To determine which events are responsive to the query, the indexer queries for events that match the criteria specified in the query. These criteria can include matching keywords or specific values for certain fields. The querying operations at block 408 may use the late-binding schema to extract values for specified fields from events at the time the query is processed. In an embodiment, one or more rules for extracting field values may be specified as part of a source type definition. The indexers may then either send the relevant events back to the search head, or use the events to determine a partial result, and send the partial result back to the search head.

At block 410, the search head combines the partial results or events received from the indexers to produce a final result for the query. This final result may comprise different types of data depending on what the query requested. For example, the results can include a listing of matching events returned by the query, or some type of visualization of the data from the returned events. In another example, the final result can include one or more calculated values derived from the matching events.

The results generated by the system 108 can be returned to a client using different techniques. For example, one technique streams results or relevant events back to a client in real-time as they are identified. Another technique waits to report the results to the client until a complete set of results (which may include a set of relevant events or a result based on relevant events) is ready to return to the client. Yet another technique streams interim results or relevant events back to the client in real-time until a complete set of results is ready, and then returns the complete set of results to the client. In another technique, certain results are stored as "query jobs" and the client may retrieve the results by referring the query jobs.

The search head can also perform various operations to make the query more efficient. For example, before the search head begins execution of a query, the search head can determine a time range for the query and a set of common keywords that all matching events include. The search head may then use these parameters to query the indexers to obtain a superset of the eventual results. Then, during a filtering stage, the search head can perform field-extraction operations on the superset to produce a reduced set of query results. This speeds up queries that are performed on a periodic basis.

2.7. Pipelined Query Language

Splunk Processing Language (SPL), used in conjunction with the SPLUNK® ENTERPRISE system, can be utilized to make a query. SPL is a pipelined query language in which a set of inputs is operated on by a first command in a command line, and then a subsequent command following the pipe symbol "|" operates on the results produced by the first command, and so on for additional commands. In other words, a query using SPL comprises a series of consecutive commands that are delimited by pipe (|) characters. The pipe character indicates to the system that the output or result of one command (to the left of the pipe) should be used as the input for the next command (to the right of the pipe). This enables the user to refine or enhance the data at each step along the pipeline until the desired results are attained. A query can start with search terms at the beginning of the pipeline. These search terms are keywords, phrases, Boolean expressions, key/value pairs, etc. that specify which events should be retrieved from the indexes. The retrieved events can then be passed as inputs into a query command using a pipe character. The query commands comprise directives regarding what to do with the events after they have been retrieved from the index(es). For example, query commands may be used to filter unwanted information, extract more information, evaluate new fields, calculate statistics, reorder the results, create an alert, create a chart or perform some type of aggregate function, where an aggregate function can be used to return an aggregate value, e.g., an average value, a sum, a maximum value, a root mean square etc.

Accordingly, a pipeline query language is highly advantageous because it can perform "filtering" as well as "processing" functions. In other words, a single query can include search term expressions as well as data-analysis expressions. For example, search terms at the beginning of a query can perform a "filtering" step by retrieving a set of events based on a condition (e.g., records associated with server response times of less than 1 microsecond). The results of the filtering step can then be passed to a query command that performs a "processing" step (e.g. calculating an aggregate value related to the filtered events such as the average response time of servers with response times of less than 1 microsecond). Furthermore, the search term expressions allow events to be filtered by keyword as well as field value criteria. For example, a query can filter out all events containing the word "warning" or filter out all events where a field value associated with a field "clientip" is "10.0.1.2."

The query results retrieved from the index in response to query terms at the beginning of a query can be considered of as a dynamically created table. Each query command redefines the shape of that table. Each indexed event can be considered a row with a column for each field value. Columns contain basic information about the data and also may contain data that has been dynamically extracted at search time.

Figure 13:
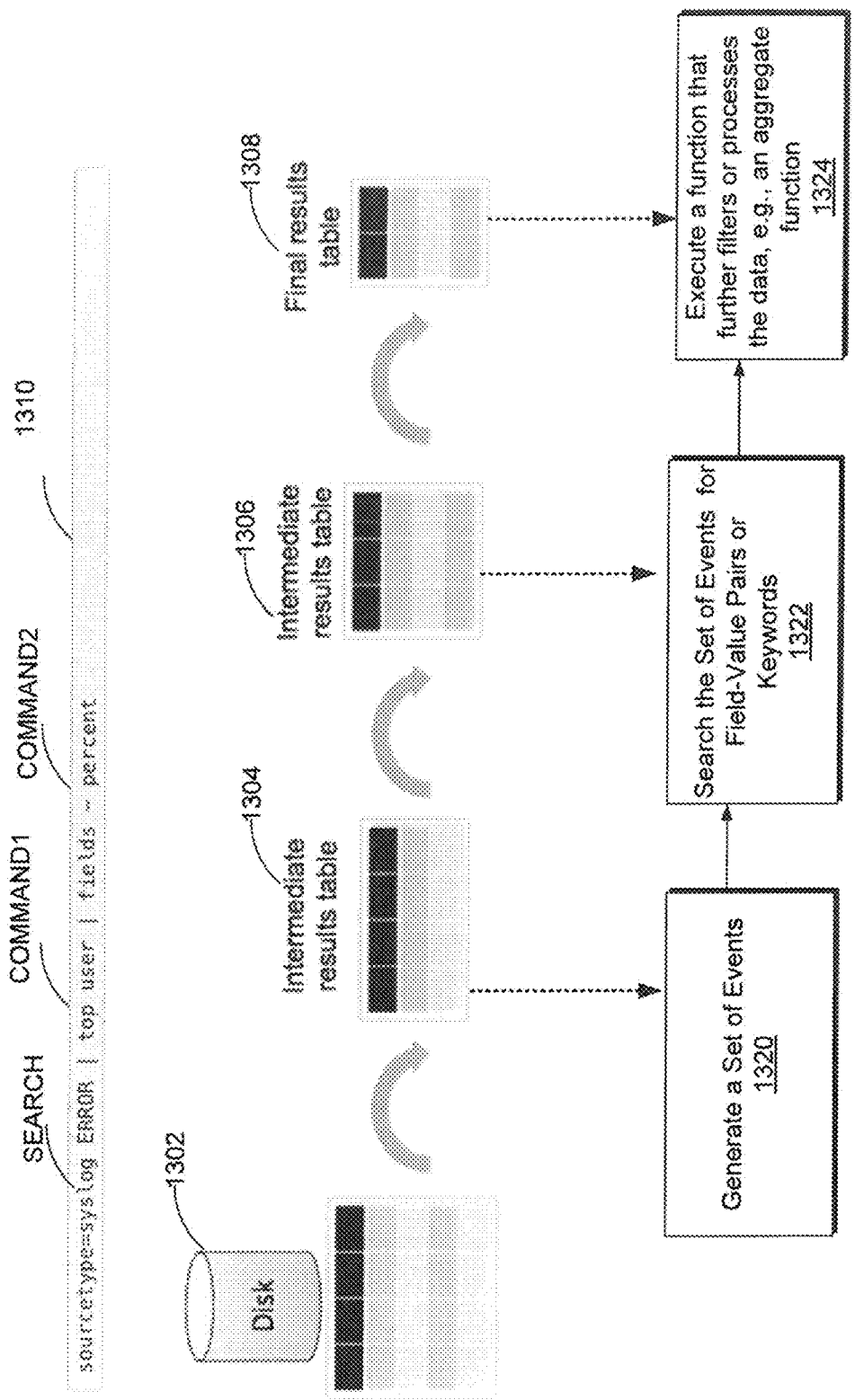
FIG. 13 provides a visual representation of the manner in which a pipelined query language or query operates in accordance with the disclosed embodiments.

FIG. 13 provides a visual representation of the manner in which a pipelined query language or query operates in accordance with the disclosed embodiments. The query 1310 is inputted by the user into the search bar 602. The query comprises a search, the results of which are piped to two commands (namely, command 1 and command 2) that follow the search step.

Disk 1302 represents the event data in the raw record data store, e.g., similar to the event data illustrated in FIG. 12.

When a user query is processed, a search step will precede other query commands in the pipeline in order to generate a set of events at block 1320. For example, the query can comprise search terms "sourcetype =syslog ERROR" at the front of the pipeline as shown in FIG. 13. Intermediate results table 1304 shows fewer rows because it represents the subset of events retrieved from the index that matched the search terms "sourcetype =syslog ERROR" from query command 1310. By way of further example, instead of a search step, the set of events at the head of the pipeline may be generated by a call to a pre-existing inverted index (as will be explained later).

At block 1322, the set of events generated in the first part of the query may be piped to a query that searches the set of events for field-value pairs or for keywords. For example, the second intermediate results table 1306 shows fewer columns, representing the result of the top command, "top user" which summarizes the events into a list of the top 10 users and displays the user, count, and percentage.

Finally, at block 1324, the results of the prior stage can be pipelined to another stage where further filtering or processing of the data can be performed, e.g., preparing the data for display purposes, filtering the data based on a condition, performing a mathematical calculation with the data, etc. As shown in FIG. 13, the "fields-percent" part of command 1310 removes the column that shows the percentage, thereby, leaving a final results table 1308 without a percentage column. In different embodiments, other query languages, such as the Structured Query Language ("SQL"), can be used to create a query.

2.8. Field Extraction Using a Configuration File

The search head 210 allows users to query and visualize event data extracted from raw machine data received from homogenous data sources. It also allows users to query and visualize event data extracted from raw machine data received from heterogeneous data sources. The search head 210 includes various mechanisms, which may additionally reside in an indexer 206, for processing a query.

Figure 14:
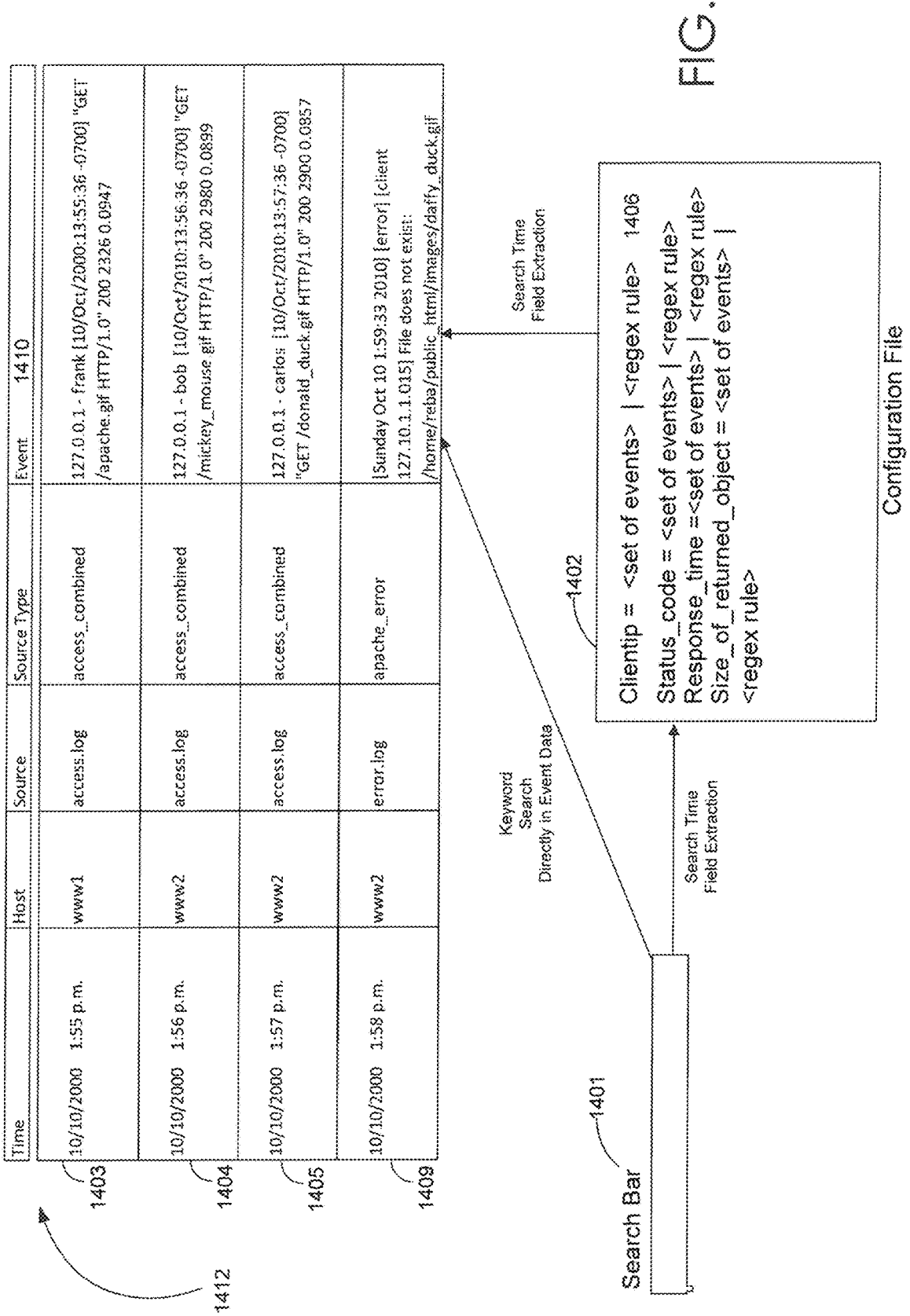
FIG. 14 illustrates the manner in which keyword searches and field searches are processed in accordance with disclosed embodiments.

As mentioned above, the search system enables users to run queries against the stored data to retrieve events that meet criteria specified in a query, such as containing certain keywords or having specific values in defined fields. FIG. 14 illustrates the manner in which keyword searches and field searches are processed in accordance with disclosed embodiments.

If a user inputs a query into search bar 1401 that includes only keywords (also known as "tokens"), e.g., the keyword "error" or "warning", the query engine of the SPLUNK® ENTERPRISE system searches for these keywords directly in the event data 1412 stored in the raw record data store. Note that while FIG. 14 only illustrates four events, the raw record data store (corresponding to data store 208 in FIG. 2) may contain records for millions of events.

As disclosed above, an indexer can optionally generate a keyword index to facilitate fast keyword searching for event data. The indexer includes the identified keywords in an index, which associates each stored keyword with reference pointers to events containing that keyword (or to locations within events where that keyword is located, other location identifiers, etc.). When an indexer subsequently receives a keyword-based query, the indexer can access the keyword index to quickly identify events containing the keyword. For example, if the keyword "HTTP" was indexed by the indexer at index time, and the user searches for the keyword "HTTP", events 1403 to 1405 will be identified based on the results returned from the keyword index. As also noted above, the index contains reference pointers to the events containing the keyword, which allows for efficient retrieval of the relevant events from the raw record data store.

If a user searches for a keyword that has not been indexed by the indexer, the SPLUNK® ENTERPRISE system would nevertheless be able to retrieve the events by searching the event data for the keyword in the raw record data store directly as shown in FIG. 14. For example, if a user searches for the keyword "frank", and the name "frank" has not been indexed at index time, the SPLUNK® ENTERPRISE system will search the event data directly and return the first event 1403. Note that whether the keyword has been indexed at index time or not, in both cases the raw data with the events 1412 is accessed from the raw data record store to service the keyword search. In the case where the keyword has been indexed, the index will contain a reference pointer that will allow for a more efficient retrieval of the event data from the data store. If the keyword has not been indexed, the query engine will need to search through all the records in the data store to service the query.

In most cases, however, in addition to keywords, a user's query will also include fields. The term "field" refers to a location in the event data containing one or more values for a specific data item. Often, a field is a value with a fixed, delimited position on a line, or a name and value pair, where there is a single value to each field name. A field can also be multivalued, that is, it can appear more than once in an event and have a different value for each appearance, e.g., email address fields. Fields are searchable name and value pairings that distinguish one event from another. Some examples of fields are "clientip" for IP addresses accessing a web server, or the "From" and "To" fields in email addresses._

By way of further example, consider the query, "status=404". This query finds events with "status" fields that have a value of "404." When the query is run, the query engine does not look for events with any other "status" value. It also does not look for events containing other fields that share "404" as a value. As a result, the query returns a set of results that are more focused than if "404" had been used in the search string as part of a keyword search. Note also that fields can appear in events as "key=value" pairs such as "user_name=Bob." But in most cases, field values appear in fixed, delimited positions without identifying keys. For example, the data store may contain events where the "user_name" value always appears by itself after the timestamp as illustrated by the following string: "November 15 09:33:22 johnryan."

The SPLUNK® ENTERPRISE system advantageously allows for search time field extraction. Fields can be extracted from the event data at search time using late-binding schema as opposed to at data ingestion time, which was a major limitation of the prior art systems.

In response to receiving the query, search head 210 uses extraction rules to extract values for the fields associated with a field or fields in the event data being queried. The search head 210 obtains extraction rules that specify how to extract a value for certain fields from an event. Extraction rules can comprise regex rules that specify how to extract values for the relevant fields. In addition to specifying how to extract field values, the extraction rules may also include instructions for deriving a field value by performing a function on a character string or value retrieved by the extraction rule. For example, a transformation rule may truncate a character string, or convert the character string into a different data format. In some cases, the query itself can specify one or more extraction rules.

FIG. 14 illustrates the manner in which configuration files may be used to configure custom fields at search time in accordance with the disclosed embodiments. In response to receiving a query, the SPLUNK® ENTERPRISE system determines if the query references a "field." For example, a query may request a list of events where the "clientip" field equals "127.0.0.1." If the query itself does not specify an extraction rule and if the field is not a metadata field, e.g., time, host, source, source type, etc., then in order to determine an extraction rule, the query engine may, in one or more embodiments, need to locate configuration file 1402 during the execution of the query as shown in FIG. 14.

Configuration file 1402 may contain extraction rules for all the various fields that are not metadata fields, e.g., the "clientip" field. The extraction rules may be inserted into the configuration file in a variety of ways. In some embodiments, the extraction rules can comprise regular expression rules that are manually entered in by the user. Regular expressions match patterns of characters in text and are used for extracting custom fields in text.

In one or more embodiments, as noted above, a field extractor may be configured to automatically generate extraction rules for certain field values in the events when the events are being created, indexed, or stored, or possibly at a later time. In one embodiment, a user may be able to dynamically create custom fields by highlighting portions of a sample event that should be extracted as fields using a graphical user interface. The system would then generate a regular expression, which extracts those fields from similar events, and store the regular expression as an extraction rule for the associated field in the configuration file 1402.

In some embodiments, the indexers may automatically discover certain custom fields at index time and the regular expressions for those fields will be automatically generated at index time and stored as part of extraction rules in configuration file 1402. For example, fields that appear in the event data as "key=value" pairs may be automatically extracted as part of an automatic field discovery process. Note that there may be several other ways of adding field definitions to configuration files in addition to the methods discussed herein.

The search head 210 can apply the extraction rules derived from configuration file 1402 to event data that it receives from indexers 206. Indexers 206 may apply the extraction rules from the configuration file to events in an associated data store 208. Extraction rules can be applied to all the events in a data store, or to a subset of the events that have been filtered based on some criteria (e.g., event time stamp values, etc.). Extraction rules can be used to extract one or more values for a field from events by parsing the event data and examining the event data for one or more patterns of characters, numbers, delimiters, etc., that indicate where the field begins and, optionally, ends.

In one more embodiments, the extraction rule in configuration file 1402 will also need to define the type or set of events that the rule applies to. Because the raw record data store will contain events from multiple heterogeneous sources, multiple events may contain the same fields in different locations because of discrepancies in the format of the data generated by the various sources. Furthermore, certain events may not contain a particular field at all. For example, event 1409 also contains "clientip" field, however, the "clientip" field is in a different format from events 1403-1405. To address the discrepancies in the format and content of the different types of events, the configuration file will also need to specify the set of events that an extraction rule applies to, e.g., extraction rule 1406 specifies a rule for filtering by the type of event and contains a regular expression for parsing out the field value. Accordingly, each extraction rule will pertain to only a particular type of event. If a particular field, e.g., "clientip" occurs in multiple events, each of those types of events would need its own corresponding extraction rule in the configuration file 1402 and each of the extraction rules would comprise a different regular expression to parse out the associated field value. The most common way to categorize events is by source type because events generated by a particular source can have the same format.

The field extraction rules stored in configuration file 1402 perform search-time field extractions. For example, for a query that requests a list of events with source type "access_combined" where the "clientip" field equals "127.0.0.1," the query engine would first locate the configuration file 1402 to retrieve extraction rule 1406 that would allow it to extract values associated with the "clientip" field from the event data 1410 "where the source type is "access_combined. After the "clientip" field has been extracted from all the events comprising the "clientip" field where the source type is "access_combined," the query engine can then execute the field criteria by performing the compare operation to filter out the events where the "clientip" field equals "127.0.0.1." In the example shown in FIG. 14, events 1403-1405 would be returned in response to the user query. In this manner, the query engine can service queries containing field criteria in addition to queries containing keyword criteria (as explained above).

The configuration file can be created during indexing. It may either be manually created by the user or automatically generated with certain predetermined field extraction rules. As discussed above, the events may be distributed across several indexers, wherein each indexer may be responsible for storing and querying a subset of the events contained in a corresponding data store. In a distributed indexer system, each indexer would need to maintain a local copy of the configuration file that is synchronized periodically across the various indexers (as described in U.S. application Ser. No. 14/815,973, filed Aug. 1, 2015, entitled "GENERATING AND STORING SUMMARIZATION TABLES FOR SETS OF SEARCHABLE EVENTS" and in U.S. application Ser. No. 15/007,185, filed Jan. 26, 2016, entitled "GENERATING AND STORING SUMMARIZATION TABLES FOR SEARCHABLE EVENTS", both of which are hereby incorporated by reference in their entirety for all purposes).

The ability to add schema to the configuration file at search time results in increased efficiency. A user can create new fields at search time and simply add field definitions to the configuration file. As a user learns more about the data in the events, the user can continue to refine the late-binding schema by adding new fields, deleting fields, or modifying the field extraction rules in the configuration file for use the next time the schema is used by the system. Because the SPLUNK® ENTERPRISE system maintains the underlying raw data and uses late-binding schema for querying the raw data, it enables a user to continue investigating and learn valuable insights about the raw data long after data ingestion time.

The ability to add multiple field definitions to the configuration file at search time also results in increased flexibility. For example, multiple field definitions can be added to the configuration file to capture the same field across events generated by different source types. This allows the SPLUNK® ENTERPRISE system to query and correlate data across heterogeneous sources flexibly and efficiently.

Further, by providing the field definitions for the queried fields at search time, the configuration file 1402 allows the record data store 1402 to be field searchable. In other words, the raw record data store 1402 can be queried using keywords as well as fields, wherein the fields are searchable name/value pairings that distinguish one event from another and can be defined in configuration file 1402 using extraction rules. In comparison to a search containing field names, a keyword search does not need the configuration file and can search the event data directly as shown in FIG. 14.

It should also be noted that any events filtered out by performing a search-time field extraction using a configuration file can be further processed by directing the results of the filtering step to a processing step using a pipelined query language. Using the prior example, a user could pipeline the results of the compare step to an aggregate function by asking the query engine to count the number of events where the "clientip" field equals "127.0.0.1."

Figure 5:
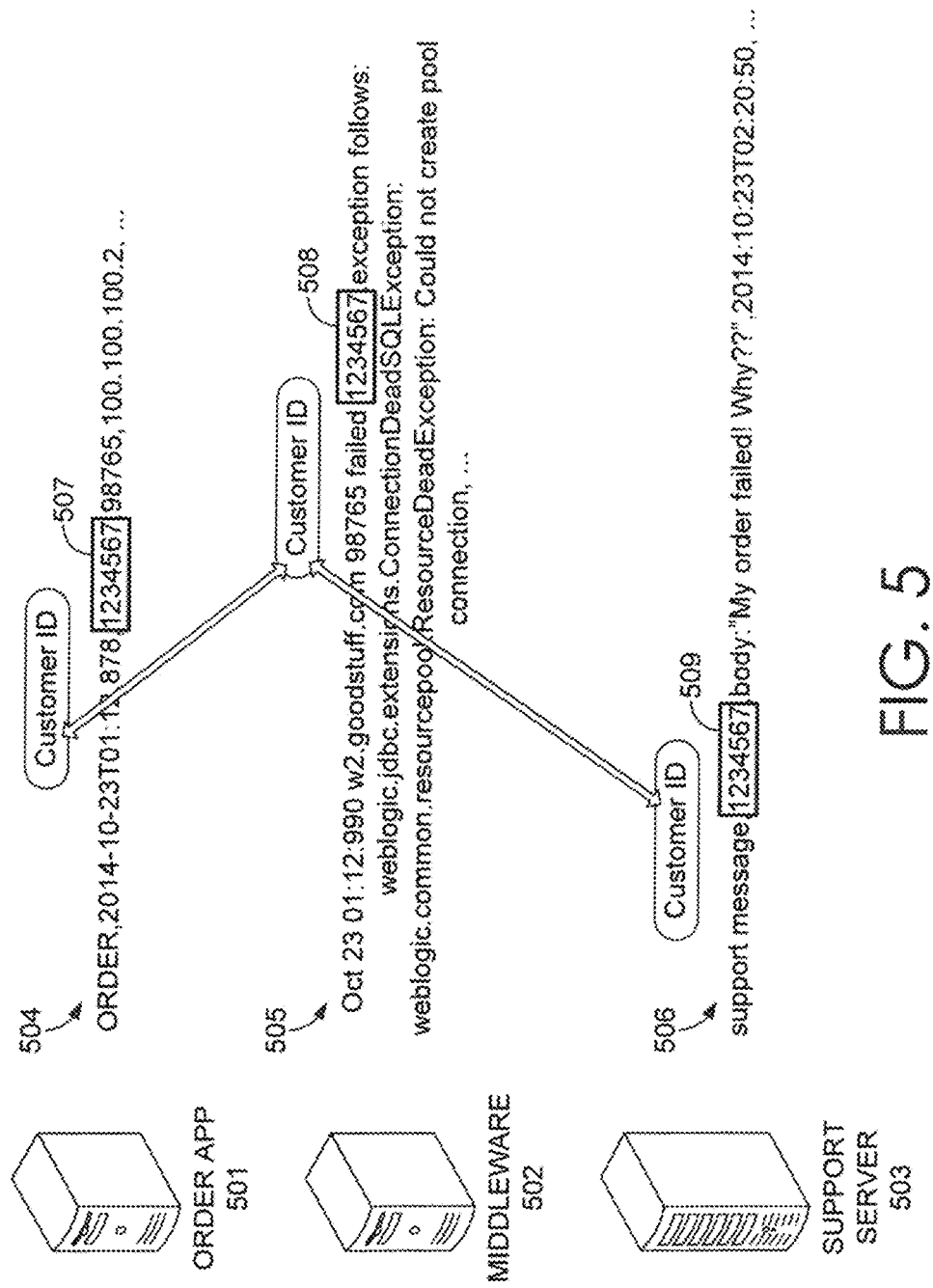
FIG. 5 illustrates a scenario where a common customer ID is found among log data received from three disparate sources in accordance with the disclosed embodiments.

FIG. 5 illustrates an example of raw machine data received from disparate data sources. In this example, a user submits an order for merchandise using a vendor's shopping application program 501 running on the user's system. In this example, the order was not delivered to the vendor's server due to a resource exception at the destination server that is detected by the middleware code 502. The user then sends a message to the customer support 503 to complain about the order failing to complete. The three systems 501, 502, and 503 are disparate systems that do not have a common logging format. The order application 501 sends log data 504 to the SPLUNK® ENTERPRISE system in one format, the middleware code 502 sends error log data 505 in a second format, and the support server 503 sends log data 506 in a third format.

Using the log data received at one or more indexers 206 from the three systems the vendor can uniquely obtain an insight into user activity, user experience, and system behavior. The search head 210 allows the vendor's administrator to query the log data from the three systems that one or more indexers 206 are responsible for querying, thereby obtaining correlated information, such as the order number and corresponding customer ID number of the person placing the order. The system also allows the administrator to see a visualization of related events via a user interface. The administrator can query the search head 210 for customer ID field value matches across the log data from the three systems that are stored at the one or more indexers 206. The customer ID field value exists in the data gathered from the three systems, but the customer ID field value may be located in different areas of the data given differences in the architecture of the systems—there is a semantic relationship between the customer ID field values generated by the three systems. The search head 210 requests event data from the one or more indexers 206 to gather relevant event data from the three systems. It then applies extraction rules to the event data in order to extract field values that it can correlate. The search head may apply a different extraction rule to each set of events from each system when the event data format differs among systems. In this example, the user interface can display to the administrator the event data corresponding to the common customer ID field values 507, 508, and 509, thereby providing the administrator with insight into a customer's experience.

Note that query results can be returned to a client, a search head, or any other system component for further processing. In general, query results may include a set of one or more events, a set of one or more values obtained from the events, a subset of the values, statistics calculated based on the values, a report containing the values, or a visualization, such as a graph or chart, generated from the values.

2.9. Example Search Screen

Figure 6A:
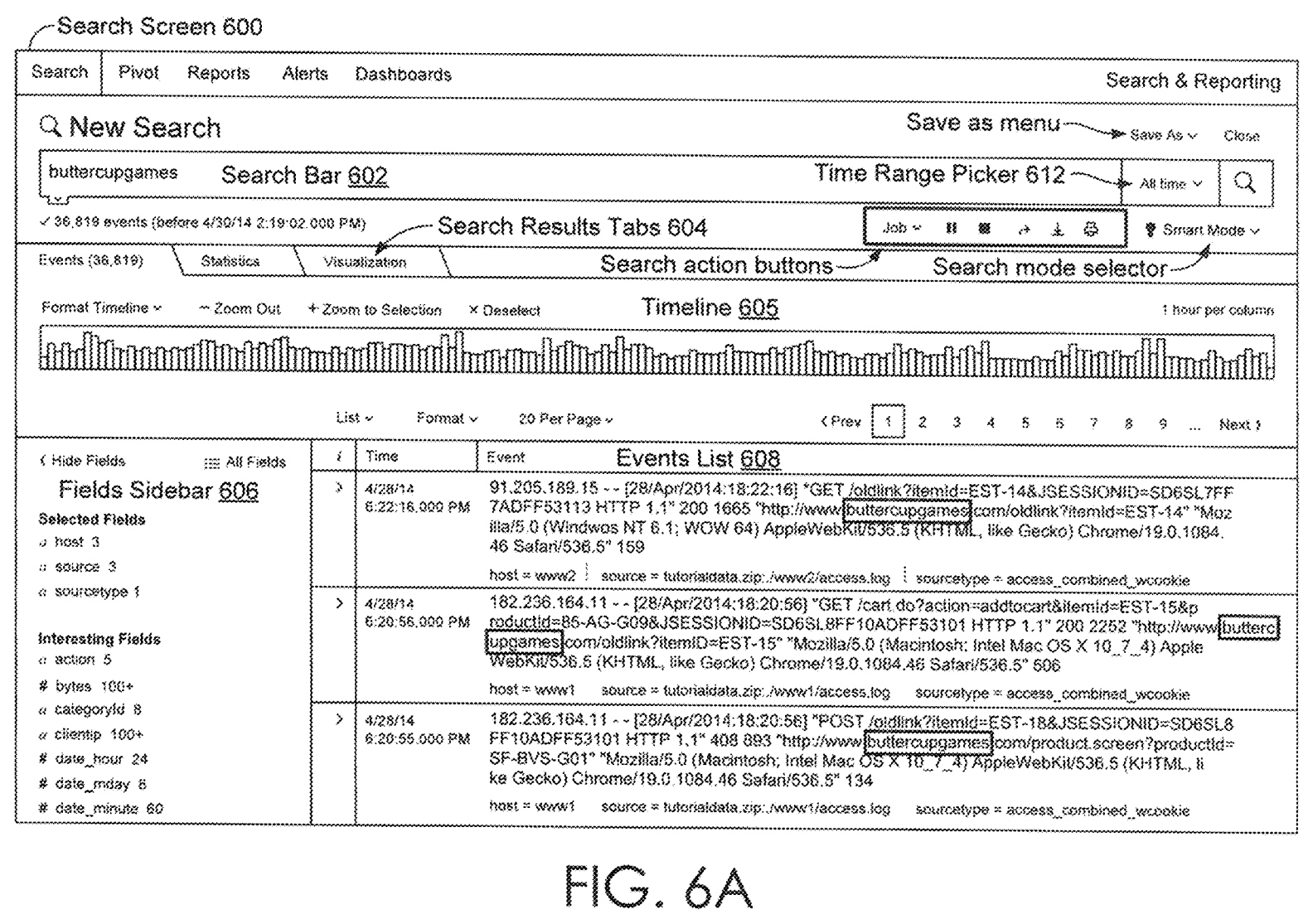

FIG. 6A illustrates an example search screen 600 in accordance with the disclosed embodiments. Search screen 600 includes a search bar 602 that accepts user input in the form of a query string. It also includes a time range picker 612 that enables the user to specify a time range for the query. The SPLUNK® ENTERPRISE system is adept at handling both real-time queries and historical queries. For "historical queries" the user can select a specific time range, or alternatively a relative time range, such as "today," "yesterday" or "last week." For "real-time queries," the user can select the size of a preceding time window to query for real-time events. A "real-time" query can be open-ended, e.g., a query could request any events where the server response time is over 1 second in the last hour and further request that the query results continue to be updated. Search screen 600 also initially displays a "data summary" dialog as is illustrated in FIG. 6B that enables the user to select different sources for the event data, such as by selecting specific hosts and log files.

After the query is executed, the search screen 600 in FIG. 6A can display the results through query results tabs 604, wherein query results tabs 604 includes: an "events tab" that displays various information about events returned by the query; a "statistics tab" that displays statistics about the query results; and a "visualization tab" that displays various visualizations of the query results. The events tab illustrated in FIG. 6A displays a timeline graph 605 that graphically illustrates the number of events that occurred in one-hour intervals over the selected time range. It also displays an events list 608 that enables a user to view the raw data in each of the returned events. It additionally displays a fields sidebar 606 that includes statistics about occurrences of specific fields in the returned events, including "selected fields" that are pre-selected by the user, and "interesting fields" that are automatically selected by the system based on pre-specified criteria.

2.10. Data Models

A data model is a hierarchically structured search-time mapping of semantic knowledge about one or more datasets. It encodes the domain knowledge necessary to build a variety of specialized queries of those datasets. Those queries, in turn, can be used to generate reports.

A data model is composed of one or more "objects" (or "data model objects") that define or otherwise correspond to a specific set of data.

Objects in data models can be arranged hierarchically in parent/child relationships. Each child object represents a subset of the dataset covered by its parent object. The top-level objects in data models are collectively referred to as "root objects."

Child objects have inheritance. Data model objects are defined by characteristics that mostly break down into constraints and attributes. Child objects inherit constraints and attributes from their parent objects and have additional constraints and attributes of their own. Child objects provide a way of filtering events from parent objects. Because a child object always provides an additional constraint in addition to the constraints it has inherited from its parent object, the dataset it represents is always a subset of the dataset that its parent represents.

For example, a first data model object may define a broad set of data pertaining to e-mail activity generally, and another data model object may define specific datasets within the broad dataset, such as a subset of the e-mail data pertaining specifically to e-mails sent. Examples of data models can include electronic mail, authentication, databases, intrusion detection, malware, application state, alerts, compute inventory, network sessions, network traffic, performance, audits, updates, vulnerabilities, etc. Data models and their objects can be designed by knowledge managers in an organization, and they can enable downstream users to quickly focus on a specific set of data. For example, a user can simply select an "e-mail activity" data model object to access a dataset relating to e-mails generally (e.g., sent or received), or select an "e-mails sent" data model object (or data sub-model object) to access a dataset relating to e-mails sent.

A data model object may be defined by (1) a set of search constraints, and (2) a set of fields. Thus, a data model object can be used to quickly query data to identify a set of events and to identify a set of fields to be associated with the set of events. For example, an "e-mails sent" data model object may specify a query for events relating to e-mails that have been sent, and specify a set of fields that are associated with the events. Thus, a user can retrieve and use the "e-mails sent" data model object to quickly query source data for events relating to sent e-mails, and may be provided with a listing of the set of fields relevant to the events in a user interface screen.

A child of the parent data model may be defined by a query (typically a narrower query) that produces a subset of the events that would be produced by the parent data model's query. The child's set of fields can include a subset of the set of fields of the parent data model or additional fields. Data model objects that reference the subsets can be arranged in a hierarchical manner, so that child subsets of events are proper subsets of their parents. A user iteratively applies a model development tool (not shown in FIG.) to prepare a query that defines a subset of events and assigns an object name to that subset. A child subset is created by further limiting a query that generated a parent subset. A late-binding schema of field extraction rules is associated with each object or subset in the data model.

Data definitions in associated schemas can be taken from the common information model (CIM) or can be devised for a particular schema and optionally added to the CIM. Child objects inherit fields from parents and can include fields not present in parents. A model developer can select fewer extraction rules than are available for the sources returned by the query that defines events belonging to a model. Selecting a limited set of extraction rules can be a tool for simplifying and focusing the data model, while allowing a user flexibility to explore the data subset. Development of a data model is further explained in U.S. Pat. Nos. 8,788,525 and 8,788,526, both entitled "DATA MODEL FOR MACHINE DATA FOR SEMANTIC SEARCH", both issued on 22 Jul. 2014, U.S. Pat. No. 8,983,994, entitled "GENERATION OF A DATA MODEL FOR SEARCHING MACHINE DATA", issued on 17 Mar., 2015, U.S. patent application Ser. No. 14/611,232, entitled "GENERATION OF A DATA MODEL APPLIED TO QUERIES", filed on 31 Jan. 2015, and U.S. patent application Ser. No. 14/815,884, entitled "GENERATION OF A DATA MODEL APPLIED TO OBJECT QUERIES", filed on 31 Jul. 2015, each of which is hereby incorporated by reference in its entirety for all purposes. See, also, Knowledge Manager Manual, Build a Data Model, Splunk Enterprise 6.1.3 pp. 150-204 (Aug. 25, 2014).

A data model can also include reports. One or more report formats can be associated with a particular data model and be made available to run against the data model. A user can use child objects to design reports with object datasets that already have extraneous data pre-filtered out. In an embodiment, the data intake and query system 108 provides the user with the ability to produce reports (e.g., a table, chart, visualization, etc.) without having to enter SPL, SQL, or other query language terms into a search screen. Data models are used as the basis for the query feature.

Data models may be selected in a report generation interface. The report generator supports drag-and-drop organization of fields to be summarized in a report. When a model is selected, the fields with available extraction rules are made available for use in the report. The user may refine or filter query results to produce more precise reports. The user may select some fields for organizing the report and select other fields for providing detail according to the report organization. For example, "region" and "salesperson" are fields used for organizing the report and sales data can be summarized (subtotaled and totaled) within this organization. The report generator allows the user to specify one or more fields within events and apply statistical analysis on values extracted from the specified one or more fields. The report generator may aggregate query results across sets of events and generate statistics based on aggregated query results. Building reports using the report generation interface is further explained in U.S. patent application Ser. No. 14/503,335, entitled "GENERATING REPORTS FROM UNSTRUCTURED DATA", filed on 30 Sep. 2014, and which is hereby incorporated by reference in its entirety for all purposes, and in Pivot Manual, Splunk Enterprise 6.1.3 (Aug. 4, 2014). Data visualizations also can be generated in a variety of formats, by reference to the data model. Reports, data visualizations, and data model objects can be saved and associated with the data model for future use. The data model object may be used to perform queries of other data.

Figure 7:
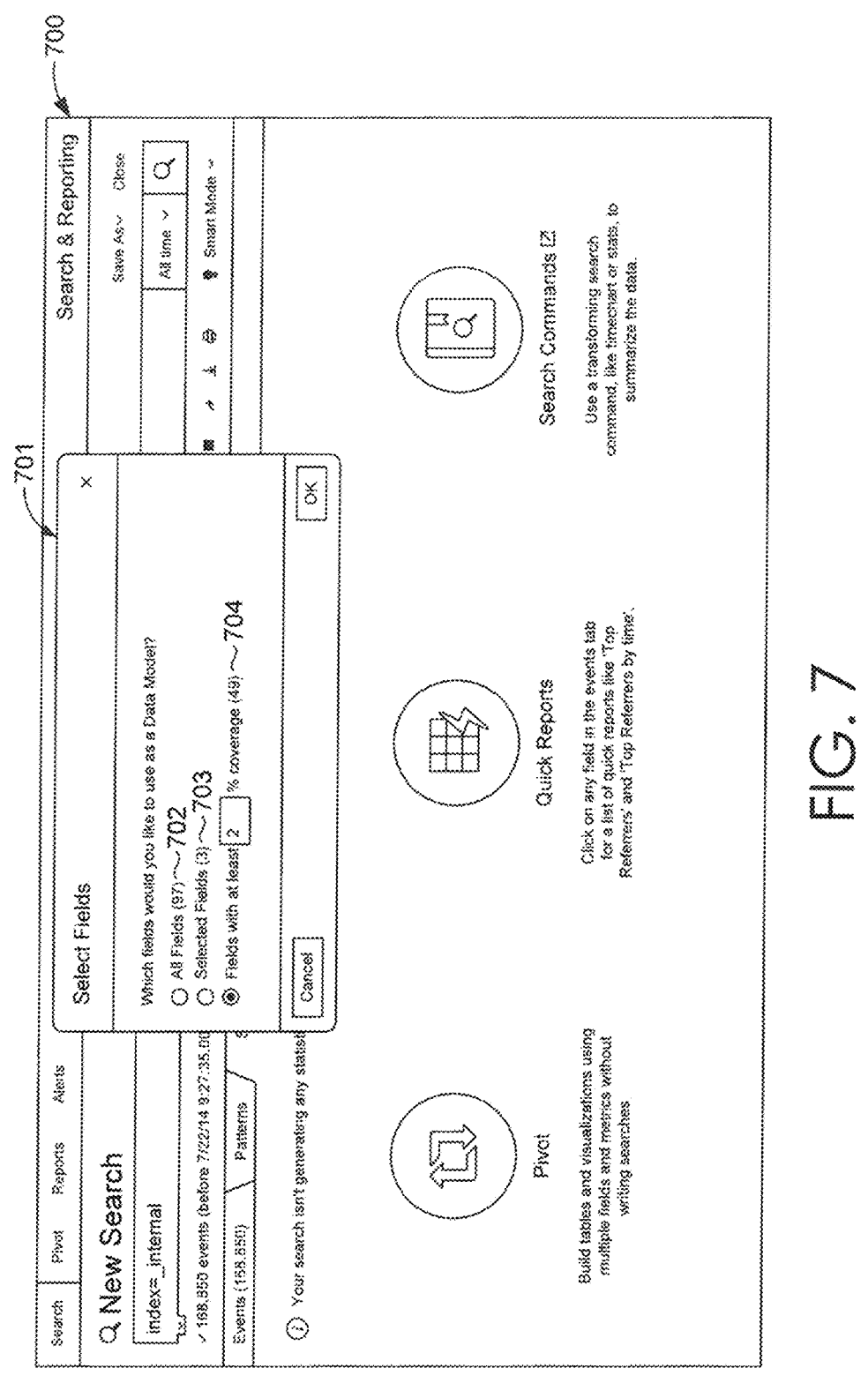

FIG. 7 illustrates a user interface screen where a user may select report generation options using data models. The report generation process may be driven by a predefined data model object, such as a data model object defined or saved via a reporting application or a data model object obtained from another source. A user can load a saved data model object using a report editor. For example, the initial query and fields used to drive the report editor may be obtained from a data model object. The data model object that is used to drive a report generation process may define a query and a set of fields. Upon loading of the data model object, the report generation process may enable a user to use the fields (e.g., the fields defined by the data model object) to define criteria for a report (e.g., filters, split rows/columns, aggregates, etc.) and the query may be used to identify events (e.g., to identify events responsive to the query) used to generate the report. That is, for example, if a data model object is selected to drive a report editor, the graphical user interface of the report editor may enable a user to define reporting criteria for the report using the fields associated with the selected data model object, and the events used to generate the report may be constrained to the events that match, or otherwise satisfy, the query constraints of the selected data model object.

The selection of a data model object for use in driving a report generation may be facilitated by a data model object selection interface.

Once a data model object is selected by the user, a user interface screen 700 shown in FIG. 7 may display an interactive listing of automatic field identification options 701 based on the selected data model object. For example, a user may select one of the three illustrated options (e.g., the "All Fields" option 702, the "Selected Fields" option 703, or the "Coverage" option (e.g., fields with at least a specified % of coverage) 704). If the user selects the "All Fields" option 702, all of the fields identified from the events that were returned in response to an initial query may be selected. That is, for example, all of the fields of the identified data model object fields may be selected. If the user selects the "Selected Fields" option 703, only the fields from the fields of the identified data model object fields that are selected by the user may be used. If the user selects the "Coverage" option 704, only the fields of the identified data model object fields meeting a specified coverage criteria may be selected. A percent coverage may refer to the percentage of events returned by the initial query that a given field appears in. Thus, for example, if an object dataset includes 10,000 events returned in response to an initial query, and the "avg_age" field appears in 854 of those 10,000 events, then the "avg_age" field would have a coverage of 8.54% for that object dataset. If, for example, the user selects the "Coverage" option and specifies a coverage value of 2%, only fields having a coverage value equal to or greater than 2% may be selected. The number of fields corresponding to each selectable option may be displayed in association with each option. For example, "97" displayed next to the "All Fields" option 702 indicates that 97 fields will be selected if the "All Fields" option is selected. The "3" displayed next to the "Selected Fields" option 703 indicates that 3 of the 97 fields will be selected if the "Selected Fields" option is selected. The "49" displayed next to the "Coverage" option 704 indicates that 49 of the 97 fields (e.g., the 49 fields having a coverage of 2% or greater) will be selected if the "Coverage" option is selected. The number of fields corresponding to the "Coverage" option may be dynamically updated based on the specified percent of coverage.

2.11. Acceleration Technique

The above-described system provides significant flexibility by enabling a user to analyze massive quantities of minimally processed data "on the fly" at search time instead of storing pre-specified portions of the data in a database at ingestion time. This flexibility enables a user to see valuable insights, correlate data, and perform subsequent queries to examine interesting aspects of the data that may not have been apparent at ingestion time.

However, performing extraction and analysis operations at search time can involve a large amount of data and require a large number of computational operations, which can cause delays in processing the queries. Advantageously, SPLUNK® ENTERPRISE system employs a number of unique acceleration techniques that have been developed to speed up analysis operations performed at search time. These techniques include: (1) performing query operations in parallel across multiple indexers; (2) using a keyword index; (3) using a high performance analytics store; and (4) accelerating the process of generating reports. These novel techniques are described in more detail below. Note that none of the acceleration techniques are mutually exclusive. They can all be used together in the same system contemporaneously.

2.11.1. Aggregation Technique

Figure 8:
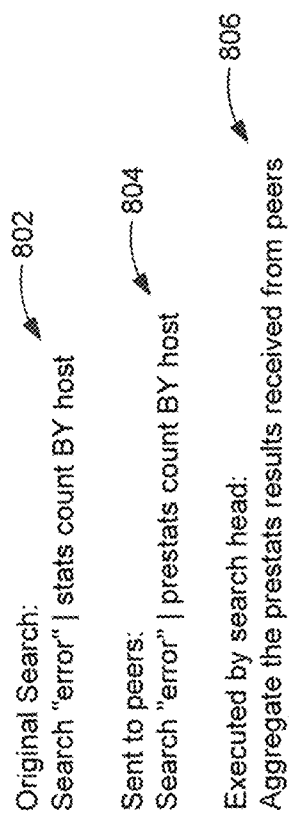
FIG. 8 illustrates an example query received from a client and executed by search peers in accordance with the disclosed embodiments.

To facilitate faster query processing, a query can be structured such that multiple indexers perform the query in parallel, while aggregation of query results from the multiple indexers is performed locally at the search head. For example, FIG. 8 illustrates how a query 802 received from a client at a search head 210 can split into two phases, including: (1) subtasks 804 (e.g., data retrieval or simple filtering) that may be performed in parallel by indexers 206 for execution, and (2) a query results aggregation operation 806 to be executed by the search head when the results are ultimately collected from the indexers.

During operation, upon receiving query 802, a search head 210 determines that a portion of the operations involved with the query may be performed locally by the search head. The search head also determined the portion of the operations that may be distributed to the indexers. Typically, most of the computationally intensive operations will be distributed to the indexers. The search head modifies query 802 by substituting "stats" (create aggregate statistics over results sets received from the indexers at the search head) with "prestats" (create statistics by the indexer from local results set) to produce query 804, and then distributes query 804 to distributed indexers, which are also referred to as "search peers." The multiple indexers operate in parallel and each indexer operates on only a non-overlapping portion of the overall data. Note that queries may generally specify query criteria or operations to be performed on events that meet the query criteria. Queries may also specify field names, as well as search criteria for the values in the fields or operations to be performed on the values in the fields. Moreover, the search head may distribute the full query to the search peers as illustrated in FIG. 4, or may alternatively distribute a modified version (e.g., a more restricted version) of the query to the search peers. In this example, the indexers are responsible for producing the results and sending them to the search head. After the indexers return the results to the search head, the search head aggregates the received results 806 to form a single query result set. In this way, using map-reduce techniques allows each indexer to return partial responses for a subset of events to a search head that combines the results to produce an answer for the query. By executing the query in this manner, the system effectively distributes the computational operations across the indexers while minimizing data transfers.

2.11.2. Keyword Index

As described above with reference to the flow charts in FIG. 3 and FIG. 4, data intake and query system 108 can construct and maintain one or more keyword indexes to quickly identify events containing specific keywords. This technique can greatly speed up the processing of queries involving specific keywords. As mentioned above, to build a keyword index (also known an "tokenizing"), an indexer first identifies a set of keywords. Then, the indexer includes the identified keywords in an index, which associates each stored keyword with references to events containing that keyword, or to locations within events where that keyword is located. When an indexer subsequently receives a keyword-based query, the indexer can access the keyword index to quickly identify events containing the keyword.

2.11.3. High Performance Analytics Store

To speed up certain types of queries, e.g., frequently encountered queries or computationally intensive queries, some embodiments of system 108 create a high performance analytics store, which is referred to as a "summarization table," (also referred to as a "lexicon" or "inverted index") that contains entries for specific field-value pairs. Each of these entries keeps track of instances of a specific value in a specific field in the event data and includes references to events containing the specific value in the specific field. For example, an example entry in an inverted index can keep track of occurrences of the value "94107" in a "ZIP code" field of a set of events and the entry includes references to all of the events that contain the value "94107" in the ZIP code field. Creating the inverted index data structure avoids needing to incur the computational overhead each time a statistical query needs to be run on a frequently encountered field-value pair. In order to expedite queries, in most embodiments, the query engine will employ the inverted index separate from the raw record data store to generate responses to the received queries.

Note that the term "summarization table" or "inverted index" as used herein is a data structure that may be generated by an indexer that includes at least field names and field values that have been extracted and/or indexed from event records. An inverted index may also include reference values that point to the location(s) in the field searchable data store where the event records that include the field may be found. Also, an inverted index may be stored using well-know compression techniques to reduce its storage size.

Further, note that the term "reference value" (also referred to as a "posting value") as used herein is a value that references the location of a source record in the field searchable data store. In some embodiments, the reference value may include additional information about each record, such as timestamps, record size, meta-data, or the like. Each reference value may be a unique identifier which may be used to access the event data directly in the field searachable data store. In some embodiments, the reference values may be ordered based on each event record's timestamp. For example, if numbers are used as identifiers, they may be sorted so event records having a later timestamp always have a lower valued identifier than event records with an earlier timestamp, or vice-versa. Reference values are often included in inverted indexes for retrieving and/or identifying event records.

In one or more embodiments, an inverted index is generated in response to a user-initiated collection query. The term "collection query" as used herein refers to queries that include commands that generate summarization information and inverted indexes (or summarization tables) from event records stored in the field searchable data store.

Note that a collection query is a special type of query that can be user-generated and is used to create an inverted index. A collection query is not the same as a query that is used to call up or invoke a pre-existing inverted index. In one or more embodiment, a query can comprise an initial step that calls up a pre-generated inverted index on which further filtering and processing can be performed. For example, referring back to FIG. 13, a set of events can be generated at block 1320 by either using a "collection" query to create a new inverted index or by calling up a pre-generated inverted index. A query with several pipelined steps will start with a pre-generated index to accelerate the query because creating a new inverted index using a "collection query" can have a high computational overhead.

Figure 15:
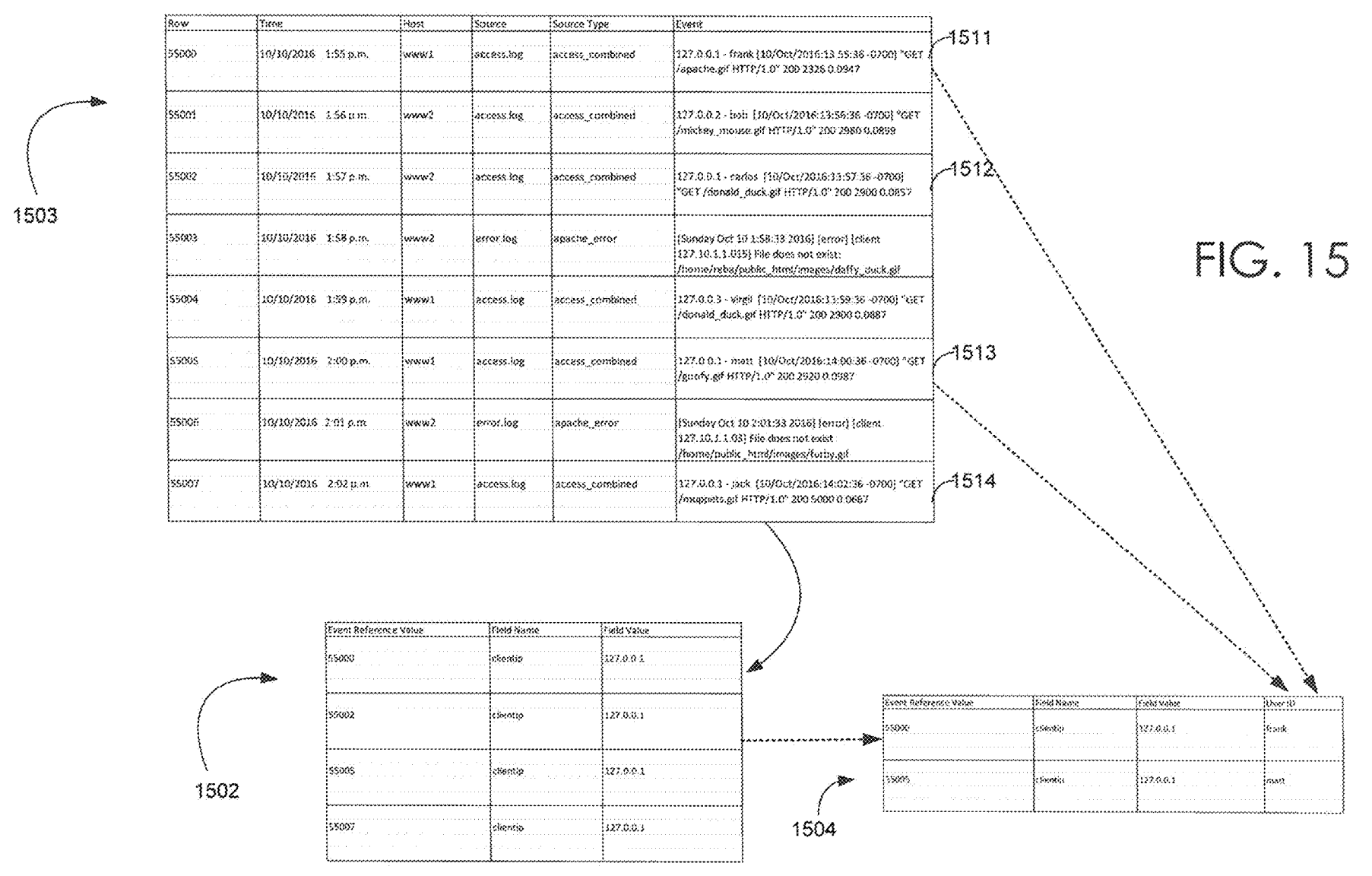

FIG. 15 illustrates the manner in which an inverted index is created and used in accordance with the disclosed embodiments. As shown in FIG. 15, an inverted index 1502 can be created in response to a user-initiated collection query using the event data 1503 stored in the raw record data store. For example, a non-limiting example of a collection query may include "collect clientip=127.0.0.1" which may result in an inverted index 1502 being generated from the event data 1503 as shown in FIG. 15. Each entry in invertex index 1502 inclues an event reference value that references the location of a source record in the field searchable data store. As mentioned above, the reference value may be used to access the original event record directly from the field searchable data store.

Note that while inverted index 1502 is represented in FIG. 15 as comprising a separate entry for each occurrence of a field value pair in the event records, the inverted index data structure is not limited to being represented as such in memory. For example, an inverted index may contain only one entry for each unique field value pair and all the reference values for that particular field value pair may be stored as part of a single entry (e.g. each entry may comprise multiple columns, wherein each column stores a separate reference value corresponding to each occurrence of the particular field value pair within the event records). In other embodiments, the information contained in an inverted index may be represented within a data structure in multiple different ways within memory. Inverted index 1502 provides just one example of a data structure for an inverted index.

In one or more embodiments, if one or more of the queries is a collection query, the responsive indexers may generate summarization information based on the fields of the event records located in the field searchable data store. In at least one of the various embodiments, one or more of the fields used in the summarization information may be listed in the collection query and/or they may be determined based on terms included in the collection query. For example, a collection query may include an explicit list of fields to summarize. Or, in at least one of the various embodiments, a collection query may include terms or expressions that explicitly define the fields, e.g., using regex rules. Referring back to the example in FIG. 15, prior to running the collection query that generates the inverted index 1502, the field name "clientip" may need to be defined in a configuration file by specifying the "access_combined" source type and a regular expression rule to parse out the client IP address. Alternatively, the collection query may contain an explicit definition for the field name "clientip" which may obviate the need to reference the configuration file at search time.

In one or more embodiments, collection queries may be saved and scheduled to run periodically. These scheduled collection queries may periodically update the summarization information corresponding to the query. For example, if the collection query that generates inverted index 1502 is scheduled to run periodically, one or more indexers would periodically search through the relevant buckets to update inverted index 1502 with event data for any new events with the "clientip" vaule of "127.0.0.1."

In some embodiments, the inverted indexes that include fields, values, and reference value (e.g., inverted index 1502) for event records may be included in the summarization information provided to the user. In other embodiments, a user may not be interested in specific fields and values contained in the inverted index, but may need to perform a statistical query on the data in the inverted index. For example, referencing the example of FIG. 15, rather than viewing the fields within summarization table 1502, a user may want to generate a count of all client requests from IP address "127.0.0.1." In this case, the query engine would simply return a result of "4" rather than including details about the invertex index 1502 in the information provided to the user.

The pipelined query language, e.g., SPL of the SPLUNK® ENTERPRISE system can be used to pipe the contents of an inverted index to a statistical query using the "stats" command for example. A "stats" query refers to queries that generate result sets that may produce aggregate and statistical results from event records, e.g., average, mean, max, min, rms, etc. Where sufficient information is available in an inverted index, a "stats" query may generate their result sets rapidly from the summarization information available in the inverted index rather than directly scanning event records. For example, the contents of inverted index 1502 can be pipelined to a stats query, e.g., a "count" function that counts the number of entries in the inverted index and returns a value of "4." In this way, inverted indexes may enable various stats queries to be performed absent scanning or searching the event records. Accordingly, this optimization technique enables the system to quickly process queries that seek to determine how many events have a particular value for a particular field. To this end, the system can examine the entry in the inverted index to count instances of the specific value in the field without having to go through the individual events or perform data extractions at search time.

In some embodiments, the system maintains a separate inverted index for each of the above-described time-specific buckets that stores events for a specific time range. A bucket-specific inverted index includes entries for specific field-value combinations that occur in events in the specific bucket. Alternatively, the system can maintain a separate inverted index for each indexer. The indexer-specific inverted index includes entries for the events in a data store that are managed by the specific indexer. Indexer-specific inverted indexes may also be bucket-specific. In at least one or more embodiments, if one or more of the queries is a stats query, each indexer may generate a partial result set from previously generated summarization information. The partial result sets may be returned to the search head that received the query and combined into a single result set for the query As mentioned above, the inverted index can be populated by running a periodic query that scans a set of events to find instances of a specific field-value combination, or alternatively instances of all field-value combinations for a specific field. A periodic query can be initiated by a user, or can be scheduled to occur automatically at specific time intervals. A periodic query can also be automatically launched in response to a query that asks for a specific field-value combination. In some embodiments, if summarization information is absent from an indexer that includes responsive event records, further actions may be taken, such as, the summarization information may generated on the fly, warnings may be provided the user, the collection query operation may be halted, the absence of summarization information may be ignored, or the like, or combination thereof.

In one or more embodiments, an inverted index may be set up to update continually. For example, the query may ask for the inverted index to update its result periodically, e.g., every hour. In such instances, the inverted index may be a dynamic data structure that is regularly updated to include information regarding incoming events.

In some cases, e.g., where a query is executed before an inverted index updates, when the inverted index may not cover all of the events that are relevant to a query, the system can use the inverted index to obtain partial results for the events that are covered by inverted index, but may also have to search through other events that are not covered by the inverted index to produce additional results on the fly. In other words, an indexer would need to search through event data on the data store to supplement the partial results. These additional results can then be combined with the partial results to produce a final set of results for the query. Note that in typical instances where an inverted index is not completely up to date, the number of events that an indexer would need to search through to supplement the results from the inverted index would be relatively small. In other words, the query to get the most recent results can be quick and efficient because only a small number of event records will be searched through to supplement the information from the inverted index. The inverted index and associated techniques are described in more detail in U.S. Pat. No. 8,682,925, entitled "DISTRIBUTED HIGH PERFORMANCE ANALYTICS STORE", issued on 25 Mar. 2014, U.S. Pat. No. 9,128,985, entitled "SUPPLEMENTING A HIGH PERFORMANCE ANALYTICS STORE WITH EVALUATION OF INDIVIDUAL EVENTS TO RESPOND TO AN EVENT QUERY", filed on 31 Jan. 2014, and U.S. patent application Ser. No. 14/815,973, entitled "STORAGE MEDIUM AND CONTROL DEVICE", filed on 21 Feb. 2014, each of which is hereby incorporated by reference in its entirety.

2.11.3.1 Using Reference Values in an Inverted Index to Retrieve and Extract Further Information from Associated Event Data In one or more embodiments, if the system needs to process all events that have a specific field-value combination, the system can use the references in the inverted index entry to directly access the events to extract further information without having to search all of the events to find the specific field-value combination at search time. In other words, the system can use the reference values to locate the associated event data in the field searchable data store and extract further information from those events, e.g., extract further field values from the events for purposes of filtering or processing or both.

The information extracted from the event data using the reference values can be directed for further filtering or processing in a query using the pipeline query language. The pipelined query language will, in one embodiment, include syntax that can direct the initial filtering step in a query to an inverted index. In one embodiment, a user would include syntax in the query that explicitly directs the initial searching or filtering step to the inverted index.

Referencing the example in FIG. 15, if the user determines that she needs the user id fields associated with the client requests from IP address "127.0.0.1," instead of incurring the computational overhead of performing a brand new query or re-generating the inverted index with an additional field, the user can generate a query that explicitly directs or pipes the contents of the already generated inverted index 1502 to another filtering step requesting the user ids for the entries in inverted index 1502 where the server response time is greater than "0.0900" microseconds. The query engine would use the reference values stored in inverted index 1502 to retrieve the event data from the field searchable data store, filter the results based on the "response time" field values and, further, extract the user id field from the resulting event data to return to the user. In the present instance, the user ids "frank" and "carlos" would be returned to the user from the generated results table 1504.

In one embodiment, the same methodology can be used to pipe the contents of the inverted index to a processing step. In other words, the user is able to use the inverted index to efficiently and quickly perform aggregate functions on field values that were not part of the initially generated inverted index. For example, a user may want to determine an average object size (size of the requested gif) requested by clients from IP address "127.0.0.1." In this case, the query engine would again use the reference values stored in inverted index 1502 to retrieve the event data from the field searchable data store and, further, extract the object size field values from the associated events 1511, 1512, 1513 and 1514. Once, the corresponding object sizes have been extracted (i.e. 2326, 2900, 2920, and 5000), the average can be computed and returned to the user.

In one embodiment, instead of explicitly invoking the inverted index in a user-generated query, e.g., by the use of special commands or syntax, the SPLUNK® ENTERPRISE system can be configured to automatically determine if any prior-generated inverted index can be used to expedite a user query. For example, the user's query may request the average object size (size of the requested gif) requested by clients from IP address "127.0.0.1." without any reference to or use of inverted index 1502. The query engine, in this case, would automatically determine that an inverted index 1502 already exists in the system that could expedite this query. In one embodiment, prior to running any query comprising a field-value pair, for example, a query engine may search though all the existing inverted indexes to determine if a pre-generated inverted index could be used to expedite the query comprising the field-value pair. Accordingly, the query engine would automatically use the pre-generated inverted index, e.g., index 1502 to generate the results without any user-involvement that directs the use of the index.

Using the reference values in an inverted index to be able to directly access the event data in the field searchable data store and extract further information from the associated event data for further filtering and processing is highly advantageous because it avoids incurring the computation overhead of regenerating the inverted index with additional fields or performing a new query.

As explained above, the SPLUNK® ENTERPRISE system includes one or more forwarders that receive raw machine data from a variety of input data sources, and one or more indexers that process and store the data in one or more data stores. By distributing events among the indexers and data stores, the indexers can analyze events for a query in parallel. In one or more embodiments, a multiple indexer implementation of the query system would maintain a separate and respective inverted index for each of the above-described time-specific buckets that stores events for a specific time range. A bucket-specific inverted index includes entries for specific field-value combinations that occur in events in the specific bucket. As explained above, a search head would be able to correlate and synthesize data from across the various buckets and indexers.

This feature advantageously expedites queries because instead of performing a computationally intensive query in a centrally located inverted index that catalogues all the relevant events, an indexer is able to directly query an inverted index stored in a bucket associated with the time-range specified in the query. This allows the query to be performed in parallel across the various indexers. Further, if the query requests further filtering or processing to be conducted on the event data referenced by the locally stored bucket-specific inverted index, the indexer is able to simply access the event records stored in the associated bucket for further filtering and processing instead of needing to access a central repository of event records, which would dramatically add to the computational overhead.

In one embodiment, there may be multiple buckets associated with the time-range specified in a query. If the query is directed to an inverted index, or if the query engine automatically determines that using an inverted index would expedite the processing of the query, the indexers will search through each of the inverted indexes associated with the buckets for the specified time-range. This feature allows the High Performance Analytics Store to be scaled easily.

In certain instances, where a query is executed before a bucket-specific inverted index updates, when the bucket-specific inverted index may not cover all of the events that are relevant to a query, the system can use the bucket-specific inverted index to obtain partial results for the events that are covered by bucket-specific inverted index, but may also have to search through the event data in the bucket associated with the bucket-specific inverted index to produce additional results on the fly. In other words, an indexer would need to search through event data stored in the bucket (that was not yet processed by the indexer for the corresponding inverted index) to supplement the partial results from the bucket-specific inverted index.

2.11.4. Accelerating Report Generation

In some embodiments, a data server system such as the SPLUNK® ENTERPRISE system can accelerate the process of periodically generating updated reports based on query results. To accelerate this process, a summarization engine automatically examines the query to determine whether generation of updated reports can be accelerated by creating intermediate summaries. If reports can be accelerated, the summarization engine periodically generates a summary covering data obtained during a latest non-overlapping time period. For example, where the query seeks events meeting a specified criteria, a summary for the time period includes only events within the time period that meet the specified criteria. Similarly, if the query seeks statistics calculated from the events, such as the number of events that match the specified criteria, then the summary for the time period includes the number of events in the period that match the specified criteria.

In addition to the creation of the summaries, the summarization engine schedules the periodic updating of the report associated with the query. During each scheduled report update, the query engine determines whether intermediate summaries have been generated covering portions of the time period covered by the report update. If so, then the report is generated based on the information contained in the summaries. Also, if additional event data has been received and has not yet been summarized, and is required to generate the complete report, the query can be run on this additional event data. Then, the results returned by this query on the additional event data, along with the partial results obtained from the intermediate summaries, can be combined to generate the updated report. This process is repeated each time the report is updated. Alternatively, if the system stores events in buckets covering specific time ranges, then the summaries can be generated on a bucket-by-bucket basis. Note that producing intermediate summaries can save the work involved in re-running the query for previous time periods, so advantageously only the newer event data needs to be processed while generating an updated report. These report acceleration techniques are described in more detail in U.S. Pat. No. 8,589,403, entitled "COMPRESSED JOURNALING IN EVENT TRACKING FILES FOR METADATA RECOVERY AND REPLICATION", issued on 19 Nov. 2013, U.S. Pat. No. 8,412,696, entitled "REAL TIME SEARCHING AND REPORTING", issued on 2 Apr. 2011, and U.S. Pat. Nos. 8,589,375 and 8,589,432, both also entitled "REAL TIME SEARCHING AND REPORTING", both issued on 19 Nov. 2013, each of which is hereby incorporated by reference in its entirety.

2.12. Security Features

The SPLUNK® ENTERPRISE platform provides various schemas, dashboards and visualizations that simplify developers' task to create applications with additional capabilities. One such application is the SPLUNK® APP FOR ENTERPRISE SECURITY, which performs monitoring and alerting operations and includes analytics to facilitate identifying both known and unknown security threats based on large volumes of data stored by the SPLUNK® ENTERPRISE system. SPLUNK® APP FOR ENTERPRISE SECURITY provides the security practitioner with visibility into security-relevant threats found in the enterprise infrastructure by capturing, monitoring, and reporting on data from enterprise security devices, systems, and applications. Through the use of SPLUNK® ENTERPRISE searching and reporting capabilities, SPLUNK® APP FOR ENTERPRISE SECURITY provides a top-down and bottom-up view of an organization's security posture.

The SPLUNK® APP FOR ENTERPRISE SECURITY leverages SPLUNK® ENTERPRISE search-time normalization techniques, saved queries, and correlation queriesto provide visibility into security-relevant threats and activity and generate notable events for tracking. The App enables the security practitioner to investigate and explore the data to find new or unknown threats that do not follow signature-based patterns.

Conventional Security Information and Event Management (SIEM) systems that lack the infrastructure to effectively store and analyze large volumes of security-related data. Traditional SIEM systems typically use fixed schemas to extract data from pre-defined security-related fields at data ingestion time and storing the extracted data in a relational database. This traditional data extraction process (and associated reduction in data size) that occurs at data ingestion time inevitably hampers future incident investigations that may need original data to determine the root cause of a security issue, or to detect the onset of an impending security threat.

In contrast, the SPLUNK® APP FOR ENTERPRISE SECURITY system stores large volumes of minimally processed security-related data at ingestion time for later retrieval and analysis at search time when a live security threat is being investigated. To facilitate this data retrieval process, the SPLUNK® APP FOR ENTERPRISE SECURITY provides pre-specified schemas for extracting relevant values from the different types of security-related event data and enables a user to define such schemas.

The SPLUNK® APP FOR ENTERPRISE SECURITY can process many types of security-related information. In general, this security-related information can include any information that can be used to identify security threats. For example, the security-related information can include network-related information, such as IP addresses, domain names, asset identifiers, network traffic volume, uniform resource locator strings, and source addresses. The process of detecting security threats for network-related information is further described in U.S. Pat. No. 8,826,434, entitled "SECURITY THREAT DETECTION BASED ON INDICATIONS IN BIG DATA OF ACCESS TO NEWLY REGISTERED DOMAINS", issued on 2 Sep. 2014, U.S. patent application Ser. No. 13/956,252, entitled "INVESTIGATIVE AND DYNAMIC DETECTION OF POTENTIAL SECURITY-THREAT INDICATORS FROM EVENTS IN BIG DATA", filed on 31 Jul. 2013, U.S. patent application Ser. No. 14/445,018, entitled "GRAPHIC DISPLAY OF SECURITY THREATS BASED ON INDICATIONS OF ACCESS TO NEWLY REGISTERED DOMAINS", filed on 28 Jul. 2014, U.S. patent application Ser. No. 14/445,023, entitled "SECURITY THREAT DETECTION OF NEWLY REGISTERED DOMAINS", filed on 28 Jul. 2014, U.S. patent application Ser. No. 14/815,971, entitled "SECURITY THREAT DETECTION USING DOMAIN NAME ACCESSES", filed on 1 Aug. 2015, and U.S. patent application Ser. No. 14/815,972, entitled "SECURITY THREAT DETECTION USING DOMAIN NAME REGISTRATIONS", filed on 1 Aug. 2015, each of which is hereby incorporated by reference in its entirety for all purposes. Security-related information can also include malware infection data and system configuration information, as well as access control information, such as login/logout information and access failure notifications. The security-related information can originate from various sources within a data center, such as hosts, virtual machines, storage devices and sensors. The security-related information can also originate from various sources in a network, such as routers, switches, email servers, proxy servers, gateways, firewalls and intrusion-detection systems.

During operation, the SPLUNK® APP FOR ENTERPRISE SECURITY facilitates detecting "notable events" that are likely to indicate a security threat. These notable events can be detected in a number of ways: (1) a user can notice a correlation in the data and can manually identify a corresponding group of one or more events as "notable;" or (2) a user can define a "correlation queries" specifying criteria for a notable event, and every time one or more events satisfy the criteria, the application can indicate that the one or more events are notable. A user can alternatively select a pre-defined correlation query provided by the application. Note that correlation queries can be run continuously or at regular intervals (e.g., every hour) to search for notable events. Upon detection, notable events can be stored in a dedicated "notable events index," which can be subsequently accessed to generate various visualizations containing security-related information. Also, alerts can be generated to notify system operators when important notable events are discovered.

Figure 9A:
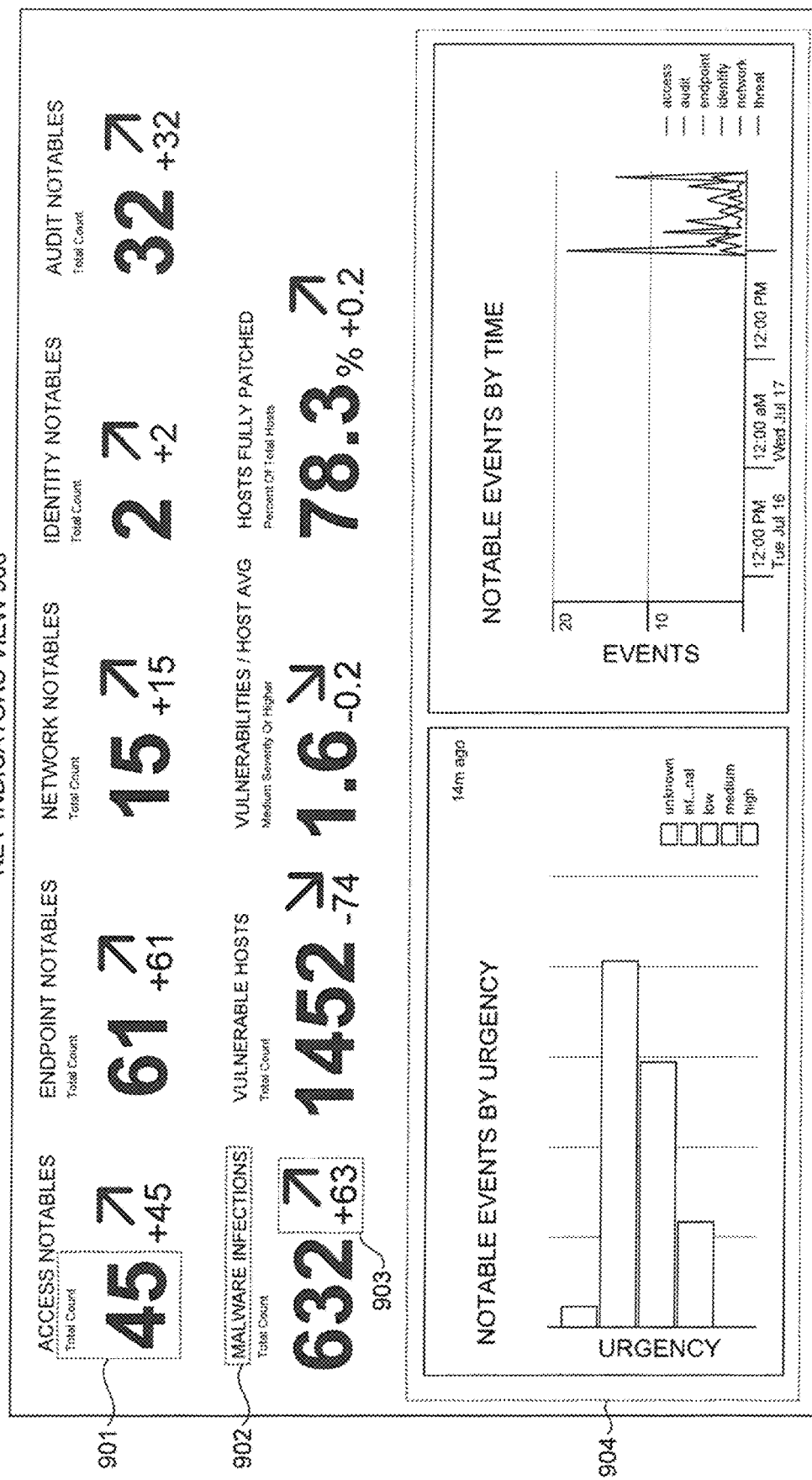
FIG. 9A illustrates a key indicators view in accordance with the disclosed embodiments.

The SPLUNK® APP FOR ENTERPRISE SECURITY provides various visualizations to aid in discovering security threats, such as a "key indicators view" that enables a user to view security metrics, such as counts of different types of notable events. For example, FIG. 9A illustrates an example key indicators view 900 that comprises a dashboard, which can display a value 901, for various security-related metrics, such as malware infections 902. It can also display a change in a metric value 903, which indicates that the number of malware infections increased by 63 during the preceding interval. Key indicators view 900 additionally displays a histogram panel 904 that displays a histogram of notable events organized by urgency values, and a histogram of notable events organized by time intervals. This key indicators view is described in further detail in pending U.S. patent application Ser. No. 13/956,338, entitled "KEY INDICATORS VIEW", filed on 31 Jul. 2013, and which is hereby incorporated by reference in its entirety for all purposes.

Figure 9B:
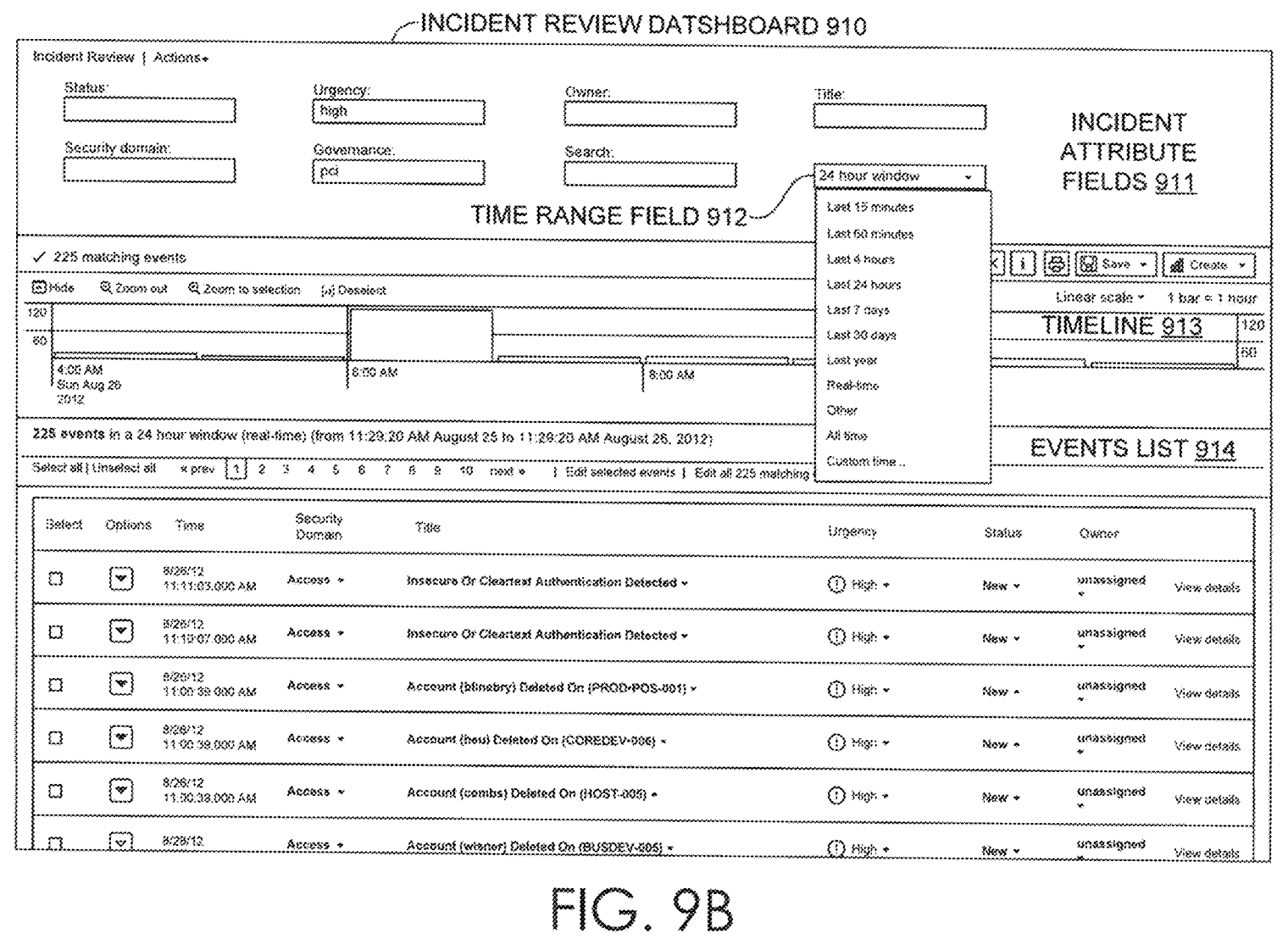

These visualizations can also include an "incident review dashboard" that enables a user to view and act on "notable events." These notable events can include: (1) a single event of high importance, such as any activity from a known web attacker; or (2) multiple events that collectively warrant review, such as a large number of authentication failures on a host followed by a successful authentication. For example, FIG. 9B illustrates an example incident review dashboard 910 that includes a set of incident attribute fields 911 that, for example, enables a user to specify a time range field 912 for the displayed events. It also includes a timeline 913 that graphically illustrates the number of incidents that occurred in time intervals over the selected time range. It additionally displays an events list 914 that enables a user to view a list of all of the notable events that match the criteria in the incident attributes fields 911. To facilitate identifying patterns among the notable events, each notable event can be associated with an urgency value (e.g., low, medium, high, critical), which is indicated in the incident review dashboard. The urgency value for a detected event can be determined based on the severity of the event and the priority of the system component associated with the event.

2.13. Data Center Monitoring

As mentioned above, the SPLUNK® ENTERPRISE platform provides various features that simplify the developers's task to create various applications. One such application is SPLUNK® APP FOR VMWARE® that provides operational visibility into granular performance metrics, logs, tasks and events, and topology from hosts, virtual machines and virtual centers. It empowers administrators with an accurate real-time picture of the health of the environment, proactively identifying performance and capacity bottlenecks.

Conventional data-center-monitoring systems lack the infrastructure to effectively store and analyze large volumes of machine-generated data, such as performance information and log data obtained from the data center. In conventional data-center-monitoring systems, machine-generated data is typically pre-processed prior to being stored, for example, by extracting pre-specified data items and storing them in a database to facilitate subsequent retrieval and analysis at search time. However, the rest of the data is not saved and discarded during pre-processing.

In contrast, the SPLUNK® APP FOR VMWARE® stores large volumes of minimally processed machine data, such as performance information and log data, at ingestion time for later retrieval and analysis at search time when a live performance issue is being investigated. In addition to data obtained from various log files, this performance-related information can include values for performance metrics obtained through an application programming interface (API) provided as part of the vSphere Hypervisor™ system distributed by VMware, Inc. of Palo Alto, Calif. For example, these performance metrics can include: (1) CPU-related performance metrics; (2) disk-related performance metrics; (3) memory-related performance metrics; (4) network-related performance metrics; (5) energy-usage statistics; (6) data-traffic-related performance metrics; (7) overall system availability performance metrics; (8) cluster-related performance metrics; and (9) virtual machine performance statistics. Such performance metrics are described in U.S. patent application Ser. No. 14/167,316, entitled "CORRELATION FOR USER-SELECTED TIME RANGES OF VALUES FOR PERFORMANCE METRICS OF COMPONENTS IN AN INFORMATION-TECHNOLOGY ENVIRONMENT WITH LOG DATA FROM THAT INFORMATION-TECHNOLOGY ENVIRONMENT", filed on 29 Jan. 2014, and which is hereby incorporated by reference in its entirety for all purposes.

To facilitate retrieving information of interest from performance data and log files, the SPLUNK® APP FOR VMWARE® provides pre-specified schemas for extracting relevant values from different types of performance-related event data, and also enables a user to define such schemas.

Figure 9C:
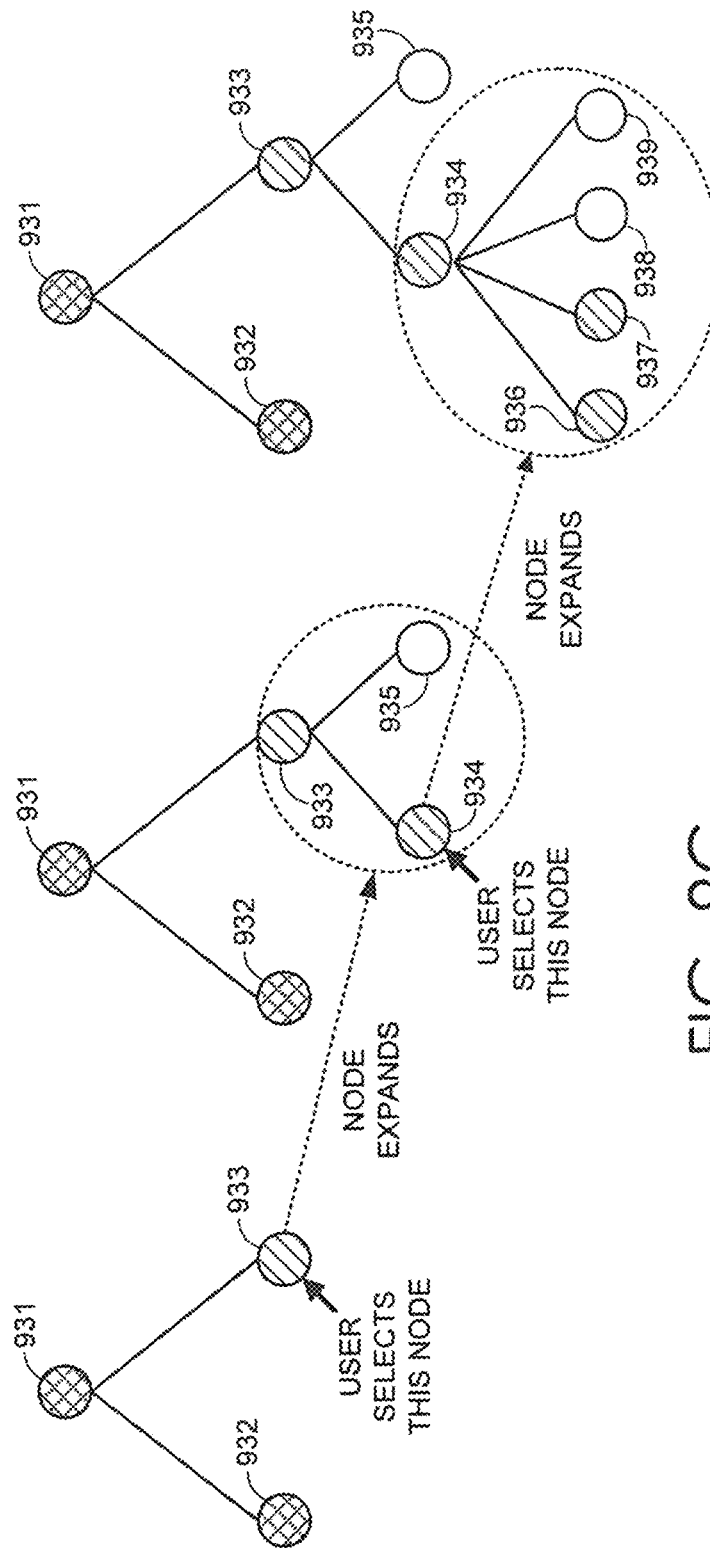
FIG. 9C illustrates a proactive monitoring tree in accordance with the disclosed embodiments.

The SPLUNK® APP FOR VMWARE® additionally provides various visualizations to facilitate detecting and diagnosing the root cause of performance problems. For example, one such visualization is a "proactive monitoring tree" that enables a user to easily view and understand relationships among various factors that affect the performance of a hierarchically structured computing system. This proactive monitoring tree enables a user to easily navigate the hierarchy by selectively expanding nodes representing various entities (e.g., virtual centers or computing clusters) to view performance information for lower-level nodes associated with lower-level entities (e.g., virtual machines or host systems). Example node-expansion operations are illustrated in FIG. 9C, wherein nodes 933 and 934 are selectively expanded. Note that nodes 931-939 can be displayed using different patterns or colors to represent different performance states, such as a critical state, a warning state, a normal state or an unknown/offline state. The ease of navigation provided by selective expansion in combination with the associated performance-state information enables a user to quickly diagnose the root cause of a performance problem. The proactive monitoring tree is described in further detail in U.S. patent application Ser. No. 14/253,490, entitled "PROACTIVE MONITORING TREE WITH SEVERITY STATE SORTING", filed on 15 Apr. 2014, and U.S. patent application Ser. No. 14/812,948, also entitled "PROACTIVE MONITORING TREE WITH SEVERITY STATE SORTING", filed on 29 Jul. 2015, each of which is hereby incorporated by reference in its entirety for all purposes.

Figure 9D:
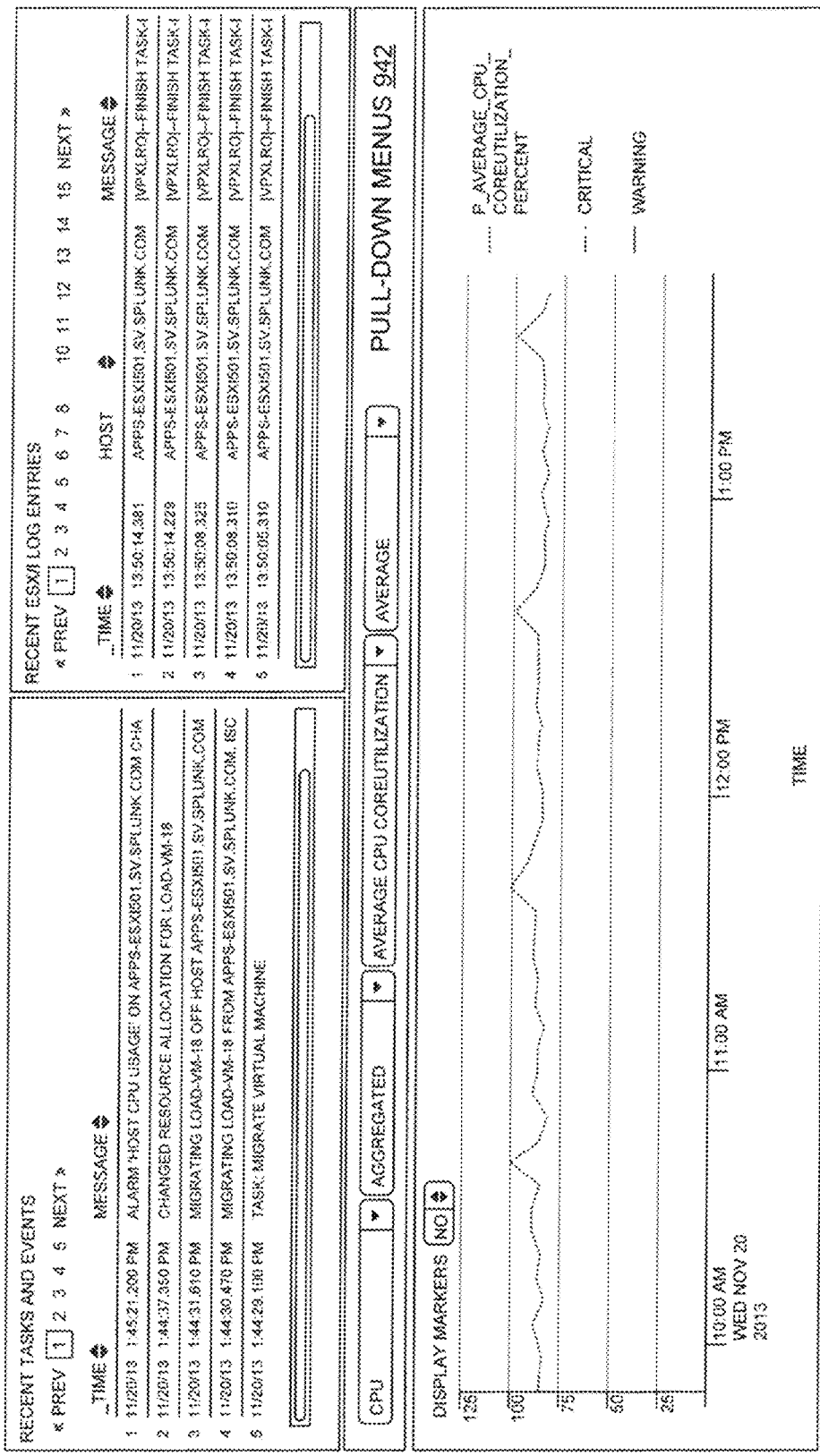
FIG. 9D illustrates a user interface screen displaying both log data and performance data in accordance with the disclosed embodiments.

The SPLUNK® APP FOR VMWARE ® also provides a user interface that enables a user to select a specific time range and then view heterogeneous data comprising events, log data, and associated performance metrics for the selected time range. For example, the screen illustrated in FIG. 9D displays a listing of recent "tasks and events" and a listing of recent "log entries" for a selected time range above a performance-metric graph for "average CPU core utilization" for the selected time range. Note that a user is able to operate pull-down menus 942 to selectively display different performance metric graphs for the selected time range. This enables the user to correlate trends in the performance-metric graph with corresponding event and log data to quickly determine the root cause of a performance problem. This user interface is described in more detail in U.S. patent application Ser. No. 14/167,316, entitled "CORRELATION FOR USER-SELECTED TIME RANGES OF VALUES FOR PERFORMANCE METRICS OF COMPONENTS IN AN INFORMATION-TECHNOLOGY ENVIRONMENT WITH LOG DATA FROM THAT INFORMATION-TECHNOLOGY ENVIRONMENT", filed on 29 Jan. 2014, and which is hereby incorporated by reference in its entirety for all purposes.

2.14. Cloud-Based System Overview

The example data intake and query system 108 described in reference to FIG. 2 comprises several system components, including one or more forwarders, indexers, and search heads. In some environments, a user of a data intake and query system 108 may install and configure, on computing devices owned and operated by the user, one or more software applications that implement some or all of these system components. For example, a user may install a software application on server computers owned by the user and configure each server to operate as one or more of a forwarder, an indexer, a search head, etc. This arrangement generally may be referred to as an "on-premises" solution. That is, the system 108 is installed and operates on computing devices directly controlled by the user of the system. Some users may prefer an on-premises solution because it may provide a greater level of control over the configuration of certain aspects of the system (e.g., security, privacy, standards, controls, etc.). However, other users may instead prefer an arrangement in which the user is not directly responsible for providing and managing the computing devices upon which various components of system 108 operate.

In one embodiment, to provide an alternative to an entirely on-premises environment for system 108, one or more of the components of a data intake and query system instead may be provided as a cloud-based service. In this context, a cloud-based service refers to a service hosted by one more computing resources that are accessible to end users over a network, for example, by using a web browser or other application on a client device to interface with the remote computing resources. For example, a service provider may provide a cloud-based data intake and query system by managing computing resources configured to implement various aspects of the system (e.g., forwarders, indexers, search heads, etc.) and by providing access to the system to end users via a network. Typically, a user may pay a subscription or other fee to use such a service. Each subscribing user of the cloud-based service may be provided with an account that enables the user to configure a customized cloud-based system based on the user's preferences.

Figure 10:
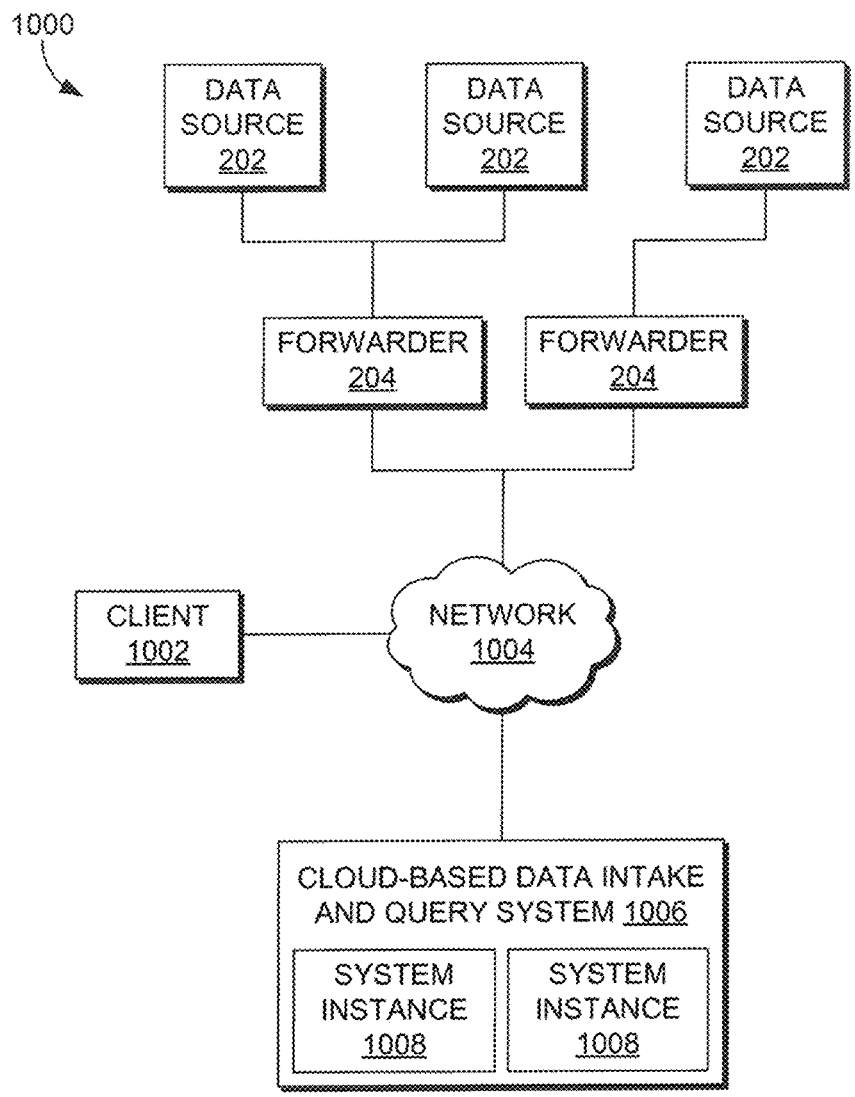
FIG. 10 illustrates a block diagram of an example cloud-based data intake and query system in which an embodiment may be implemented.

FIG. 10 illustrates a block diagram of an example cloud-based data intake and query system. Similar to the system of FIG. 2, the networked computer system 1000 includes input data sources 202 and forwarders 204. These input data sources and forwarders may be in a subscriber's private computing environment. Alternatively, they might be directly managed by the service provider as part of the cloud service. In the example system 1000, one or more forwarders 204 and client devices 1002 are coupled to a cloud-based data intake and query system 1006 via one or more networks 1004. Network 1004 broadly represents one or more LANs, WANs, cellular networks, intranetworks, internetworks, etc., using any of wired, wireless, terrestrial microwave, satellite links, etc., and may include the public Internet, and is used by client devices 1002 and forwarders 204 to access the system 1006. Similar to the system of 108, each of the forwarders 204 may be configured to receive data from an input source and to forward the data to other components of the system 1006 for further processing.

In an embodiment, a cloud-based data intake and query system 1006 may comprise a plurality of system instances 1008. In general, each system instance 1008 may include one or more computing resources managed by a provider of the cloud-based system 1006 made available to a particular subscriber. The computing resources comprising a system instance 1008 may, for example, include one or more servers or other devices configured to implement one or more forwarders, indexers, search heads, and other components of a data intake and query system, similar to system 108. As indicated above, a subscriber may use a web browser or other application of a client device 1002 to access a web portal or other interface that enables the subscriber to configure an instance 1008.

Providing a data intake and query system as described in reference to system 108 as a cloud-based service presents a number of challenges. Each of the components of a system 108 (e.g., forwarders, indexers and search heads) may at times refer to various configuration files stored locally at each component. These configuration files typically may involve some level of user configuration to accommodate particular types of data a user desires to analyze and to account for other user preferences. However, in a cloud-based service context, users typically may not have direct access to the underlying computing resources implementing the various system components (e.g., the computing resources comprising each system instance 1008) and may desire to make such configurations indirectly, for example, using one or more web-based interfaces. Thus, the techniques and systems described herein for providing user interfaces that enable a user to configure source type definitions are applicable to both on-premises and cloud-based service contexts, or some combination thereof (e.g., a hybrid system where both an on-premises environment such as SPLUNK® ENTERPRISE and a cloud-based environment such as SPLUNK CLOUD™ are centrally visible).

2.14.1 Performing Quota Checks Prior to Query Dispatch

Figure 16:
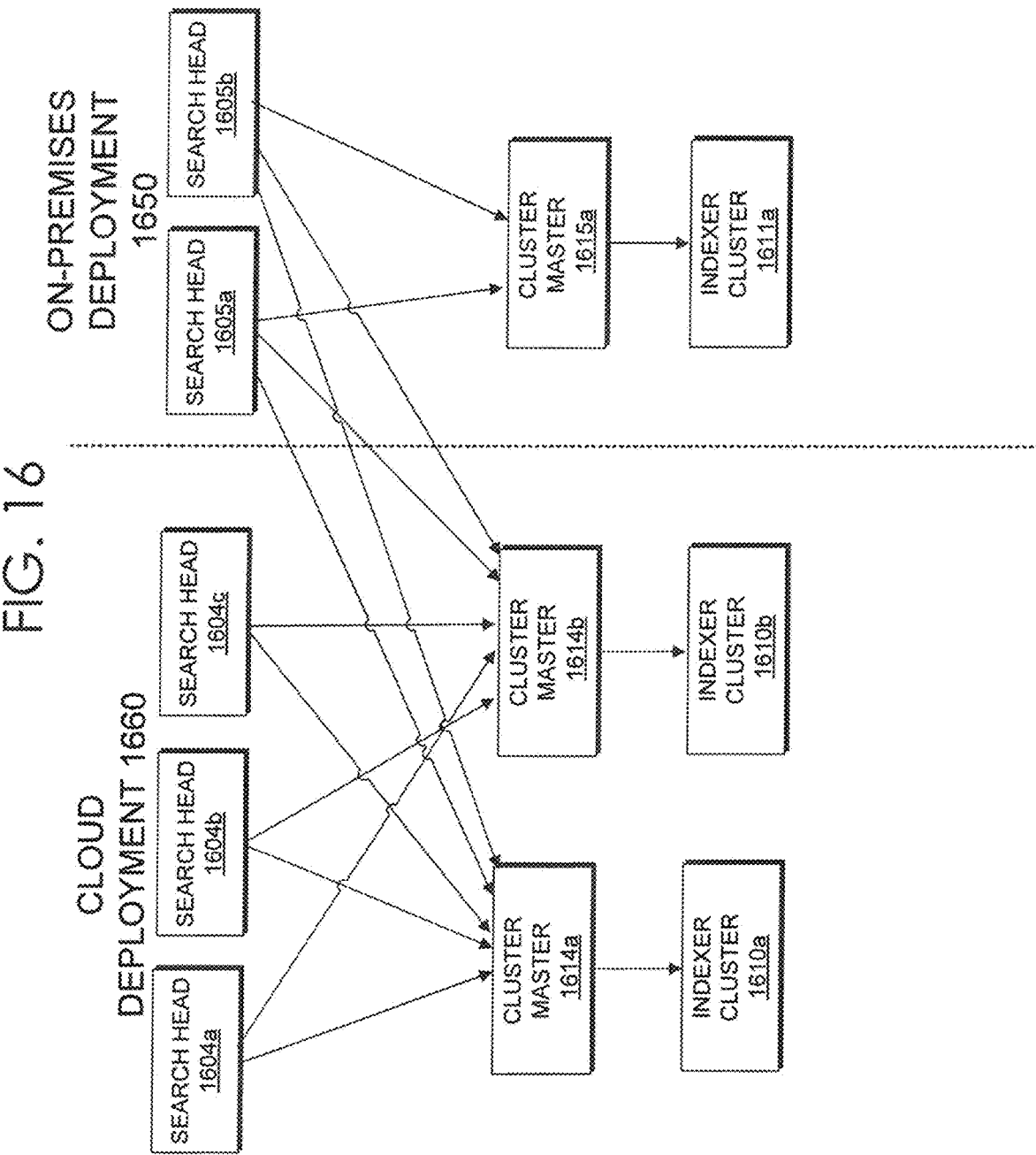
FIG. 16 shows a block diagram of an example of a hybrid deployment that uses a cluster master to protect indexers from high levels of concurrent searches in accordance with the disclosed embodiments.

FIG. 16 shows a block diagram of an example of a hybrid deployment that uses a cluster master that can help protect indexers from high levels of concurrent queries in accordance with the disclosed embodiments. A hybrid system such as the one shown in FIG. 16, as indicated above, can comprise both an on-premises environment such as SPLUNK® ENTERPRISE and a cloud-based environment such as SPLUNK CLOUD™.

As discussed above, a user of a data intake and query system 108 (as shown in FIG. 2) may install or configure, on computing devices owned or operated by the user, one or more software applications that implement, for example, forwarders, a cluster master, search heads and indexers. For example, a user may install a software application on server computers owned by the user and configure each server to operate as one or more of a forwarder, a cluster master, an indexer, a search head, etc. This arrangement generally may be referred to as an "on-premises" solution. As shown in FIG. 16, search heads 1605a and 1605b, indexer cluster 1611a and cluster master 1615a comprise an example of an on-premises solution 1650. Note that search heads 1605a and 1605b may also represent search head clusters (as explained further below), while indexer cluster 1611a may also represent an individual indexer.

An indexer cluster, e.g., indexer cluster 1611a is a cluster of indexers that are associated with one another or with a common cluster master, such as cluster master 1615a. As discussed above, each search head communicates with a master node called a "cluster master" that provides the search head with a list of indexers to which the search head can distribute the portions of a query. The cluster master, e.g., cluster master 1615a can maintain a list of active indexers and can also designate which indexers may have responsibility for responding to queries over certain sets of events. In an embodiment, a search head may communicate with the cluster master before the search head distributes queries to indexers to secure authorization to access the indexers in the indexer cluster or discover the addresses of active indexers.

As illustrated in FIG. 16, in addition to an on-premises environment, the hybrid deployment also comprises a cloud environment 1660. As mentioned earlier in reference to FIG. 10, one or more of the components of a data intake and query system instead may be provided as a cloud-based service. In a cloud-based deployment, such as the deployment 1660 shown in FIG. 16, a service provider may provide a cloud-based data intake and query system by managing computing resources configured to implement various aspects of the system (e.g., forwarders, indexers, search heads, etc.) and by providing access to the system to end users via a network.

As shown in FIG. 16, the cloud environment 1660 of the hybrid deployment comprises search heads 1604a-c, cluster masters 1614a and 1614b, and indexer clusters 1610a and 1610b. Note, that both the cloud and on-premises deployment can be scaled to any number of search heads, cluster masters, indexer clusters, etc. Further, note that search heads 1604a-c may also represent search head clusters, while indexer clusters 1610a-b may also represent individual indexers. The components in the cloud environment may be directly managed by the service provider as part of the cloud service. In other words, the service provider of a data intake and query system 1008 (as shown in FIG. 10) may install and configure, on computing devices, e.g. servers owned and operated by the service provider, one or more software applications that implement, for example, the search heads, cluster master and indexer clusters shown in FIG. 16. A subscriber may use a web browser or other application on a client device, e.g. client device 1002 to access a web portal or other interface that enables the subscriber to, for example, configure the components in the cloud environment or to execute a query on one or more search heads.

Note that in a typical hybrid configuration, the on-premises solution may only comprise one or more search heads, and the indexer cluster and cluster master, e.g., indexer cluster 1611a and cluster master 1615a may reside on the cloud. In some instances, however, if users prefer a greater level of control over the configuration of certain aspects of the system for privacy or security reasons, then the on-premises solution may also comprise indexer cluster and cluster masters as shown in FIG. 16. In most cases, however, users may instead prefer an arrangement in which the user is not directly responsible for providing and managing the indexer clusters and cluster masters.

As discussed in reference to FIGS. 2 and 4, the search head is responsible for performing a query during a search phase. The search head, e.g., search head 210 allows users to query and visualize event data extracted from raw machine data received from various data sources. In an embodiment, the search head analyzes the query to determine what portion(s) of the query can be delegated to indexers and what portions of the query can be executed locally by the search head. The search head distributes the determined portions of the query to the appropriate indexers. Each indexer can return partial responses for a subset of events to the search head that combines the results to produce an answer for the query.

In an embodiment, a search head cluster may take the place of an independent search head where each search head in the search head cluster coordinates with peer search heads in the search head cluster to schedule jobs, replicate query results, update configurations, fulfill query requests, etc. The search head 1604a-c and 1605a-b shown in FIG. 16 can, therefore, represent search head clusters in addition to independent search heads. For example, search head 1605a can represent a sales department search head cluster while search head 1605b may be a security department or IT department search head.

Similarly, indexer clusters can also be assigned to different groups within an organization. For example, indexer cluster 1610a in the cloud can be designated to the sales department for an organization while indexer cluster 1610b can be designated to an IT department for the same organization. In an embodiment, users within an organization may use both indexer clusters in the cloud as well as indexer clusters on premises. For example, a user may use the on-premises indexer cluster 1611a for the sales department if the information is of a confidential nature. Meanwhile, the another user in the same organization may use indexer clusters 1610a and 1610b in the cloud for other departments that do not require high levels of privacy and confidentiality.

Note, that an indexer cluster can also be a common resource that is shared by multiple departments within a single organization or by multiple organizations. A system that allows a single indexer cluster to be shared between multiple organizations can be referred to as a "multi-tenant" deployment. For example, several different organizations may need access to a single indexer cluster.

In hybrid deployments, the search heads and clustered indexers may be under the control of different entities. For example, as shown in FIG. 16, search heads 1605a and 1605b can be part of an on-premises deployment but a user can use search heads 1605a and 1605b to delegate queries to indexer clusters 1610a and 1610b that are part of the cloud deployment. The user may be able to log on to the search heads using a client device to submit the query or the search heads may be configured to allow the user to submit and execute the query directly on the search head.

In various deployments, search heads and search head clusters are protected from high levels of concurrent queries by several layers of quota checks that are performed at the search head prior to query dispatch. For example, a search head may have a limitation on the maximum number of queries that can be run on it or the maximum number of users that can access it at any given time. This, however, does not guarantee protection for the indexer clusters or individual indexers if the environment has multiple search heads that use indexer clusters (or indexers) as a common resource. For example, if a single organization has multiple search heads, each assigned to a different department within the organization, but all the search heads accessed a single indexer cluster (or indexer) to execute queries, quota limitations on the search heads would not protect the indexer cluster. Similarly, in a multi-tenant deployment, if an indexer is being shared by search heads (or search head clusters) in multiple disparate entities or organizations, quota limitations at the individual search head (or search head cluster) would not protect the shared indexer cluster.

One of the issues that typically arises with hybrid deployments is that one or more search heads issuing queries to an indexer cluster (or indexer) can intentionally or unintentionally overload one or more indexer clusters (or indexers), either on-premises or in the cloud, with a high volume of concurrent searches that may be unwanted or unauthorized. Such overloading may have detrimental or catastrophic effects on the performance of the deployment.

For example, in a hybrid deployment, a user may inadvertently misconfigure a search head (that may be located either on-premises or in the cloud) to perform a high number of concurrent queries, thereby, destabilizing the underlying indexer cluster (or indexers) executing the queries, which in most instances would be located in the cloud. Alternatively, a user may also maliciously run a high volume of concurrent searches to intentionally sabotage an indexer cluster that may be in the cloud.

This presents a serious problem for the indexer cluster because it may cause queries for other users (in either the same organization or different organizations) to suspend and indexers to stop communicating. In other words, from the perspective of the other users of the system, queries in progress may be suspended or delayed without providing users with any indication as to the cause of the performance degradation. Therefore, a single inadvertent or intentional query can affect all queries that use the same underlying indexer cluster (or indexers) in the cloud and render the entire deployment unusable for all users.

In hybrid deployments, therefore, especially where the search head is not controlled by the entity as the indexer cluster, the search head (or search head cluster) cannot be trusted to respect query concurrency limits on the indexer clusters (or indexers). Accordingly, a need exists to provide service providers with more control over the query load that is allowed on the indexer clusters (or indexers).

In various embodiments, a search head may communicate with the cluster master before the search head distributes queries to indexers to secure authorization to access the indexers and to discover the addresses of active indexers. In other words, to prevent indexer clusters from potential overloading, the indexer clusters are protected by a stateless cluster master, which includes several layers of quota and bandwidth checks performed by the cluster master prior to allowing a search head to dispatch a query to the indexer cluster. The cluster master is stateless because a service provider may install and configure one or more software applications on any computing devices, e.g., servers owned and operated by the service provider that implement the cluster master. In other words, a computing device, e.g., a server acting as a cluster master can easily be swapped out and replaced by another device running software that allows it to act as the cluster master.

For example, cluster masters 1614a and 1614b may act as gatekeepers for all queries to be executed on indexer clusters 1610a and 1610b respectively. A query will only be dispatched to an indexer cluster (or indexer) if it satisfies the local quota requirements imposed at the individual search head (or search head cluster) and if it satisfies the global quota requirements imposed by a cluster master for its associated indexer cluster. For example, a cluster master may impose a quota related to a maximum number of concurrent queries that can be run on an associated indexer cluster at any given time.

The cluster master, therefore, can be configured to act as a single point of dispatch for any load on a subset of indexer clusters. Search heads would consult the single point of dispatch prior to dispatching a query. A query will be authorized for dispatch by a cluster master if all the global quota requirements are met for the associated indexer cluster. In other words, prior to dispatching a query to the indexer clusters (or indexers), a search head would need authorization from a cluster master associated with the indexer clusters. The authorization can be based on a number of factors, e.g., number of permitted concurrent queries on the indexer clusters, type of queries, time range of queries, resource usage metrics, etc.

As noted previously, the cluster master provides the search head with a list of active indexers in the indexer cluster (including their addresses) to which the search head can distribute the determined portions of the query. The cluster master, e.g., cluster master 1615a maintains a list of active indexers and can also designate which indexers may have responsibility for responding to queries over certain sets of events. In an embodiment, cluster masters communicate with search heads using heartbeat messages, which are periodic messages that are sent from the search head to the cluster master requesting an updated list of indexers available for executing queries.

In response, a cluster master provides a heartbeat response message back to the search head with an updated list of available indexers including their addresses. The cluster master receives periodic heartbeat messages from the associated indexer cluster itself and, therefore, always has updated information regarding available indexers.

In an embodiment, a cluster master uses the response heartbeat message to provide additional information to the search heads regarding policies pertaining to authorizing a query. In other words, as part of the response heartbeat message, the cluster master can periodically respond back with the policies, e.g., related to the global quota requirements, based on which it will authorize a query on the associated indexer cluster. In other words, the cluster master can publish policies at the search head related to running queries. For example, a cluster master can use a heartbeat response message to communicate the manner in which the search head should deal with a query when no more slots are available. It may, for example, inform the search head that it should cancel any requests for which it can find no available slot. Or it may inform the search head that it should queue any queries for which no slots are available.

Figure 17:
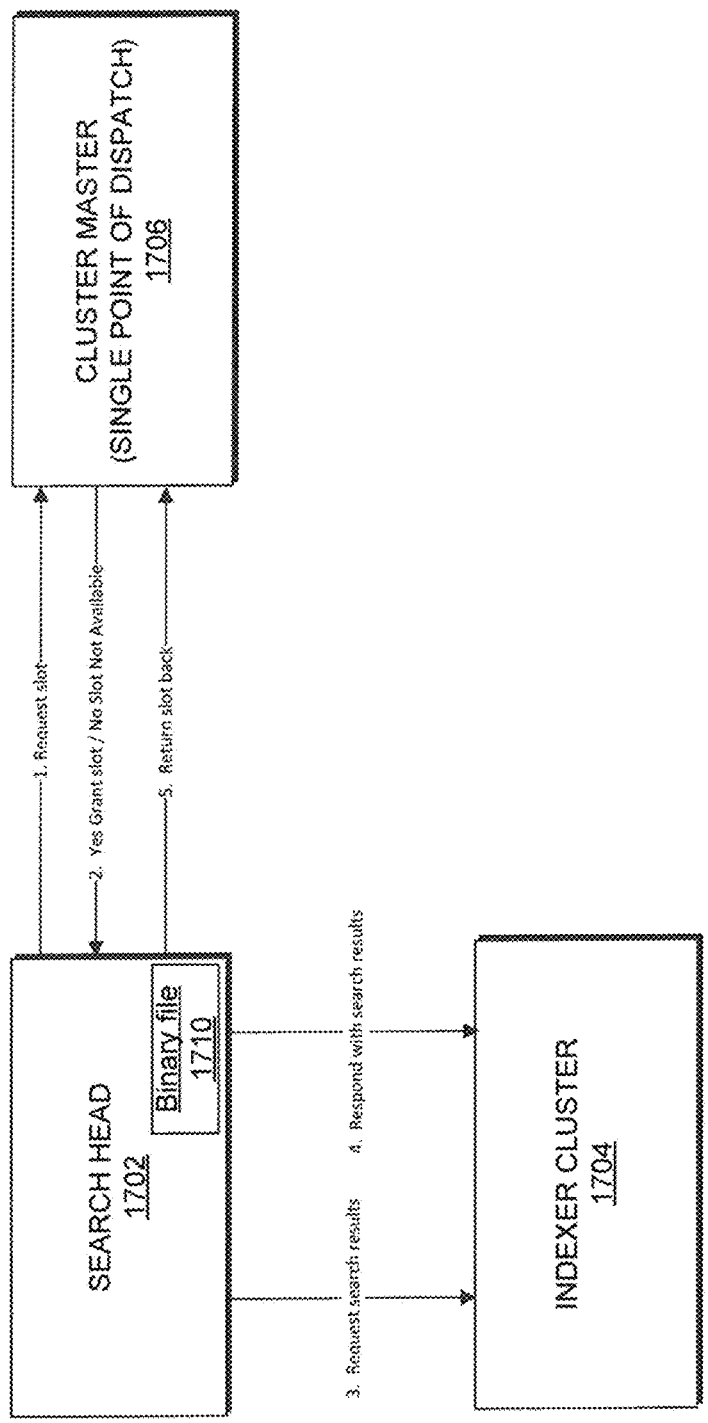
FIG. 17 shows a block diagram illustrating the manner in which a cluster master (or single point of dispatch) is used to authorize an incoming query from a search head in accordance with the disclosed embodiments.

FIG. 17 shows a block diagram illustrating the manner in which a cluster master (or single point of dispatch) is used to authorize an incoming query from a search head in accordance with the disclosed embodiments. When attempting to run a query, a search head 1702 first requests a slot from the cluster master 1706. This request is typically an out of band request and is not part of the synchronous heartbeat messages exchanged between a cluster master and a search head.

In response to receiving the request, the cluster master will evaluate the query and check against all the applicable policies set by a service provider to determine whether or not it should authorize the query request. Based on a review of all the applicable policies, if the query can be authorized and if the indexer cluster associated with the cluster master has capacity to run the query, the cluster master will grant a slot back to the search head along with the addresses of the available indexers in the indexer cluster. In one embodiment, the search head may already have the addresses of the available indexers based on a prior heartbeat response message that provided the list of active indexers and their addresses to the search head. If the query is not authorized or if the indexer cluster does not have capacity to run the query, no slot can be granted at that time and, accordingly, no authorization token would be transmitted to the search head.

Subsequently, the search head will use the information regarding the addresses of the available indexers provided by the cluster master to communicate the query directly to the indexers in the indexer cluster 1704. After the indexer cluster 1704 has responded with the query results, the search head can return the slot back to the cluster master 1706.

Accordingly, the cluster master advantageously ensures that when query loads are high, query throughput of the deployment does not crash down completely. Further, the cluster master also ensures that no configurations are exposed at the search head. For example, no configuration information pertaining to the number of permitted concurrent queries on the indexer clusters, the type of queries, the time range of queries, the resource usage metrics, etc. are exposed at the search head and, therefore, cannot be tampered with intentionally or unintentionally by a client. This prevents rogue search head administrators from misconfiguring the search heads to intentionally harm cloud indexers in a hybrid environment.

Further, the cluster master provides several advantages for multi-tenant deployments as well. For example, the cluster master may be able to provide different levels of service for different organizations. A high-bandwidth demanding organization may be able to receive more slots from a cluster master than an organization that does not have high bandwidth requirements. In other words, the cluster master allows preferential treatment to be provided to high-bandwidth requiring organizations. Further, in multi-tenant environments, the cluster master advantageously allows higher preference to be given to security applications. In other words, if an organization is running queries from security applications, a cluster master can be configured to allocate more slots to such queries.

Another significant advantage of cluster master in multi-tenant deployments is the ability to maintain a centralized history of data access. If multiple tenants are, for example, allowed to search a single repository of data on an indexer cluster, it is beneficial to keep track of which tenants accessed the data at any given point in time. . Previously this information would only be logged on the individual search heads. If an organization chose to clean up all the logs on its search head or just not forward those logs to the indexing layer, this information would be lost. Alternatively, the data on the search heads may easily be tampered with. However, since the cluster master in multi-tenant deployments can advantageously be under the control of the cluster master, the service provider can maintain reasonably trustworthy and accurate accounts of all the users/roles that accessed the data that the service provider was entrusted with.

2.14.1.1 Policy Settings and Enforcement Mode

In one embodiment, the service provider directly manages configurations on the cluster master. For example, configurations related to the type of queries, maximum number of concurrent queries, time range of queries etc. allowed on an associated indexer cluster may be directly programmed into a cluster master by the service provider. Once the service provider has programmed a cluster master with the configurations, the configurations are published to the search heads. However, as mentioned previously, no configurations are exposed at the search head level. In other words, no client or client-side administrator would have control to adjust the configurations for a cluster master at a search head. Therefore, a service provider would retain control over all the global quota configurations for the cluster masters deployed in the cloud.

The cluster master can be statically or dynamically configured by the service provider with various policy settings related to the global quota requirements that are referenced to determine whether a particular query will be dispatched to the cluster. Furthermore, policies can be set dynamically or statically. Exemplary static policies can include limits on the number of concurrent queries that can be executed on an indexer cluster, the frequency with which queries can be executed, etc. The policies may also be set dynamically based on, for example, introspective measurements, e.g., I/O levels, CPU usage etc.

In one embodiment, the number of maximum concurrent queries may be a statically configurable policy on the cluster master. In other words, a cluster master may permit a maximum number of concurrent queries on an associated indexer cluster at any given time on a "first come, first serve" basis. Accordingly, the cluster master may allocate slots (or tokens) to the search heads for running queries based on the number of available slots. For example, cluster master 1614a may permits 100 concurrent queries. If less than 100 queries are concurrently running on indexer cluster 1610a, then additional incoming queries from search heads 1604a-c and 1605a-b would be permitted to receive slots or tokens from the cluster master 1614a for executing the queries on a first come, first serve basis. Subsequent to the execution of the query, the slot or token would be returned by the search head to the cluster master.

In an embodiment, a cluster master may allocate a designated number of slots to each search head from which it receives queries. For example, cluster master 1614a may allocate 50 concurrent query slots for search head 1604a and 100 concurrent query slots for search head 1604b. Search head 1604b may receive additional slots because it may be running a security-related or high priority application. Or, for example, a higher number of slots may be granted to a client with a higher quota priority. The cluster master therefore ensures that users or queries with a higher quota priority will not be affected as would be expected of a multi-tenant deployment.

In one embodiment, the frequency with which queries are allowed to be executed may be another statically configurable policy on the cluster master. As mentioned earlier, collection queries may be saved and scheduled to run periodically. A service provider may configure a cluster master to not allow the results of a scheduled query to update more than a predetermined number of times during a certain time period to prevent extra load from being put on an indexer cluster. This may be especially relevant in cases where the scheduled query is a computationally exhaustive one. Alternatively, a service provider may only want to designate a certain number of slots to run scheduled queries so that slots can be available for users to run new queries using the user interface.

In one embodiment, another statically configurable policy may be provenance. In other words, a service provider may be able to configure a cluster master to impose restrictions or limitations on incoming queries based on the source or the type of queries allowed to be executed.

For example, a query can be an ad hoc query driven by a user inputting a query from a command line interface, e.g., search screen 600 in FIG. 6A includes a search bar 602 that accepts user input in the form of a search string. Alternatively, queries may be driven by an application, e.g., SPLUNK® ENTERPRISE or SPLUNK® APP FOR ENTERPRISE SECURITY. By way of further example, a query may be a "real-time search," which, as explained earlier, can be open-ended, e.g., a query could request any events where the server response time is over 1 second in the last hour and further request that the query results continue to be updated.

A service provider may be able to configure the cluster master to impose limitations on the various types of queries. For example, investigative queries run from the command line interface may be given the highest priority or the greatest number of slots so that a user would never have to wait for a query to be executed. By comparison, a query driven by an application or a real-time query may be given a lower priority or a fewer number of slots. Alternatively, an application query or real-time query may serve a high priority security purpose and a user may, therefore, want to prioritize it over all other queries. Real-time queries can be very computationally intensive, so a service provider may need to adjust the configurations to limit the number of concurrent real-time queries.

As mentioned earlier, the policies may also be set dynamically based on, for example, introspective analysis. In an embodiment, the policies can be set dynamically based on metrics reported in the heartbeat messages between the indexer clusters and the cluster masters. For example, the cluster master could distribute I/O, CPU or memory credits to search heads based on the metrics reported by indexer clusters regarding the I/O, memory or CPU usage for particular types of queries or queries from a particular search head. This would allow the policies of a cluster master to be set dynamically based on introspective measurements regarding the performance of certain types of queries or queries run by certain types of search heads. When a particular search head has run out of I/O, CPU or memory credits, for example, no more queries may be accepted from that search head. For example, a search head may be given enough credits to run 1000 Gbps of I/O and any further requests by the search head may be canceled.

In one embodiment, a dynamically configurable policy may be related to the indexes searched. The cluster master may be configured to limit the indexes that are searchable on a particular indexer cluster based on the information it has gathered about the indexers in the indexer cluster. This would, therefore, prevent a search head from exhaustively searching the entire indexer cluster.

As mentioned earlier, each indexer stores the events with an associated timestamp in a data store. The stored events are organized into "buckets," where each bucket stores events associated with a specific time range based on the timestamps associated with each event. Organizing events into buckets optimizes time-based searching because it allows an indexer to search only the relevant buckets when responding to a query. Further, as mentioned previously, if a bucket comprises old data and is designated as "cold," it can be archived in slower memory. Because the cold buckets may be stored on a hard disk on a separate node, accessing them may result in significant time delay.

In one embodiment, a dynamically configurable policy may limit the number of cold buckets that need to be decompressed in order to execute a query. For example, a query may require decompressing and searching old data that is only available on hard disk. The dynamic policy may be configured to prevent any search heads from running a query that requires decompressing more than a predetermined maximum number of cold buckets containing the requested old data. Alternatively, the policy may queue or delay the execution of such a query.

In an embodiment, an incoming query is evaluated by the cluster master using the static and dynamic policies implemented by the service provider. The response of the search head to an incoming query based on an evaluation of all applicable policies set by a service provider is referred to as an "enforcement mode." As mentioned previously, the cluster master periodically exchanges heartbeat messages with a search head. In one embodiment, a cluster master periodically publishes its enforcement mode to a search head as part of a response heartbeat message. Information regarding the enforcement mode may be stored in a binary file at the search head once the cluster master advertises it to the search head in a response heartbeat message. The search head can use the published enforcement mode from a cluster master to determine how to respond in the event a cluster master does not grant it a slot or if contact cannot be established with the cluster master. In other words, the search head uses the enforcement mode published by the cluster master to determine the manner in which to dispense with a query in the event that a slot request is denied by a cluster master.

In an embodiment, the cluster master is responsible for enforcing the enforcement mode. In other words, the cluster master is responsible for dispensing with a query in the event that a slot cannot be granted. For example, if a slot cannot be granted, the cluster master would be responsible for queuing or dropping the query instead of the search head in accordance with the enforcement mode.

In an embodiment, the cluster master can act as a fail-safe for the search head. If the search head, either as a result of some error (or bug) or malicious tampering of the binary file, attempts to dispatch a query to the indexers in spite of being denied a slot by the cluster master, the cluster master can prevent the search head from dispatching the query. In other words, the cluster master may act as the final authority for enforcing the enforcement mode. As noted above, the cluster master is capable of advertising the enforcement mode at the search head along with the list of available indexers including their addresses. In another embodiment where the cluster master may be programmed to act as a fail-safe, if the cluster master receives an indication that a search head is incapable of reliably enforcing the enforcement mode, it may also withhold the updated list of available indexers including their addresses from the search head.

For example, an enforcement mode can prescribe an action to be taken in the event a slot cannot be granted and, further, can prescribe an action to be taken if no response is received from a cluster master. For example, an enforcement mode can be set to "strong cancel," "weak cancel," "strong queue," and "weak queue." The "cancel" and "queue" component of the enforcement mode is a prescription for an action to be taken when an explicit "No" is received from a cluster master. The "strong" or "weak" component of the enforcement mode prescribes an action to be taken if no response is received at all from the master. For example, an enforcement mode can be set to either a "strong cancel" or a "weak cancel" mode. If a query is not allowed because it exceeds the number of allowed concurrent queries, the cluster master will deny the slot request from the search head. In a strong cancel mode, the search head would not be allowed to dispatch the query at all. In other words, a strong cancel would simply cancel the query request from the search head if any of the policy settings are violated, thereby, providing a strong protection for the indexer clusters. Additionally, in "strong cancel" mode, the query is canceled if no response is received from the cluster master by the search head.

On the other hand, a weak cancel mode may cancel the query if an explicit "No" is received from the cluster master, but if the cluster master does not respond, the weak cancel mode would allow the search head to dispense the query to the active indexers in the cluster. Accordingly, a weak cancel mode may provide weaker protection for the indexer clusters.

By way of further elaboration, the enforcement mode of a cluster master also determines the response strategy of a search head that cannot establish contact with the cluster master. For example, if the search head cannot establish contact with the cluster master to acquire a slot when attempting to execute a query, and the cluster master has previously published to the search head that it is running in strong cancel mode, the search head will simply cancel the query and take no further action. On the other hand, if the search head has information from a heartbeat message that the cluster master is running in weak cancel mode, then it may send the query request directly to the indexer cluster, thereby, circumventing the cluster master. While a service provider may prefer to run the cluster master in strong cancel mode, occasionally, the service provider may be willing to sacrifice performance for availability depending on a client's preference.

Similarly, in a "strong queue" mode, the query will be queued if either an explicit "No" is received from the cluster master or if no response is received from the cluster master. By contrast, in a "weak queue" mode, the query will be queued if an explicit "No" is received from the cluster master. However, if no response is received from the cluster master, the query may be allowed to proceed to the active indexers in the cluster, thereby, circumventing the cluster master.

In an embodiment, variations to the various enforcement modes may also be programmable. For example, different queuing options in "strong queue" or "weak queue" may be configured depending on the type of query. By way of example, a query may be queued only if it is an ad hoc query inputted through a user interface, while other types of queries may simply be dropped. Similarly, the query may be skipped or delayed if it is a scheduled query and has a lower priority level. In an embodiment, a dynamic determination may be made regarding the number of pre-queued items. If the number of queries in the queue is greater than a threshold, the query is canceled. Otherwise it is queued along with the other queries.

The conglomeration of the "enforcement mode" and "policy settings" is referred to as a "configuration policy." The configuration policy of a cluster master will determine the rules of interaction between a cluster master and associated search heads and indexer clusters. In other words, a cluster master will refer to an enabled configuration policy to determine whether or not to grant slots to incoming queries from the search heads to access the associated indexer cluster. Further, a search head will use the enforcement mode published by the cluster master in a heartbeat response message to determine its behavior in the event a slot cannot be granted. However, as mentioned above, in certain embodiments, the cluster master may be responsible for enforcing the enforcement mode rather than the search head.

Figure 18:
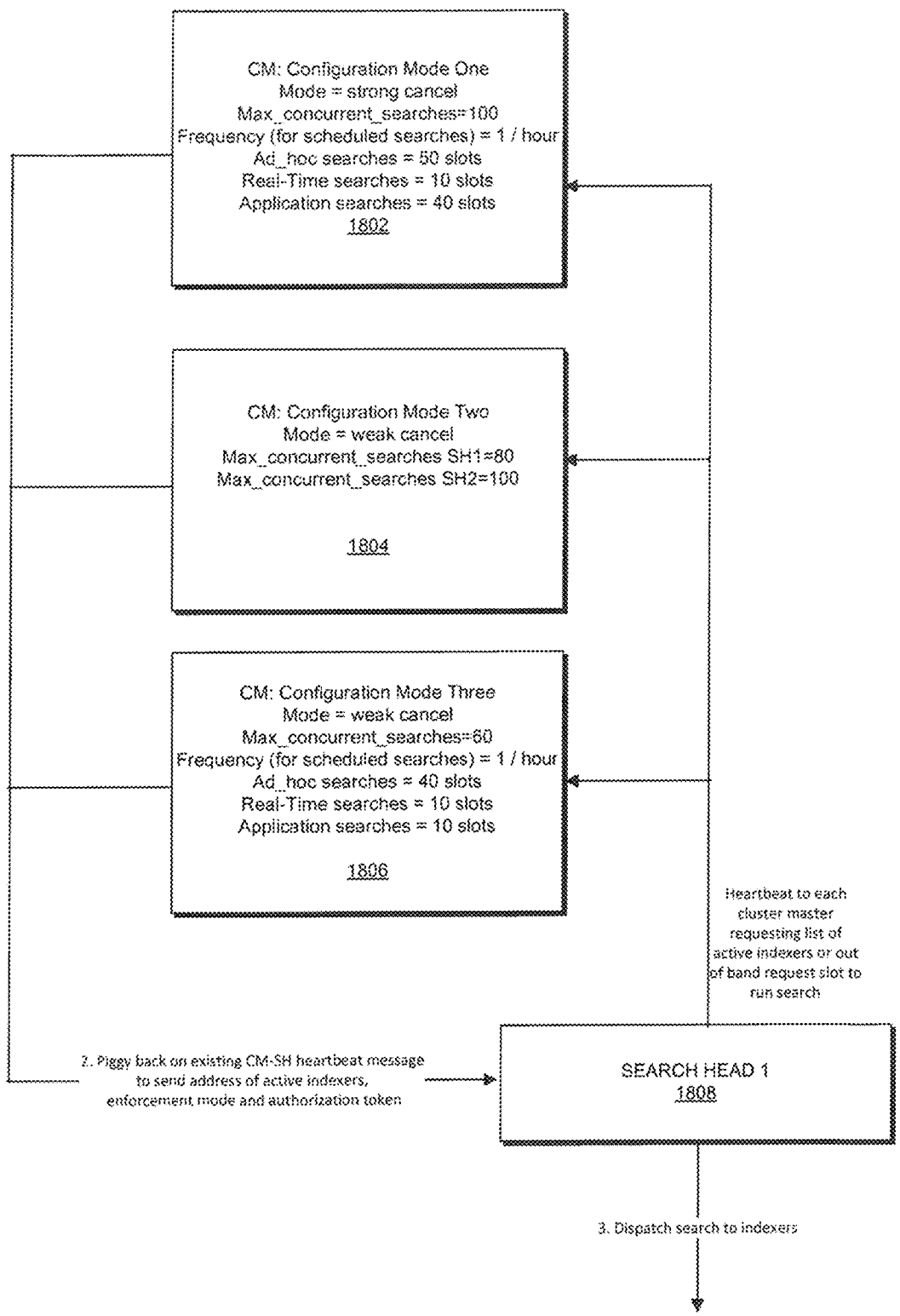
FIG. 18 shows a block diagram illustrating the manner in which heartbeat messages between a cluster master and a query are used to communicate configuration policy information in accordance with the disclosed embodiments.

FIG. 18 shows a block diagram illustrating the manner in which heartbeat messages between a cluster master and a search head are used to communicate configuration policy information in accordance with the disclosed embodiments. As explained previously, in an embodiment, cluster masters communicate with search heads using heartbeat messages, which are periodic messages that are sent from the search head to the cluster master requesting an updated list of indexers available for executing queries. In response, a cluster master provides a heartbeat response message back to the search head with an updated list of active indexers including their addresses. In an embodiment, a cluster master uses the response heartbeat message to provide additional information to the search heads regarding the configuration policy being used by the cluster master.

As shown in FIG. 18, a search head 1808 can send a heartbeat message to a cluster master requesting a list of active indexers. Alternatively, the search head 1808 can send an out of band message to the cluster master requesting a slot to run an incoming query. Any message from the search head requesting a slot typically contains information regarding the query, e.g., the metadata associated with the query, the type of query, the application generating the query, the user running the query, etc. The cluster master typically uses the information received to determine whether or not to grant an authorization token to the search head.

In an embodiment, the cluster master piggybacks on the existing heartbeat response messages sent from a cluster master to a search head to transmit information regarding its enforcement mode and/or authorization tokens for slot grant requests.

FIG. 18 illustrates three exemplary configuration policies that may be available on the cluster master. A service provider may be able to set any of these configuration policies on the cluster master to determine the policies and enforcement mode used by the cluster master in its communications with the search head. The information regarding the configuration policy (and the associated policy and enforcement mode settings) can be published to the search head using the heartbeat response message from the cluster master to the search head. In an embodiment, only the "enforcement mode" may need to be published or advertised at the search head. Note, that while FIG. 18 illustrates only three exemplary modes, the cluster master may have any number of potential configuration policies available.

Configuration policy One 1802 comprises a "strong cancel" mode. Under the "strong cancel" mode, for example, if any of the policies, e.g., Max_concurrent_searches, Frequency, Ad_hoc searches, Real-Time searches or Application searches are not adhered to, the search request by the search head is canceled. For example, if there are already 100 concurrent searches that search head 1808 is running on the cluster master, any additional query will be rejected by the search head. By way of further example, any ad hoc search over 50 will also be rejected. Similarly, any real time query over 10 will be rejected and any application search over 40 will be rejected. Further, if contact cannot be made by the cluster master, the query will be dropped or canceled.

Configuration policy Two 1804 comprises a "weak cancel" mode. Under the "weak cancel" enforcement mode, if any of the policies, e.g., "Max_concurrent_searches" for search head 1 or search head 2 is violated, the query will be canceled if no slot request is granted. For example, if there are 80 concurrent queries already running on search head 1808, any additional incoming query will be canceled. However, if the search head is not able to make contact with the cluster master, then the query may be dispatched to the active indexers in the cluster regardless.

Configuration policy Three 1806 also comprises a "weak cancel" mode. However, as shown in FIG. 16, the policies that dictate the configuration policy are different from the policies that dictate configuration policy 1804.

In an embodiment, when the search head receives the configuration policy (including all the associated policies and enforcement mode information) as part of a heartbeat response from the cluster master, it incorporates the information into a binary file 1710 within the search head (as shown in FIG. 17). Accordingly, the cluster master publishes the configuration policy information to the search head and enforces the configuration policy by hard-coding the configuration policy information inside a binary within the search head. Because the information is hard-coded within a binary, a client-side user of the search head is not exposed to any configuration information. Accordingly, a client-side user has no control over the configuration policy of the cluster master or the underlying indexer cluster.

The search head uses the configuration policy information hard-coded within the binary 1710 to determine the manner in which to interact with the cluster master in order to secure a slot for performing the query. For example, if a search head is not able to contact the cluster master and is configured with a "strong cancel" enforcement mode, it will simply cancel the query. Similarly, if a "weak cancel" enforcement mode is hard-coded within the binary file at the search head, the search head would know to dispatch a query to the indexers even if no contact can be established with the cluster master.

In an embodiment, as part of a heartbeat message from a search head to a cluster master, the search head has to report its version to the cluster master. If a cluster master determines that the search head has not been updated and cannot be configured with the policy and enforcement mode settings, it may refuse to give the out-of-date search head access to the underlying indexer cluster. Or it may not provide the out-of-date search head with a list of the active indexers.

In an embodiment, if one of the policies is violated or if the search head is not able to make connection with the cluster master, the search head will publish an alert to the client-side user, either at the search head or on a client-side terminal connected to the search head, with a message explaining the failure. For example, if a search head is not able to get a slot because the maximum number of concurrent searches has been exceeded, the user may receive an alert on the user interface containing information regarding the policy that was in violation. In a different embodiment, the client is not exposed to the policy that is violated and simply receives an error message.

In an embodiment, if a cluster master malfunctions or needs to be upgraded, the configuration policy of the cluster master can be changed to "null." Because the cluster master uses a publishing model and publishes its policies to the search head, it can communicate the "null" policy to the search head in a heartbeat response message. Accordingly, the cluster master can advantageously apprise all search heads associated with it that effectively no configuration policy needs to be followed. This avoids the problem of queries suspending in the event that the cluster master becomes a single point of failure. If the cluster master sets the configuration policy to "null", the search heads can be configured to access the associated indexers or indexer clusters directly, thereby, circumventing the cluster master while it is being upgraded or repaired.

Figure 19:
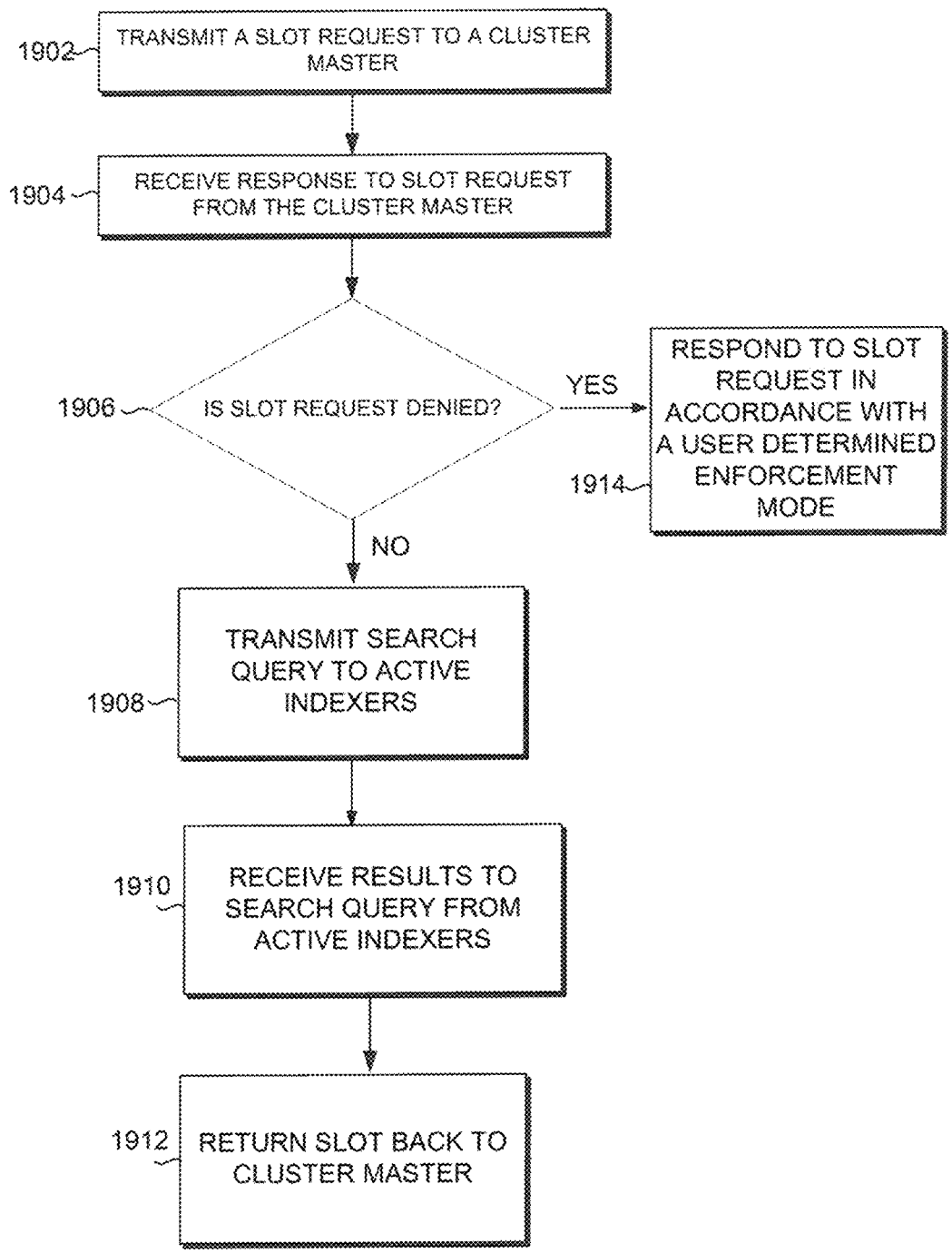
FIG. 19 presents a flowchart illustrating an exemplary process in which a search head secures authorization from a cluster master prior to dispatching a query in accordance with the disclosed embodiments.

FIG. 19 presents a flowchart illustrating an exemplary process in which a search head secures authorization from a cluster master prior to dispatching a query in accordance with the disclosed embodiments.

At step 1902, the search head transmits a slot request to the cluster master. This request is typically an out of band request. In response to receiving the request, the cluster master will evaluate the query and check against all the applicable policies set by a service provider to determine whether or not it should authorize the query request.

Based on a review of all the applicable policies, the cluster master will respond and the search head will receive the response at step 1904. If the query can be authorized and if the indexer cluster associated with the cluster master has capacity to run the query, the cluster master will grant a slot back to the search head along with the addresses of the available indexers in the indexer cluster. If the query is not authorized or if the indexer cluster does not have capacity to run the query, no slot can be granted at that time to the search head.

If the slot request is denied, then at step 1914, the search head will check the enforcement mode that is hard-coded to determine how it should respond to the denial of the request. For example, if a "strong cancel" enforcement mode is hard-coded inside its binary, it will cancel the request completely even where no contact can be established with the cluster master. On the other hand, if a "weak cancel" mode will result in the query being dispatched if no contact can be established with the master.

If the slot is granted by the cluster master, the search head will receive an authorization token and a list of active indexers including their addresses. The search head will then transmit the query to the active indexers using the addresses received from the cluster master at step 1908. In an embodiment, the cluster mater keeps track of the search heads that have been provided authorization tokens. In other words, the cluster master maintains a reservation of the authorization token for the search head while the query is being run on the active indexers.

At step 1910, the search head receives the query results back from the active indexers.

Finally, at step 1912, the search head releases the slot back to the cluster master. The cluster master can then revoke the reservation of the authorization token.

2.15. Searching Externally Archived Data

FIG. 11 shows a block diagram of an example of a data intake and query system 108 that provides transparent query facilities for data systems that are external to the data intake and query system. Such facilities are available in the HUNK® system provided by Splunk Inc. of San Francisco, Calif. HUNK® represents an analytics platform that enables business and IT teams to rapidly explore, analyze, and visualize data in Hadoop and NoSQL data stores.

The search head 210 of the data intake and query system receives search requests from one or more client devices 1104 over network connections 1120. As discussed above, the data intake and query system 108 may reside in an enterprise location, in the cloud, etc. FIG. 11 illustrates that multiple client devices 1104a, 1104b, . . . , 1104n may communicate with the data intake and query system 108. The client devices 1104 may communicate with the data intake and query system using a variety of connections. For example, one client device in FIG. 11 is illustrated as communicating over an Internet (Web) protocol, another client device is illustrated as communicating via a command line interface, and another client device is illustrated as communicating via a system developer kit (SDK).

The search head 210 analyzes the received query request to identify request parameters. If a query request received from one of the client devices 1104 references an index maintained by the data intake and query system, then the search head 210 connects to one or more indexers 206 of the data intake and query system for the index referenced in the request parameters. That is, if the request parameters of the query request reference an index, then the search head accesses the data in the index via the indexer. The data intake and query system 108 may include one or more indexers 206, depending on system access resources and requirements. As described further below, the indexers 206 retrieve data from their respective local data stores 208 as specified in the query request. The indexers and their respective data stores can comprise one or more storage devices and typically reside on the same system, though they may be connected via a local network connection.

If the request parameters of the received query request reference an external data collection, which is not accessible to the indexers 206 or under the management of the data intake and query system, then the search head 210 can access the external data collection through an External Result Provider (ERP) process 1110. An external data collection may be referred to as a "virtual index" (plural, "virtual indexes"). An ERP process provides an interface through which the search head 210 may access virtual indexes.

Thus, a query reference to an index of the system relates to a locally stored and managed data collection. In contrast, a query reference to a virtual index relates to an externally stored and managed data collection, which the search head may access through one or more ERP processes 1110, 1112. FIG. 11 shows two ERP processes 1110, 1112 that connect to respective remote (external) virtual indexes, which are indicated as a Hadoop or another system 1114 (e.g., Amazon S3, Amazon EMR, other Hadoop Compatible File Systems (HCFS), etc.) and a relational database management system (RDBMS) 1116. Other virtual indexes may include other file organizations and protocols, such as Structured Query Language (SQL) and the like. The ellipses between the ERP processes 1110, 1112 indicate optional additional ERP processes of the data intake and query system 108. An ERP process may be a computer process that is initiated or spawned by the search head 210 and is executed by the data intake and query system 108. Alternatively or additionally, an ERP process may be a process spawned by the search head 210 on the same or different host system as the search head 210 resides.

The search head 210 may spawn a single ERP process in response to multiple virtual indexes referenced in a query request, or the search head may spawn different ERP processes for different virtual indexes. Generally, virtual indexes that share common data configurations or protocols may share ERP processes. For example, all query references to a Hadoop file system may be processed by the same ERP process, if the ERP process is suitably configured. Likewise, all query references to an SQL database may be processed by the same ERP process. In addition, the search head may provide a common ERP process for common external data source types (e.g., a common vendor may utilize a common ERP process, even if the vendor includes different data storage system types, such as Hadoop and SQL). Common indexing schemes also may be handled by common ERP processes, such as flat text files or Weblog files.

The search head 210 determines the number of ERP processes to be initiated via the use of configuration parameters that are included in a query request message. Generally, there is a one-to-many relationship between an external results provider "family" and ERP processes. There is also a one-to-many relationship between an ERP process and corresponding virtual indexes that are referred to in a query request. For example, using RDBMS, assume two independent instances of such a system by one vendor, such as one RDBMS for production and another RDBMS used for development. In such a situation, it is likely preferable (but optional) to use two ERP processes to maintain the independent operation as between production and development data. Both of the ERPs, however, will belong to the same family, because the two RDBMS system types are from the same vendor.

The ERP processes 1110, 1112 receive a query request from the search head 210. The search head may optimize the received query request for execution at the respective external virtual index. Alternatively, the ERP process may receive a query request as a result of analysis performed by the search head or by a different system process. The ERP processes 1110, 1112 can communicate with the search head 210 via conventional input/output routines (e.g., standard in / standard out, etc.). In this way, the ERP process receives the query request from a client device such that the query request may be efficiently executed at the corresponding external virtual index.

The ERP processes 1110, 1112 may be implemented as a process of the data intake and query system. Each ERP process may be provided by the data intake and query system, or may be provided by process or application providers who are independent of the data intake and query system. Each respective ERP process may include an interface application installed at a computer of the external result provider that ensures proper communication between the search support system and the external result provider. The ERP processes 1110, 1112 generate appropriate query requests in the protocol and syntax of the respective virtual indexes 1114, 1116, each of which corresponds to the query request received by the search head 210. Upon receiving query results from their corresponding virtual indexes, the respective ERP process passes the result to the search head 210, which may return or display the results or a processed set of results based on the returned results to the respective client device.

Client devices 1104 may communicate with the data intake and query system 108 through a network interface 1120, e.g., one or more LANs, WANs, cellular networks, intranetworks, or internetworks using any of wired, wireless, terrestrial microwave, satellite links, etc., and may include the public Internet.

The analytics platform utilizing the External Result Provider process described in more detail in U.S. Pat. No. 8,738,629, entitled "EXTERNAL RESULT PROVIDED PROCESS FOR RETRIEVING DATA STORED USING A DIFFERENT CONFIGURATION OR PROTOCOL", issued on 27 May 2014, U.S. Pat. No. 8,738,587, entitled "PROCESSING A SYSTEM SEARCH REQUEST BY RETRIEVING RESULTS FROM BOTH A NATIVE INDEX AND A VIRTUAL INDEX", issued on 25 Jul. 2013, U.S. patent application Ser. No. 14/266,832, entitled "PROCESSING A SYSTEM SEARCH REQUEST ACROSS DISPARATE DATA COLLECTION SYSTEMS", filed on 1 May 2014, and U.S. patent application Ser. No. 14/449,144, entitled "PROCESSING A SYSTEM SEARCH REQUEST INCLUDING EXTERNAL DATA SOURCES", filed on 31 Jul. 2014, each of which is hereby incorporated by reference in its entirety for all purposes.

2.15.1. ERP Process Features

The ERP processes described above may include two operation modes: a streaming mode and a reporting mode. The ERP processes can operate in streaming mode only, in reporting mode only, or in both modes simultaneously. Operating in both modes simultaneously is referred to as mixed mode operation. In a mixed mode operation, the ERP at some point can stop providing the search head with streaming results and only provide reporting results thereafter, or the search head at some point may start ignoring streaming results it has been using and only use reporting results thereafter.

The streaming mode returns query results in real time, with minimal processing, in response to the query request. The reporting mode provides results of a query request with processing of the query results prior to providing them to the requesting search head, which in turn provides results to the requesting client device. ERP operation with such multiple modes provides greater performance flexibility with regard to report time, query latency, and resource utilization.

In a mixed mode operation, both streaming mode and reporting mode are operating simultaneously. The streaming mode results (e.g., the raw data obtained from the external data source) are provided to the search head, which can then process the results data (e.g., break the raw data into events, timestamp it, filter it, etc.) and integrate the results data with the results data from other external data sources, or from data stores of the search head. The search head performs such processing and can immediately start returning interim (streaming mode) results to the user at the requesting client device; simultaneously, the search head is waiting for the ERP process to process the data it is retrieving from the external data source as a result of the concurrently executing reporting mode.

In some instances, the ERP process initially operates in a mixed mode, such that the streaming mode operates to enable the ERP quickly to return interim results (e.g., some of the raw or unprocessed data necessary to respond to a query request) to the search head, enabling the search head to process the interim results and begin providing to the client or query requester interim results that are responsive to the query. Meanwhile, in this mixed mode, the ERP also operates concurrently in reporting mode, processing portions of raw data in a manner responsive to the query. Upon determining that it has results from the reporting mode available to return to the search head, the ERP may halt processing in the mixed mode at that time (or some later time) by stopping the return of data in streaming mode to the search head and switching to reporting mode only. The ERP at this point starts sending interim results in reporting mode to the search head, which in turn may then present this processed data responsive to the query request to the client or query requester. Typically the search head switches from using results from the ERP's streaming mode of operation to results from the ERP's reporting mode of operation when the higher bandwidth results from the reporting mode outstrip the amount of data processed by the search head in the ]streaming mode of ERP operation.

A reporting mode may have a higher bandwidth because the ERP does not have to spend time transferring data to the search head for processing all the raw data. In addition, the ERP may optionally direct another processor to do the processing.

The streaming mode of operation does not need to be stopped to gain the higher bandwidth benefits of a reporting mode; the search head could simply stop using the streaming mode results—and start using the reporting mode results—when the bandwidth of the reporting mode has caught up with or exceeded the amount of bandwidth provided by the streaming mode. Thus, a variety of triggers and ways to accomplish a search head's switch from using streaming mode results to using reporting mode results may be appreciated by one skilled in the art.

The reporting mode can involve the ERP process (or an external system) performing event breaking, time stamping, filtering of events to match the query request, and calculating statistics on the results. The user can request particular types of data, such as if the query itself involves types of events, or the query request may ask for statistics on data, such as on events that meet the query request. In either case, the search head understands the query language used in the received query request, which may be a proprietary language. One examplary query language is Splunk Processing Language (SPL) developed by the assignee of the application, Splunk Inc. The search head typically understands how to use that language to obtain data from the indexers, which store data in a format used by the SPLUNK® Enterprise system.

The ERP processes support the search head, as the search head is not ordinarily configured to understand the format in which data is stored in external data sources such as Hadoop or SQL data systems. Rather, the ERP process performs that translation from the query submitted in the query support system's native format (e.g., SPL if SPLUNK® ENTERPRISE is used as the query support system) to a query request format that will be accepted by the corresponding external data system. The external data system typically stores data in a different format from that of the query support system's native index format, and it utilizes a different query language (e.g., SQL or MapReduce, rather than SPL or the like).

As noted, the ERP process can operate in the streaming mode alone. After the ERP process has performed the translation of the query request and received raw results from the streaming mode, the search head can integrate the returned data with any data obtained from local data sources (e.g., native to the query support system), other external data sources, and other ERP processes (if such operations were required to satisfy the terms of the query). An advantage of mixed mode operation is that, in addition to streaming mode, the ERP process is also executing concurrently in reporting mode. Thus, the ERP process (rather than the search head) is processing query results (e.g., performing event breaking, timestamping, filtering, possibly calculating statistics if required to be responsive to the query request, etc.). It should be apparent to those skilled in the art that additional time is needed for the ERP process to perform the processing in such a configuration. Therefore, the streaming mode will allow the search head to start returning interim results to the user at the client device before the ERP process can complete sufficient processing to start returning any query results. The switchover between streaming and reporting mode happens when the ERP process determines that the switchover is appropriate, such as when the ERP process determines it can begin returning meaningful results from its reporting mode.

The operation described above illustrates the source of operational latency: streaming mode has low latency (immediate results) and usually has relatively low bandwidth (fewer results can be returned per unit of time). In contrast, the concurrently running reporting mode has relatively high latency (it has to perform a lot more processing before returning any results) and usually has relatively high bandwidth (more results can be processed per unit of time). For example, when the ERP process does begin returning report results, it returns more processed results than in the streaming mode, because, e.g., statistics only need to be calculated to be responsive to the query request. That is, the ERP process doesn't have to take time to first return raw data to the search head. As noted, the ERP process could be configured to operate in streaming mode alone and return just the raw data for the search head to process in a way that is responsive to the query request. Alternatively, the ERP process can be configured to operate in the reporting mode only. Also, the ERP process can be configured to operate in streaming mode and reporting mode concurrently, as described, with the ERP process stopping the transmission of streaming results to the search head when the concurrently running reporting mode has caught up and started providing results. The reporting mode does not require the processing of all raw data that is responsive to the query request before the ERP process starts returning results; rather, the reporting mode usually performs processing of chunks of events and returns the processing results to the search head for each chunk.

For example, an ERP process can be configured to merely return the contents of a query result file verbatim, with little or no processing of results. That way, the search head performs all processing (such as parsing byte streams into events, filtering, etc.). The ERP process can be configured to perform additional intelligence, such as analyzing the query request and handling all the computation that a native indexer process would otherwise perform. In this way, the configured ERP process provides greater flexibility in features while operating according to desired preferences, such as response latency and resource requirements.

2.16. IT Service Monitoring

As previously mentioned, the SPLUNK® ENTERPRISE platform provides various schemas, dashboards and visualizations that make it easy for developers to create applications to provide additional capabilities. One such application is SPLUNK® IT SERVICE INTELLIGENCE™, which performs monitoring and alerting operations. It also includes analytics to help an analyst diagnose the root cause of performance problems based on large volumes of data stored by the SPLUNK® ENTERPRISE system as correlated to the various services an IT organization provides (a service-centric view). This differs significantly from conventional IT monitoring systems that lack the infrastructure to effectively store and analyze large volumes of service-related event data. Traditional service monitoring systems typically use fixed schemas to extract data from pre-defined fields at data ingestion time, wherein the extracted data is typically stored in a relational database. This data extraction process and associated reduction in data content that occurs at data ingestion time inevitably hampers future investigations, when all of the original data may be needed to determine the root cause of or contributing factors to a service issue.

In contrast, a SPLUNK® IT SERVICE INTELLIGENCE™ system stores large volumes of minimally-processed service-related data at ingestion time for later retrieval and analysis at search time, to perform regular monitoring, or to investigate a service issue. To facilitate this data retrieval process, SPLUNK® IT SERVICE INTELLIGENCE™ enables a user to define an IT operations infrastructure from the perspective of the services it provides. In this service-centric approach, a service such as corporate e-mail may be defined in terms of the entities employed to provide the service, such as host machines and network devices. Each entity is defined to include information for identifying all of the event data that pertains to the entity, whether produced by the entity itself or by another machine, and considering the many various ways the entity may be identified in raw machine data (such as by a URL, an IP address, or machine name). The service and entity definitions can organize event data around a service so that all of the event data pertaining to that service can be easily identified. This capability provides a foundation for the implementation of Key Performance Indicators.

One or more Key Performance Indicators (KPI's) are defined for a service within the SPLUNK® IT SERVICE INTELLIGENCE™ application. Each KPI measures an aspect of service performance at a point in time or over a period of time (aspect KPI's). Each KPI is defined by a query that derives a KPI value from the machine data of events associated with the entities that provide the service. Information in the entity definitions may be used to identify the appropriate events at the time a KPI is defined or whenever a KPI value is being determined. The KPI values derived over time may be stored to build a valuable repository of current and historical performance information for the service, and the repository, itself, may be subject to query processing. Aggregate KPIs may be defined to provide a measure of service performance calculated from a set of service aspect KPI values; this aggregate may even be taken across defined timeframes or across multiple services. A particular service may have an aggregate KPI derived from substantially all of the aspect KPI's of the service to indicate an overall health score for the service.

SPLUNK® IT SERVICE INTELLIGENCE™ facilitates the production of meaningful aggregate KPI's through a system of KPI thresholds and state values. Different KPI definitions may produce values in different ranges, and so the same value may mean something very different from one KPI definition to another. To address this, SPLUNK® IT SERVICE INTELLIGENCE™ implements a translation of individual KPI values to a common domain of "state" values. For example, a KPI range of values may be 1-100, or 50-275, while values in the state domain may be 'critical,' 'warning,' 'normal,' and 'informational'. Thresholds associated with a particular KPI definition determine ranges of values for that KPI that correspond to the various state values. In one case, KPI values 95-100 may be set to correspond to 'critical' in the state domain. KPI values from disparate KPI's can be processed uniformly once they are translated into the common state values using the thresholds. For example, "normal 80% of the time" can be applied across various KPI's. To provide meaningful aggregate KPI's, a weighting value can be assigned to each KPI so that its influence on the calculated aggregate KPI value is increased or decreased relative to the other KPI's.

One service in an IT environment often impacts, or is impacted by, another service. SPLUNK® IT SERVICE INTELLIGENCE™ can reflect these dependencies. For example, a dependency relationship between a corporate e-mail service and a centralized authentication service can be reflected by recording an association between their respective service definitions. The recorded associations establish a service dependency topology that informs the data or selection options presented in a GUI, for example. (The service dependency topology is like a "map" showing how services are connected based on their dependencies.) The service topology may itself be depicted in a GUI and may be interactive to allow navigation among related services.

Entity definitions in SPLUNK® IT SERVICE INTELLIGENCE™ can include informational fields that can serve as metadata, implied data fields, or attributed data fields for the events identified by other aspects of the entity definition. Entity definitions in SPLUNK® IT SERVICE INTELLIGENCE™ can also be created and updated by an import of tabular data (as represented in a CSV, another delimited file, or a query result set). The import may be GUI-mediated or processed using import parameters from a GUI-based import definition process. Entity definitions in SPLUNK® IT SERVICE INTELLIGENCE™ can also be associated with a service by means of a service definition rule. Processing the rule results in the matching entity definitions being associated with the service definition. The rule can be processed at creation time, and thereafter on a scheduled or on-demand basis. This allows dynamic, rule-based updates to the service definition.

During operation, SPLUNK® IT SERVICE INTELLIGENCE™ can recognize so-called "notable events" that may indicate a service performance problem or other situation of interest. These notable events can be recognized by a "correlation query" specifying trigger criteria for a notable event: every time KPI values satisfy the criteria, the application indicates a notable event. A severity level for the notable event may also be specified. Furthermore, when trigger criteria are satisfied, the correlation query may additionally or alternatively cause a service ticket to be created in an IT service management (ITSM) system, such as a systems available from ServiceNow, Inc., of Santa Clara, Calif.

SPLUNK® IT SERVICE INTELLIGENCE™ provides various visualizations built on its service-centric organization of event data and the KPI values generated and collected. Visualizations can be particularly useful for monitoring or investigating service performance. SPLUNK® IT SERVICE INTELLIGENCE™ provides a service monitoring interface suitable as the home page for ongoing IT service monitoring. The interface is appropriate for settings such as desktop use or for a wall-mounted display in a network operations center (NOC). The interface may prominently display a services health section with tiles for the aggregate KPI's indicating overall health for defined services and a general KPI section with tiles for KPI's related to individual service aspects. These tiles may display KPI information in a variety of ways, such as by being colored and ordered according to factors like the KPI state value. They also can be interactive and navigate to visualizations of more detailed KPI information.

SPLUNK® IT SERVICE INTELLIGENCE™ provides a service-monitoring dashboard visualization based on a user-defined template. The template can include user-selectable widgets of varying types and styles to display KPI information. The content and the appearance of widgets can respond dynamically to changing KPI information. The KPI widgets can appear in conjunction with a background image, user drawing objects, or other visual elements, that depict the IT operations environment, for example. The KPI widgets or other GUI elements can be interactive so as to provide navigation to visualizations of more detailed KPI information.

SPLUNK® IT SERVICE INTELLIGENCE™ provides a visualization showing detailed time-series information for multiple KPI's in parallel graph lanes. The length of each lane can correspond to a uniform time range, while the width of each lane may be automatically adjusted to fit the displayed KPI data. Data within each lane may be displayed in a user selectable style, such as a line, area, or bar chart. During operation a user may select a position in the time range of the graph lanes to activate lane inspection at that point in time. Lane inspection may display an indicator for the selected time across the graph lanes and display the KPI value associated with that point in time for each of the graph lanes. The visualization may also provide navigation to an interface for defining a correlation query, using information from the visualization to pre-populate the definition.

SPLUNK® IT SERVICE INTELLIGENCE™ provides a visualization for incident review showing detailed information for notable events. The incident review visualization may also show summary information for the notable events over a time frame, such as an indication of the number of notable events at each of a number of severity levels. The severity level display may be presented as a rainbow chart with the warmest color associated with the highest severity classification. The incident review visualization may also show summary information for the notable events over a time frame, such as the number of notable events occurring within segments of the time frame. The incident review visualization may display a list of notable events within the time frame ordered by any number of factors, such as time or severity. The selection of a particular notable event from the list may display detailed information about that notable event, including an identification of the correlation query that generated the notable event.

SPLUNK® IT SERVICE INTELLIGENCE™ provides pre-specified schemas for extracting relevant values from the different types of service-related event data. It also enables a user to define such schemas.

What is claimed is:

1. A method for performing a query, the method comprising:
   transmitting a list of active indexers in an indexer cluster from a cluster master for receipt by a first search head as part of a heartbeat response message, wherein the cluster master is communicatively coupled with an indexer cluster comprising a plurality of indexers, and wherein the first search head is one of a plurality of search heads operable to be communicatively coupled to the cluster master;
   receiving a first slot request at the cluster master in response to a query from the first search head, wherein the first search head is operable to transmit the query to the active indexers for execution if granted the slot request;
   evaluating a plurality of policies to determine if the first slot request can be granted; and
   responsive to a determination that the first slot request can be granted, transmitting an authorization token for a slot to the first search head.

2. The method of claim 1, further comprising:
   responsive to a determination that the first slot request cannot be granted, transmitting a denial of the slot request to the first search head and dispensing with the query in accordance with an enforcement mode, wherein the enforcement mode comprises taking an action selected from the group consisting of: canceling the query, transmitting the query to the active indexers, queuing the query, delaying the query and canceling the query if a number of entries in a search queue are above a threshold value.

3. The method of claim 1, further comprising:
   receiving a release of the slot from the first search head; and
   responsive to a determination that a second slot request can be granted to a second search head from the plurality of search heads, transmitting an authorization token for the slot to the second search head.

4. The method of claim 1, further comprising:
   while the authorization token is granted for the first search head, maintaining a reservation of the authorization token for the first search head;
   receiving a release of the slot from the first search head; and
   releasing the reservation of the authorization token.

5. The method of claim 1, wherein the transmitting the list of active indexers is in response to a request for the list of active indexers in a heartbeat message from the first search head to the cluster master.

6. The method of claim 1, wherein the cluster master, the first search head and the indexer cluster are located in a cloud network, wherein the second search head is located at an on-premises location of an organization, and wherein the first search head and the second search head are under the control of the organization.

7. The method of claim 1, wherein the cluster master, the plurality of search heads and the indexer cluster are located in a cloud network.

8. The method of claim 1, wherein the first search head is located at an on-premises location of an organization, wherein the cluster master, the indexer cluster and the remaining search heads in the plurality of search heads are located in a cloud network.

9. The method of claim 1, wherein the evaluating the plurality of policies comprises consulting a plurality of static policies selected from the group consisting of: maximum number of concurrent searches, frequency of searches, source of searches, and type of search.

10. The method of claim 1, wherein the evaluating the plurality of policies comprises consulting a plurality of dynamic policies selected from the group consisting of: I/O level usage of the search head, CPU usage by the search head, memory usage by the search head, types of indexes accessed by the query, and number of archived indexes accessed by the query.

11. A non-transitory computer-readable medium having computer-readable program code embodied therein for causing a computer system to perform a method for performing a query, the method comprising:
   transmitting a list of active indexers in an indexer cluster from a cluster master for receipt by a first search head as part of a heartbeat response message, wherein the cluster master is communicatively coupled with an indexer cluster comprising a plurality of indexers, and wherein the first search head is one of a plurality of search heads operable to be communicatively coupled to the cluster master;
   receiving a first slot request at the cluster master in response to a query from the first search head, wherein the first search head is operable to transmit the query to the active indexers for execution if granted the slot request;

evaluating a plurality of policies to determine if the first slot request can be granted; and responsive to a determination that the first slot request can be granted, transmitting an authorization token for a slot to the first search head.

12. The computer-readable medium of claim 11, wherein the method further comprises:

responsive to a determination that the first slot request cannot be granted, transmitting a denial of the slot request to the first search head and dispensing with the query in accordance with an enforcement mode, wherein the enforcement mode comprises taking an action selected from the group consisting of: canceling the query, transmitting the query to the active indexers, queuing the query, delaying the query and canceling the query if a number of entries in a search queue are above a threshold value.

13. The computer-readable medium of claim 11, wherein the method further comprises:

receiving a release of the slot from the first search head; and responsive to a determination that a second slot request can be granted to a second search head from the plurality of search heads, transmitting an authorization token for the slot to the second search head.

14. The computer-readable medium of claim 11, wherein the method further comprises:

while the authorization token is granted for the first search head, maintaining a reservation of the authorization token for the first search head;

receiving a release of the slot from the first search head; and releasing the reservation of the authorization token.

15. The computer-readable medium of claim 11, wherein the transmitting the list of active indexers is in response to a request for the list of active indexers in a heartbeat message from the first search head to the cluster master.

16. The computer-readable medium of claim 11, wherein the cluster master, the first search head and the indexer cluster are located in a cloud network, wherein the second search head is located at an on-premises location of an organization, and wherein the first search head and the second search head are under the control of the organization.

17. The computer-readable medium of claim 11, wherein the cluster master, the plurality of search heads and the indexer cluster are located in a cloud network.

18. The computer-readable medium of claim 11, wherein the first search head is located at an on-premises location of an organization, wherein the cluster master, the indexer cluster and the remaining search heads in the plurality of search heads are located in a cloud network.

19. The computer-readable medium of claim 11, wherein the evaluating the plurality of policies comprises consulting a plurality of static policies selected from the group consisting of: maximum number of concurrent searches, frequency of searches, source of searches, and type of search.

20. The computer-readable medium of claim 11, wherein the evaluating the plurality of policies comprises consulting a plurality of dynamic policies selected from the group consisting of: I/O level usage of the search head, CPU usage by the search head, memory usage by the search head, types of indexes accessed by the query, and number of archived indexes accessed by the query.

21. A system comprising:

a processing device communicatively coupled with a memory and configured to:

transmit a list of active indexers in an indexer cluster from a cluster master for receipt by a first search head as part of a heartbeat response message, wherein the cluster master is communicatively coupled with an indexer cluster comprising a plurality of indexers, and wherein the first search head is one of a plurality of search heads operable to be communicatively coupled to the cluster master;

receive a first slot request at the cluster master in response to a query from the first search head, wherein the first search head is operable to transmit the query to the active indexers for execution if granted the slot request;

evaluate a plurality of policies to determine if the first slot request can be granted; and responsive to a determination that the first slot request can be granted, transmit an authorization token for a slot to the first search head.

22. The system of claim 21, wherein the processor is further configured to: responsive to a determination that the first slot request cannot be granted, transmit a denial of the slot request to the first search head and dispensing with the query in accordance with an enforcement mode, wherein the enforcement mode comprises taking an action selected from the group consisting of: canceling the query, transmitting the query to the active indexers, queuing the query, delaying the query and canceling the query if a number of entries in a search queue are above a threshold value.

23. The system of claim 21, wherein the processor is further configured to:

receive a release of the slot from the first search head; and responsive to a determination that a second slot request can be granted to a second search head from the plurality of search heads, transmit an authorization token for the slot to the second search head.

24. The system of claim 21, wherein the processor is further configured to:

while the authorization token is granted for the first search head, maintain a reservation of the authorization token for the first search head;

receiving a release of the slot from the first search head; and releasing the reservation of the authorization token.

25. The system of claim 21, wherein the list of active indexers is transmitted in response to a request for the list of active indexers in a heartbeat message from the first search head to the cluster master.

26. The system of claim 21, wherein the cluster master, the first search head and the indexer cluster are located in a cloud network, wherein the second search head is located at an on-premises location of an organization, and wherein the first search head and the second search head are under the control of the organization.

27. The system of claim 21, wherein the cluster master, the plurality of search heads and the indexer cluster are located in a cloud network.

28. The system of claim 21, wherein the first search head is located at an on-premises location of an organization, wherein the cluster master, the indexer cluster and the remaining search heads in the plurality of search heads are located in a cloud network.

29. The system of claim 21, wherein to evaluate the plurality of policies the processor is configured to consult a plurality of static policies selected from the group consisting of: maximum number of concurrent searches, frequency of searches, source of searches, and type of search.

30. The system of claim 21, wherein to evaluate the plurality of policies the processor is configured to consult a plurality of dynamic policies selected from the group consisting of: I/O level usage of the search head, CPU usage by the search head, memory usage by the search head, types of indexes accessed by the query, and number of archived indexes accessed by the query.

\* \* \* \* \*